(12) United States Patent
Tominaga et al.

(10) Patent No.: US 8,543,701 B2
(45) Date of Patent: Sep. 24, 2013

(54) COMPUTER SYSTEM AND ITS CONTROL METHOD

(75) Inventors: Keisuke Tominaga, Odawara (JP); Shuichi Yagi, Ninomiya (JP); Nobuyuki Osaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 57 days.

(21) Appl. No.: 13/132,716

(22) PCT Filed: May 23, 2011

(86) PCT No.: PCT/JP2011/002866
§ 371 (c)(1),
(2), (4) Date: Jun. 3, 2011

(87) PCT Pub. No.: WO2012/160599
PCT Pub. Date: Nov. 29, 2012

(65) Prior Publication Data
US 2012/0304189 A1 Nov. 29, 2012

(51) Int. Cl.
G06F 15/173 (2006.01)
(52) U.S. Cl.
USPC .......................... 709/226; 711/163
(58) Field of Classification Search
USPC .......................... 709/226; 711/163
See application file for complete search history.

(56) References Cited

U.S. PATENT DOCUMENTS

| | | | |
|---|---|---|---|
| 2002/0138322 A1 | 9/2002 | Umezawa et al. | |
| 2006/0136437 A1 | 6/2006 | Yamasaki | |
| 2006/0235985 A1* | 10/2006 | Ramkumar et al. | 709/229 |
| 2008/0086612 A1* | 4/2008 | Murayama et al. | 711/163 |
| 2008/0215813 A1 | 9/2008 | Igarashi et al. | |

FOREIGN PATENT DOCUMENTS

JP 2006-185386 A 7/2006

\* cited by examiner

*Primary Examiner* — Andrew Georgandellis
(74) *Attorney, Agent, or Firm* — Volpe and Koenig, P.C.

(57) ABSTRACT

It is an object of this invention to provide a computer system and its control method capable of preventing allocation of a resource(s), which is not intended by a superior administrator, to a certain storage administrator even when the superior administrator sets a certain authority to that storage administrator and intends to allocate a resource(s), which is required to enable this authority, to the storage administrator.

When the superior administrator sets a certain authority to a certain storage administrator and intends to allocate a resource(s), which is required to enable this authority, to the storage administrator, the computer system prevents allocation of a resource(s), which is not intended by the superior administrator, to that storage administrator by optimizing allocation of resource groups and authorities to the storage administrator.

7 Claims, 73 Drawing Sheets

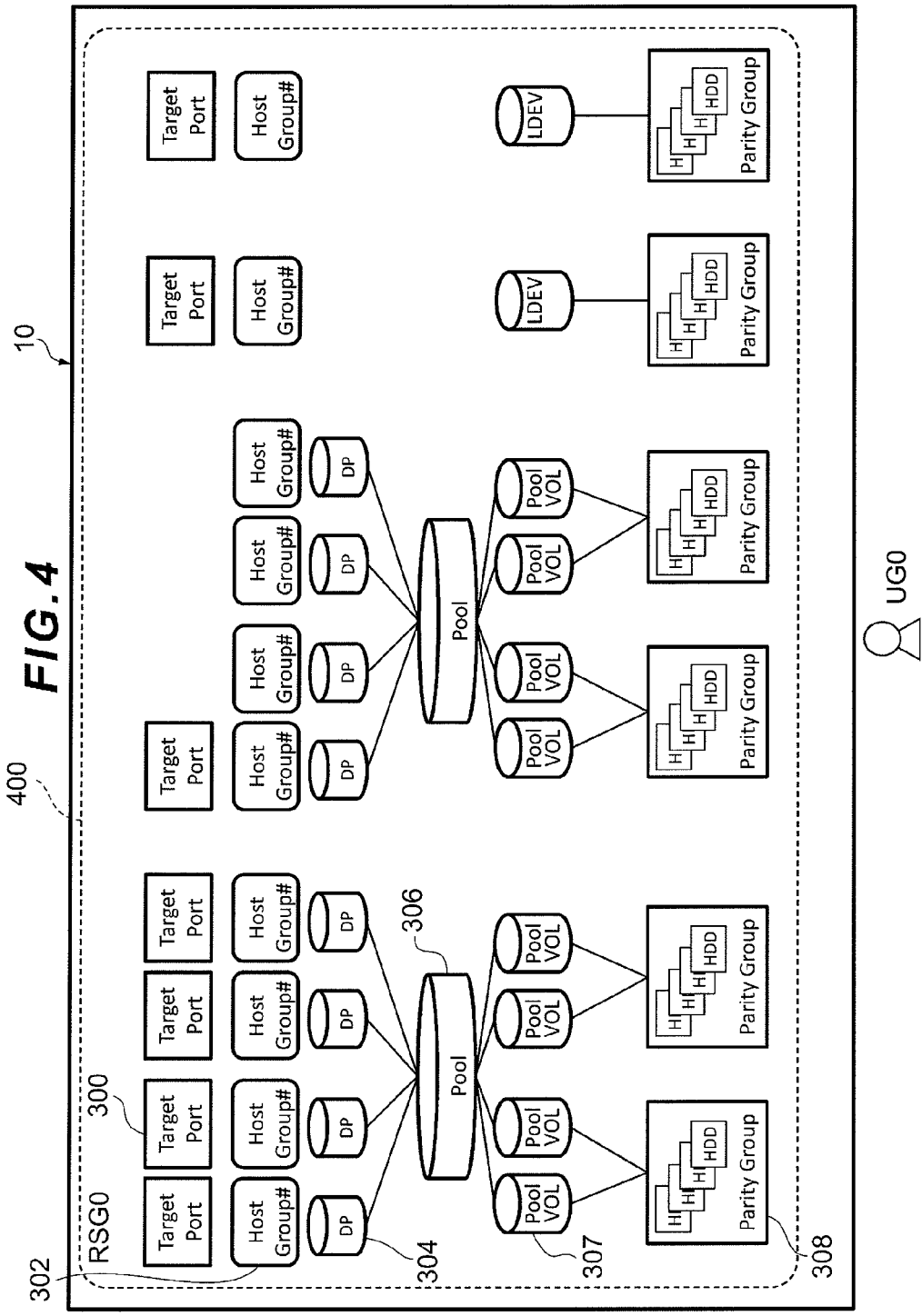

| LDEV ID | ASSIGNED RESOURCE GROUP ID | VALIDITY FLAG |
|---|---|---|
| 0x000000 | 0x0000 | 0(INVALID) |
| 0x000001 | 0x0000 | 0(INVALID) |
| 0x000002 | 0x0000 | 0(INVALID) |
| : | : | : |

| LDEV ID | ASSIGNED RESOURCE GROUP ID | VALIDITY FLAG |
|---|---|---|
| 0x000000 | 0x0000 | 1(VALID) |
| 0x000001 | 0x0000 | 1(VALID) |
| 0x000002 | 0x0000 | 1(VALID) |
| : | : | : |

| Parity Group ID | ASSIGNED RESOURCE GROUP ID | VALIDITY FLAG |
|---|---|---|
| 0x000000 | 0x0000 | 0(INVALID) |
| 0x000001 | 0x0000 | 0(INVALID) |
| 0x000002 | 0x0000 | 0(INVALID) |
| : | : | : |

| Parity Group ID | ASSIGNED RESOURCE GROUP ID | VALIDITY FLAG |
|---|---|---|
| 0x000000 | 0x0000 | 1(VALID) |
| 0x000001 | 0x0000 | 1(VALID) |
| 0x000002 | 0x0000 | 1(VALID) |
| : | : | : |

| Host Group ID | ASSIGNED RESOURCE GROUP ID | VALIDITY FLAG |
|---|---|---|
| 0x000000 | 0x0000 | 0(INVALID) |
| 0x000001 | 0x0000 | 0(INVALID) |
| 0x000002 | 0x0000 | 0(INVALID) |
| : | : | : |

| Host Group ID | ASSIGNED RESOURCE GROUP ID | VALIDITY FLAG |
|---|---|---|
| 0x000000 | 0x0000 | 1(VALID) |
| 0x000001 | 0x0000 | 1(VALID) |
| 0x000002 | 0x0000 | 1(VALID) |
| : | : | : |

| Port ID | ASSIGNED RESOURCE GROUP ID | VALIDITY FLAG |
|---|---|---|
| 0x000000 | 0x0000 | 0(INVALID) |
| 0x000001 | 0x0000 | 0(INVALID) |
| 0x000002 | 0x0000 | 0(INVALID) |
| : | : | : |

| Port ID | ASSIGNED RESOURCE GROUP ID | VALIDITY FLAG |
|---|---|---|
| 0x000000 | 0x0000 | 1(VALID) |
| 0x000001 | 0x0000 | 1(VALID) |
| 0x000002 | 0x0000 | 1(VALID) |
| : | : | : |

| RESOURCE GROUP ID | RESOURCE GROUP NAME | LOCKED LOGIN SESSION ID |
|---|---|---|
| 0x0000 | RSG0 | |
| 0x0001 | RSG1 | 0101 |
| 0x0002 | RSG2 | 0101 |
| 0x0003 | RSG3 | 0101 |
| 0x0004 | RSG4 | |
| .. | .. | |
| 0x0011 | RSG11 | 0101 |
| 0x0012 | RSG12 | 0101 |
| .. | .. | |
| 0xFFFF | ALL_RSG (FIXED) | |

| USER ID | USER NAME | USER GROUP ID BITMAP | |
|---|---|---|---|
| 0x0000 | User0 | 1000 0000 0000 0000 0000 0000 0000 0000 ..... | ←BELONG TO UG0 |
| 0x0001 | User1 | 0100 0100 0000 0000 0000 0000 0000 0000 ..... | |
| 0x0002 | User2 | 0010 0000 0000 0000 0000 0000 0000 0000 ..... | ←BELONG TO UG2 |
| .. | .. | .. | |
| 0x0011 | User11 | 0000 0000 0000 0000 0000 0000 0000 0100 ..... | ←BELONG TO UG11 |
| 0x0012 | User12 | 0000 0000 0000 0000 0000 0000 0000 0010 ..... | ←BELONG TO UG12 |
| .. | .. | .. | |
| 0x0020 | User20 | 0000 0000 0000 0000 0000 0011 0000 1000 ..... | ←BELONG TO THREE UGS |
| .. | .. | .. | |

| USER GROUP ID | USER GROUP NAME | ROLE ID BITMAP |
|---|---|---|
| 0x0000 | UG0 | 0010 0000 0000 ........ |
| 0x0001 | UG1 | 0100 0100 0000 ........ |
| 0x0002 | UG2 | 0000 0110 0100 ........ |
| .. | .. | .. |
| 0x0011 | UG11 | 0000 0010 1100 ........ |
| 0x0012 | UG12 | 0000 0010 1100 ........ |
| .. | .. | .. |

FIG.15A

| ROLES | OPERATION AUTHORITIES |
|---|---|
| Support Personnel | SYSTEM MAINTENANCE |
| User Maintenance | SIMPLE SYSTEM MAINTENANCE BY USER |
| Security | USER REGISTRATION (CREATION OF USER GROUP (UG))<br>GENERAL CRYPTOGRAPHIC KEY OPERATION<br>CREATION /DELETION OF RESOURCE GROUP (RSG)<br>ASSOCIATION BETWEEN UG AND RSG |
| Audit Log | AUDIT LOG MANAGEMENT |
| Initial Configuration | REFERENCE TO STORAGE APPARATUS<br>INITIALIZATION OF STORAGE MANAGEMENT SOFTWARE<br>LICENSE MANAGEMENT OF PROGRAM PRODUCTS |
| System | REFERENCE TO STORAGE APPARATUS<br>CLPR CREATION/DELETION<br>OWNERSHIP SETTING<br>PORT ATTRIBUTE SETTING |
| Provisioning | LDEV CREATION/DELETION<br>POOL / POOL VOL CREATION/DELETION<br>DP VOL CREATION/DELETION<br>LU PATH CREATION/DELETION<br>HOST GROUP CREATION/DELETION<br>HOST ADDITION/DELETION |
| Performance Monitor | PERFORMANCE MONITOR SETTING<br>START/STOP PERFORMANCE MONITOR |
| Local Copy | ENVIRONMENT SETTING<br>PAIR CREATION/DELETION |
| Remote Copy | ENVIRONMENT SETTING<br>PAIR CREATION/DELETION |
| ... | |

FIG.15B

| Role ID | ROLE NAME | AUTHORITY BITMAP |
|---|---|---|
| 0x000 | Support Personnel | 1010 0000 1111 0000 0000... |
| 0x001 | User Maintenance | 0100 0000 0000 1111 0000... |
| 0x002 | Security | 1000 1111 1000 0000 0000... |
| 0x003 | Initial Configuration | 0000 0000 0000 0000 1111... |
| ... | ... | ... |

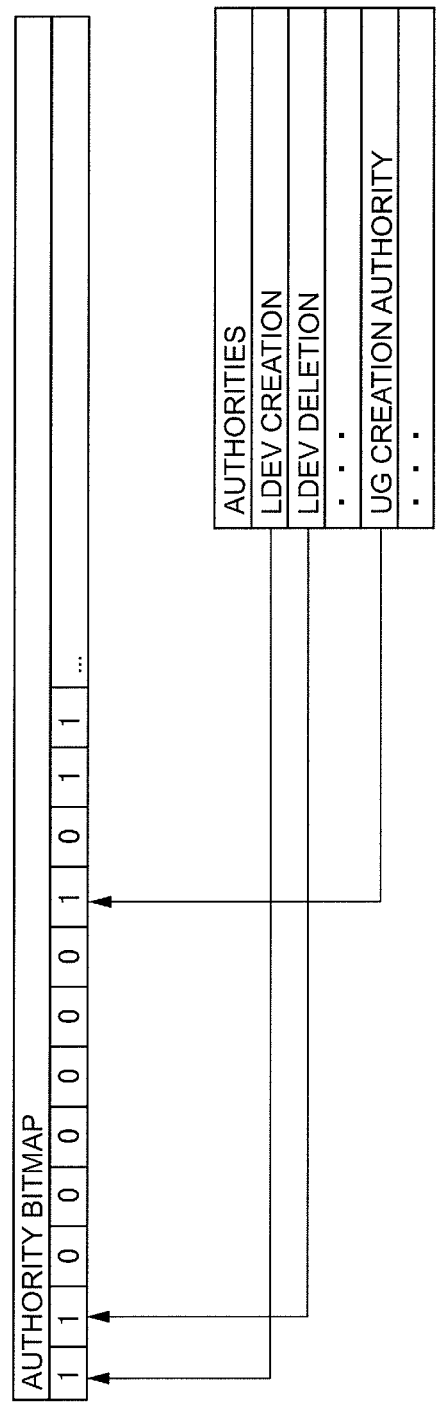

FIG. 15D

| RSG ID | RSG NAME | RESOURCE ID BITMAP |
|---|---|---|
| 0x000 | RSG0 | 0001 0110 1000... |
| 0x001 | RSG1 | 0110 1000 0100... |
| 0x002 | RSG2 | 1000 0001 0011... |
| ... | ... | ... |

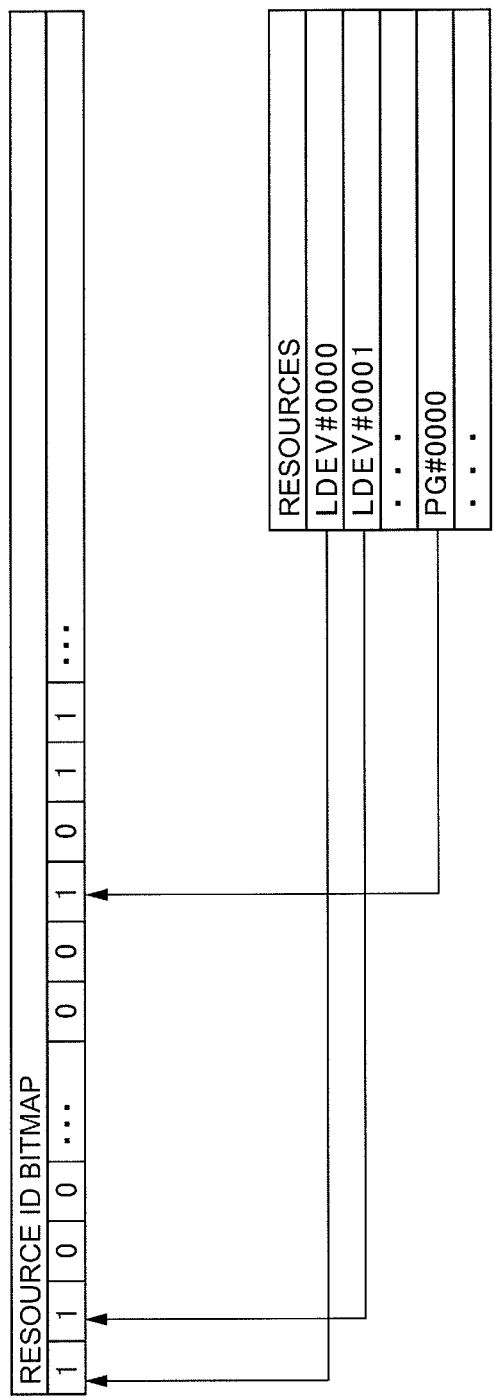

| USER GROUP ID | USER GROUP NAME | RESOURCE GROUP ID BITMAP |
|---|---|---|
| 0x0000 | UG0 | 1111 1111 1111 1111 1111 ... |
| 0x0001 | UG1 | 0000 0100 0000 0000 0000 ... |
| 0x0002 | UG2 | 0111 0000 0000 0000 0110 ... |
| .. | .. | .. |
| 0x0011 | UG11 | 0001 0000 0000 0000 0100 ... |
| 0x0012 | UG12 | 0001 0000 0000 0000 0010 ... |
| .. | .. | .. |

| # | SESSION ID | RESOURCE GROUP ID BITMAP | AUTHORITY BITMAP | ETC. |
|---|---|---|---|---|
| 1 | 0101 | 1111 1111 1111 1111 1111 ... | 0010 0000 0000 ... | ← SESSION INFORMATION ESTABLISHED BY USER0 |
| 2 | 0102 | 0111 0000 0000 0000 0110 ... | 0000 0110 0100 ... | |
| .. | | .. | .. | |

| LDEV ID | ASSIGNED RESOURCE GROUP ID | VALIDITY FLAG |
|---|---|---|
| 0x000000 | 0x0002 | 1(VALID) |
| 0x000001 | 0x0002 | 1(VALID) |
| 0x000002 | 0x0002 | 1(VALID) |
| 0x000003 | 0x0002 | 1(VALID) |
| 0x000004 | 0x0002 | 1(VALID) |
| 0x000005 | 0x0002 | 1(VALID) |
| 0x000006 | 0x0002 | 1(VALID) |
| 0x000007 | 0x0002 | 1(VALID) |
| 0x000008 | 0x0002 | 1(VALID) |
| 0x000009 | 0x0002 | 1(VALID) |
| 0x00000A | 0x0002 | 1(VALID) |
| 0x00000B | 0x0002 | 1(VALID) |
| 0x00000C | 0x0002 | 1(VALID) |
| 0x00000D | 0x0002 | 1(VALID) |
| 0x00000E | 0x0002 | 1(VALID) |
| 0x00000F | 0x0002 | 1(VALID) |
| 0x000010 | 0x0002 | 1(VALID) |
| 0x000011 | 0x0002 | 1(VALID) |
| . . | . . | . . |

| Parity Group ID | ASSIGNED RESOURCE GROUP ID | VALIDITY FLAG |
|---|---|---|
| 0x000000 | 0x0002 | 1(VALID) |
| 0x000001 | 0x0002 | 1(VALID) |
| 0x000002 | 0x0005 | 1(VALID) |
| 0x000003 | 0x0005 | 1(VALID) |
| 0x000004 | 0x0000 | 1(VALID) |
| 0x000005 | 0x0000 | 1(VALID) |
| .. | .. | .. |

| Host Group ID | ASSIGNED RESOURCE GROUP ID | VALIDITY FLAG |
|---|---|---|
| 0x000000 | 0x0002 | 1(VALID) |
| ... | ... | ... |
| 0x010000 | 0x0002 | 1(VALID) |
| ... | ... | ... |
| 0x020000 | 0x0002 | 1(VALID) |
| ... | ... | ... |
| 0x030000 | 0x0002 | 1(VALID) |
| ... | ... | ... |
| 0x040000 | 0x0005 | 1(VALID) |
| 0x040001 | 0x0005 | 1(VALID) |
| 0x040002 | 0x0005 | 1(VALID) |
| 0x040003 | 0x0005 | 1(VALID) |
| ... | ... | ... |
| 0x050000 | 0x0000 | 1(VALID) |
| ... | ... | ... |
| 0x060000 | 0x0000 | 1(VALID) |
| ... | ... | ... |

| Port ID | ASSIGNED RESOURCE GROUP ID | VALIDITY FLAG |
|---|---|---|
| 0x000000 | 0x0002 | 1(VALID) |
| 0x000001 | 0x0002 | 1(VALID) |
| 0x000002 | 0x0002 | 1(VALID) |
| 0x000003 | 0x0002 | 1(VALID) |
| 0x000004 | 0x0005 | 1(VALID) |
| 0x000005 | 0x0000 | 1(VALID) |
| 0x000006 | 0x0000 | 1(VALID) |
| .. | .. | .. |

FIG.30

| LDEV ID | ASSIGNED RESOURCE GROUP ID | VALIDITY FLAG |
|---|---|---|
| 0x000000 | 0x0011 | 1(VALID) |
| 0x000001 | 0x0011 | 1(VALID) |
| 0x000002 | 0x0012 | 1(VALID) |
| 0x000003 | 0x0012 | 1(VALID) |
| 0x000004 | 0x0003 | 1(VALID) |
| 0x000005 | 0x0003 | 1(VALID) |
| 0x000006 | 0x0003 | 1(VALID) |
| 0x000007 | 0x0003 | 1(VALID) |
| .. | .. | .. |

FIG.31

| Parity Group ID | ASSIGNED RESOURCE GROUP ID | VALIDITY FLAG |
|---|---|---|
| 0x000000 | 0x0002 | 1(VALID) |
| 0x000001 | 0x0002 | 1(VALID) |
| .. | .. | .. |

FIG.32

| Host Group ID | ASSIGNED RESOURCE GROUP ID | VALIDITY FLAG |
|---|---|---|
| 0x000000 | 0x0011 | 1(VALID) |
| .. | .. | .. |
| 0x010000 | 0x0011 | 1(VALID) |
| .. | .. | .. |
| 0x020000 | 0x0012 | 1(VALID) |
| .. | .. | .. |
| 0x030000 | 0x0012 | 1(VALID) |
| .. | .. | .. |

FIG.33

| Port ID | ASSIGNED RESOURCE GROUP ID | VALIDITY FLAG |
|---|---|---|
| 0x0000000 | 0x0001 | 1(VALID) |
| 0x0000001 | 0x0001 | 1(VALID) |
| 0x0000002 | 0x0001 | 1(VALID) |
| 0x0000003 | 0x0001 | 1(VALID) |
| .. | .. | .. |

FIG.34

| LDEV ID | ASSIGNED RESOURCE GROUP ID | VALIDITY FLAG |
|---|---|---|
| 0x000000 | 0x0011 | 1(VALID) |
| 0x000001 | 0x0011 | 1(VALID) |
| 0x000002 | 0x0012 | 1(VALID) |
| 0x000003 | 0x0012 | 1(VALID) |
| 0x000004 | 0x0011 | 1(VALID) |
| 0x000005 | 0x0011 | 1(VALID) |
| 0x000006 | 0x0012 | 1(VALID) |
| 0x000007 | 0x0012 | 1(VALID) |
| .. | .. | .. |

FIG.35

| Parity Group ID | ASSIGNED RESOURCE GROUP ID | VALIDITY FLAG |
|---|---|---|
| 0x000000 | 0x0002 | 1(VALID) |
| 0x000001 | 0x0002 | 1(VALID) |
| .. | .. | .. |

FIG.36

| Host Group ID | ASSIGNED RESOURCE GROUP ID | VALIDITY FLAG |
|---|---|---|
| 0x000000 | 0x0011 | 1(VALID) |
| . . . | . . . | . . . |
| 0x010000 | 0x0011 | 1(VALID) |
| . . . | . . . | . . . |
| 0x020000 | 0x0012 | 1(VALID) |
| . . . | . . . | . . . |
| 0x030000 | 0x0012 | 1(VALID) |
| . . . | . . . | . . . |

FIG.37

| Port ID | ASSIGNED RESOURCE GROUP ID | VALIDITY FLAG |
|---|---|---|
| 0x000000 | 0x0001 | 1(VALID) |
| 0x000001 | 0x0001 | 1(VALID) |
| 0x000002 | 0x0001 | 1(VALID) |
| 0x000003 | 0x0001 | 1(VALID) |
| .. | .. | .. |

FIG.38

| USER GROUP ID | USER GROUP NAME | RESOURCE GROUP ID BITMAP |
|---|---|---|
| 0x0000 | UG0 | 1111 1111 1111 1111 1111 ....... |
| 0x0001 | UG1 | 0000 0100 0000 0000 0000 ....... |
| 0x0002 | UG2 | 0111 0000 0000 0000 0000 ....... |
| .. | .. | .. |
| 0x0011 | UG11 | 0000 0000 0000 0000 0100 ....... |
| 0x0012 | UG12 | 0000 0000 0000 0000 0010 ....... |
| .. | .. | .. |

FIG.39

| LDEV ID | PROVISIONING TYPE | ATTRIBUTE |
|---|---|---|
| 0x000000 | DP VOL | NONE |
| 0x000001 | DP VOL | NONE |
| 0x000002 | DP VOL | NONE |
| 0x000003 | DP VOL | NONE |
| 0x000004 | Basic VOL | Pool VOL |
| 0x000005 | Basic VOL | Pool VOL |
| 0x000006 | Basic VOL | Pool VOL |
| 0x000007 | Basic VOL | Pool VOL |
| .. | .. | .. |

FIG.45

Explorer

Storage Systems
Performance Monitor
Administration
  User Groups
    ■ Administrator User Group
      Audit Log Administrator (View & M
      Audit Log Administrator (View Onl
      Security Administrator (View & Mo
      Security Administrator (View Only)
      Storage Administrator (View & Mo
      Storage Administrator (View Only)
      Support Personnel Group
      ■ System User Group
  Resource Groups
    ■ RSG0 (0)
    ■ RSG1 (1)
    ■ RSG2 (2)

« Administration

Administrator User Group

User Groups > Administrator User Group

Summary

| Number of Roles | 3 |
|---|---|
| Number of Resource Groups | 3 |
| Number of Users | 1 |
| User Group Type | Built-in |
| All Resource Groups Assigned | Yes |

Users | Roles | Resource Groups

Filter  ON  OFF    Select All Pages    Options   |◁ ◁ 1 /1 ▷ ▷|

| Resource Group Name (ID) | Number of User Groups | Number of Parity Groups | Number of LDEVs | Number of Ports | Number of Host Groups |
|---|---|---|---|---|---|
| ■ RSG0 (0) | 6 | 4 | 0 | 2 | 0 |
| ■ RSG1 (1) | 12 | 2 | 4 | 2 | 4 |
| ■ RSG2 (2) | 8 | 0 | 9 | 9 | 0 |

Selected: 0 of 3                                           Assign Resource Groups    Export

FIG.49

| USER ID | USER NAME | UG_ID bitmap | |
|---|---|---|---|
| 0x000 | User1 | 1000 0000... | ←BELONG TO UG1 |
| 0x001 | User2 | 0100 0000... | ←BELONG TO UG2 |
| 0x002 | User3 | 0010 0000... | ←BELONG TO UG3 |

FIG.50

| UGID | UG NAME | Role ID bitmap | RSG ID bitmap |
|---|---|---|---|
| 0x000 | UG1 | 1100 0000 0000... | 1000 0000... |
| 0x001 | UG2 | 1100 0000 0000... | 0100 0000... |
| 0x002 | UG3 | 1000 1110 0000... | 1110 0000... |

FIG.51

| Role ID | ROLE NAME | AUTHORITY BITMAP |
|---|---|---|
| 0x000 | STORAGE MANAGEMENT (PROVISIONING) | 1111 0000 0000... |
| 0x001 | STORAGE MANAGEMENT (LOCAL BACKUP) | 0000 0000 0000... |
| 0x002 | STORAGE MANAGEMENT (REMOTE BACKUP) | 0000 0100 0000... |
| 0x003 | ... | ... |
| 0x004 | SECURITY MANAGEMENT (REFERENCE/EDITING) | ... |
| 0x005 | STORAGE MANAGEMENT (RESOURCE MANAGEMENT) | ... |
| 0x006 | STORAGE MANAGEMENT (INITIALIZATION) | ... |
| ... | ... | ... |

FIG.52

| AUTHORITY BIT | NECESSARY RESOURCE TYPE | RESOURCE ID BITMAP |
|---|---|---|
| 0x00 (1ST BIT) (LDEV CREATION) | 0101 (LDEV AND PG) | 0000 1111 0000 1111... |
| 0x01 (2ND BIT) (ADD HOST TO HG) | 0010 (HG) | 0000 0000 1111 0000... |
| 0x02 (3RD BIT) (HG CREATION) | 1110 (LDEV, PORT, AND PG) | 1111 1111 1111 0000... |
| 0x03 (4TH BIT) (POOL CREATION) | 0100 (LDEV) | 0000 1111 0000 0000... |
| 0x04 (5TH BIT) (LOCAL COPY PAIR CREATION) | 0100 (LDEV) | 0000 1111 0000 0000... |
| 0x05 (6TH BIT) (REMOTE COPY PAIR CREATION) | 1100 (PORT AND LDEV) | 1111 1111 0000 0000... |
| ... | | ... |

FIG.53

| RSGID | RSG NAME | RESOURCE ID BITMAP |
|---|---|---|
| 0x000 | RSG1 | 0000 1100 1100 0000... |
| 0x001 | RSG2 | 0000 0011 0011 0000... |
| 0x002 | RSG3 | 1111 0000 0000 1111... |
| ... | ... | ... |

FIG.54

| RESOURCE ID BIT | RESOURCE | RESOURCE TYPE |
|---|---|---|
| 0x00 (1ST BIT) | Port#0000 | 1000(Port) |
| 0x01 (2ND BIT) | Port#0001 | 1000(Port) |
| ... | ... | |
| 0x04 (5TH BIT) | LDEV#0000 | 0100(LDEV#) |
| 0x05 (6TH BIT) | LDEV#0001 | 0100(LDEV#) |
| ... | ... | |
| 0x08 (9TH BIT) | HG#0000 | 0010(HG) |
| 0x09 (10TH BIT) | HG#0001 | 0010(HG) |
| ... | ... | |
| 0x0c (13TH BIT) | PG#0000 | 0001(PG) |
| 0x0f (16TH BIT) | PG#0001 | 0001(PG) |
| ... | ... | |

| UGID | UG NAME | Role ID bitmap | RSG ID bitmap |
|---|---|---|---|
| 0x000 | UG1 | 1100 0000 0000... | 1000 0000... |
| 0x001 | UG2 | 1110 0000 0000... | 0110 0000... |
| 0x002 | UG3 | 1000 1110 0000... | 1110 0000... |

FIG.59

| RoleID | ROLE NAME | AUTHORITY BITMAP |
|--------|-----------|------------------|
| 0x000 | STORAGE MANAGEMENT (PROVISIONING) | 1111 0000 0000... |
| ... | ... | ... |
| 0x007 | PROVISIONING TEMPORARY DATA | 0101 0000 0000... |
| ... | ... | ... |

FIG.61

| Role | AUTHORITIES | NECESSARY RESOURCE TYPE |
|---|---|---|
| PROVISIONING TEMPORARY DATA | ADD HOST TO HG | 0010(HG) |
| | POOL CREATION | 0100(LDEV) |
| STORAGE MANAGEMENT (LOCAL BACKUP) | LOCAL COPY PAIR CREATION | 0100(LDEV) |
| STORAGE MANAGEMENT (REMOTE BACKUP) | REMOTE COPY PAIR CREATION | 1100 (LDEV AND PORT) |

FIG.62

| NECESSARY RESOURCE TYPE BITMAP |
|---|
| 1110 |

FIG.63

| RSG | TEMPORARY RESOURCE TYPE BITMAP |
|---|---|
| RSG2 | 0000 |
| RSG3 | 0000 |

FIG.64

| RSG | TEMPORARY RESOURCE TYPE BITMAP |
|---|---|
| RSG2 | 0110<br>(LDEV AND HG) |
| RSG3 | 0000 |

FIG.65

| RSG | TEMPORARY RESOURCE TYPE BITMAP |
|---|---|
| RSG2 | 0110<br>(LDEV AND HG) |
| RSG3 | 1001<br>(PORT AND PG) |

FIG.67

| RSG | DETACHMENT TARGET RESOURCE |
|---|---|
| RSG2 | 0000<br>(NONE) |
| RSG3 | 0001<br>(PG) |

FIG.69

| RSGID | RSG NAME | RESOURCE ID BITMAP |
|---|---|---|
| 0x000 | RSG1 | 0000 1100 1100 0000... |
| 0x001 | RSG2 | 0000 0011 0011 0000... |
| 0x002 | RSG3 | 1111 0000 0000 1111... |
| ... | ... | ... |
| 0x*** | RSG3' TEMPORARY DATA | 1111 0000 0000 0000... |
| 0x*** | RSG4' TEMPORARY DATA | 0000 0000 0000 1111... |

| UGID | UG NAME | Role ID bitmap | RSG ID bitmap |
|---|---|---|---|
| 0x000 | UG1 | 1100 0000 0000... | 1000 0000... |
| 0x001 | UG2 | 0110 0001 0000... | 0110 0000... |
| 0x002 | UG3 | 1000 1110 0000... | 1111 0000... |

FIG.73

| Role ID | ROLE NAME | AUTHORITY BITMAP |
|---|---|---|
| 0x000 | STORAGE MANAGEMENT (PROVISIONING) | 1111 0000 0000... |
| 0x001 | STORAGE MANAGEMENT (LOCAL BACKUP) | 0000 0000 0000... |
| 0x002 | STORAGE MANAGEMENT (REMOTE BACKUP) | 0000 0100 0000... |
| 0x003 | ... | ... |
| 0x004 | SECURITY MANAGEMENT (REFERENCE/EDITING) | ... |
| 0x005 | STORAGE MANAGEMENT (RESOURCE MANAGEMENT) | ... |
| 0x006 | STORAGE MANAGEMENT (INITIALIZATION) | ... |
| 0x007 | PROVISIONING SELF-CREATED ROLE | 0101 0000 0000... |

FIG.74

| RSGID | RSG NAME | RESOURCE ID BITMAP |
|---|---|---|
| 0x000 | RSG1 | 0000 1100 1100 0000.... |
| 0x001 | RSG2 | 0000 0011 0011 0000.... |
| 0x002 | RSG3' | 1111 0000 0000 0000.... |
| 0x003 | RSG4 | 000 0000 0000 1111... |
| ... | ... | ... |

COMPUTER SYSTEM AND ITS CONTROL METHOD

TECHNICAL FIELD

The present invention relates to a computer system. Particularly, the invention relates to a computer system for partitioning resources for a storage system and allocating storage resource groups to a plurality of users, and a method for controlling such a computer system.

BACKGROUND ART

In the environment where data of a plurality of users such as a plurality of companies coexist in a storage system, there is an increasing need to operate and manage the storage system for each user, that is, the need for multi-tenancy. This multi-tenancy environment achieves efficient operation of storage resources and facilitation of the management thereof.

The multi-tenancy environment requires a mechanism for security so that, for example, a storage system administrator of each company will not destroy data (volumes) of other companies, data will not be leaked to other companies, and no influence will be exerted on the operation by storage administrators of other companies.

There is a known system for realizing a plurality of storage resource groups by logically partitioning storage resources in order to realize the above-described multi-tenancy environment. This system can realize the above-described multi-tenancy environment by allocating the logically-partitioned storage resource groups to individual companies. Incidentally, the storage resource(s) will be hereinafter abbreviated as the resource(s), and the storage resource group(s) will be hereinafter abbreviated as the resource group(s) (RSG(s)).

A resource group forming function requires a cache partitioning function and a resource partitioning function. The cache partitioning function logically partitions a cache in the storage system. The partitioned virtual caches are called [CLPR]. The resource partitioning function logically partitions resources (such as ports, CLPRs, parity groups, and LDEVs) in the storage system. The partitioned resources are called [SLPR].

A system for realizing conventional resource groups creates a resource group based on a CLPR number and an SLPR number. As an administrator of the storage system allocates each resource group to a host computer, a system for ensuring security between host computers can be realized without having I/O processing of a certain host computer affect other host computers.

By means of the above-described resource partitioning function, the administrator of the entire storage system (overall administrator) can set administrators (partitioned administrators) for the resource groups which are partitioned for different purposes and for different uses. As a conventional technique related to the resource partitioning function, there is, for example, a technique disclosed in Japanese Patent Application Laid-Open (Kokai) Publication No. 2006-185386.

CITATION LIST

Patent Literature

PTL 1: Japanese Patent Application Laid-Open (Kokai) Publication No. 2006-185386

SUMMARY OF INVENTION

Technical Problem

If the authorities of a superior administrator over a plurality of storage administrators the authorities of the plurality of storage administrators, and allocation of resources groups to their users are not properly operated in a configuration where the plurality of storage administrators are made to manage resources belonging to one company, there are problems of an imbalance in the allocation of the resources between a plurality of users and the inability to ensure information security between the pluralities of users.

Specifically speaking, when the superior administrator sets a certain authority to a certain storage administrator and intends to allocate a resource group required to enable this authority to this storage administrator, there is a problem such that a resource which is not intended by the superior administrator may be allocated to that storage administrator. For example, a case where a resource that should be shared by a plurality of storage administrators is allocated to a specific storage administrator and this storage administrator will exclusively possess the shared resource is particularly problematic.

So, it is an object of this invention to provide a computer system and its control method capable of preventing allocation of a resource(s), which is not intended by the superior administrator, to a certain storage administrator even when the superior administrator sets a certain authority to that storage administrator and intends to allocate a resource(s), which is required to enable this authority, to the storage administrator.

Solution to Problem

In order to achieve the above-described object, the computer system and its control method according to the present invention is designed so that when the superior administrator sets a certain authority to a certain storage administrator and intends to allocate a resource(s), which is required to enable this authority, to that storage administrator, allocation of a resource(s), which is not intended by the superior administrator, to that storage administrator is prevented by optimizing allocation of the resource groups and authorities to the storage administrator.

An embodiment of this invention is characterized in that a computer system includes a storage system for controlling read access or write access from a host computer to a storage device; and a management device for managing a plurality of resources for the storage system and a plurality of users sharing the storage system; wherein the storage system includes: a plurality of resource groups respectively defined by grouping of the plurality of resources; a storage area for storing management information of the plurality of resource groups and association information between the plurality of resources and the plurality of resource groups; and a plurality of user groups defined by grouping of the plurality of users, each of the user groups being allocated to at least one of the plurality of resource groups; wherein based on login of at least one user from among the plurality of users, the management device has the storage system execute operation permitted by an authority allocated to the user group, to which the relevant user belongs, on the resource group allocated to the user group; and wherein a range of the authority allocated to the user group and a range of the resource group are optimized.

The present invention is designed so that the range of executable operations for the management user is decided based on the authority granted to a user group, to which the user belongs, and a resource group allocated to the user group. So, it is possible to allocate the resources between the pluralities of users in a balanced manner and ensure information security between the users.

Advantageous Effects of Invention

Even when the superior administrator sets a certain authority to a certain storage administrator and intends to allocate a resource(s), which is required to enable this authority, to this storage administrator, a computer system and its control method capable of preventing allocation of a resource(s), which is not intended by the superior administrator, to that storage administrator is provided according to this invention.

BRIEF DESCRIPTION OF DRAWINGS

FIG. 4 is a block configuration diagram of the storage system in a state where one resource group is set to the storage system.

FIG. 5A is a management table showing the correspondence relationship between logical volume (LDEV) IDs and their assigned resource group IDs and is an example of the management table before a resource group is set to the storage system.

FIG. 5B is an example of the management table of logical volumes after the resource group is set to the storage system.

FIG. 6A is an example of a management table of parity groups before a resource group is set to the storage system.

FIG. 6B is an example of the management table of parity groups after the resource group is set to the storage system.

FIG. 7A is an example of a management table of host groups before a resource group is set to the storage system.

FIG. 7B is an example of the management table of host groups after the resource group is set to the storage system.

FIG. 8A is an example of a management table of ports before a resource group is set to the storage system.

FIG. 8B is an example of the management table of ports after the resource group is set to the storage system.

FIG. 9 is an example of a table for managing resource group IDs.

FIG. 12 is a user group ID bitmap table for managing identification of user groups, to which the users belong, by using bitmaps.

FIG. 13 is an authority bitmap table for managing authorities of the user groups by using bitmaps.

FIG. 15A is a table in which operation authorities that can be executed by management users with respect to the storage system are associated with each role.

FIG. 15B is a role information table.

FIG. 15C is an authority bitmap table.

FIG. 15D is a resource group information table

FIG. 15E is a resource ID bitmap table.

FIG. 16 is a resource group ID bitmap table for managing resource groups allocated to the user groups by using bitmaps.

FIG. 17 is an example of a session management table for managing user login sessions.

FIG. 19 is an example of an LDEV configuration information table after the storage system is partitioned into a plurality of virtual systems.

FIG. 20 is an example of a parity group configuration information table after the storage system is partitioned into a plurality of virtual systems.

FIG. 21 is an example of a host group configuration information table after the storage system is partitioned into a plurality of virtual systems.

FIG. 22 is an example of a port configuration information table after the storage system is partitioned into a plurality of virtual systems.

FIG. 30 is a management table showing an example of LDEV configuration information in the form where the plurality of resource groups are formed in the in-house virtual private storage system (FIG. 23).

FIG. 31 is a management table showing an example of parity group configuration information in the form where the plurality of resource groups are formed in the in-house virtual private storage system (FIG. 23).

FIG. 32 is a management table showing an example of host group configuration information in the form where the plurality of resource groups are formed in the in-house virtual private storage system (FIG. 23).

FIG. 33 is a management table showing an example of port configuration information in the form where the plurality of resource groups are formed in the in-house virtual private storage system (FIG. 23).

FIG. 34 is a management table showing an example of LDEV configuration information in the form where the plurality of resource groups are formed in the in-house virtual private storage system (FIG. 28).

FIG. 35 is a management table showing an example of parity group configuration information in the form where the plurality of resource groups are formed in the in-house virtual private storage system (FIG. 28).

FIG. 36 is a management table showing an example of host group configuration information in the form where the plurality of resource groups are formed in the in-house virtual private storage system (FIG. 28).

FIG. 37 is a management table showing an example of port configuration information in the form where the plurality of resource groups are formed in the in-house virtual private storage system (FIG. 28).

FIG. 38 is a bitmap table for bitmap management of the correspondence relationship between the user groups and the resource groups in the form where the plurality of resource groups are formed in the in-house virtual private storage system (FIG. 28).

FIG. 39 is an example of a management table for specifying the relationship between LDEVs and provisioning types.

FIG. 45 is a GUI screen displayed by the external management terminal in step 1820 of FIG. 18.

FIG. 49 is a user information table before optimization.

FIG. 50 is a user group information table before optimization.

FIG. 51 is a role information table before optimization.

FIG. 52 is an authority-resource association table before optimization.

FIG. 53 is a resource group information table before optimization.

FIG. 54 is a resource information table before optimization.

FIG. 59 is an example of the role information table to which temporary data of a new role is set as a result of the optimization processing.

FIG. 61 is a necessary resource type table showing a resource type necessary to execute the authority of a user group which is an optimization target.

FIG. 62 is a necessary resource type bitmap.

FIG. 63 is a table showing an initial form of a resource type bitmap belonging to each of RSG2 and RSG3 in the configuration shown in FIG. 47.

FIG. 64 is a bitmap showing resource types belonging to RSG2 which belongs to UG2 in FIG. 47.

FIG. 65 is a bitmap showing resource types belonging to RSG3 which belongs to UG2 in FIG. 47.

FIG. 67 is a bitmap of a resource type that should be detached from a user group.

FIG. 69 is the resource group information table which is set by the flowchart in FIG. 68.

FIG. 73 is the role information table after optimization.

FIG. 74 is the RSG information table after optimization.

DESCRIPTION OF EMBODIMENTS

Figure 1:
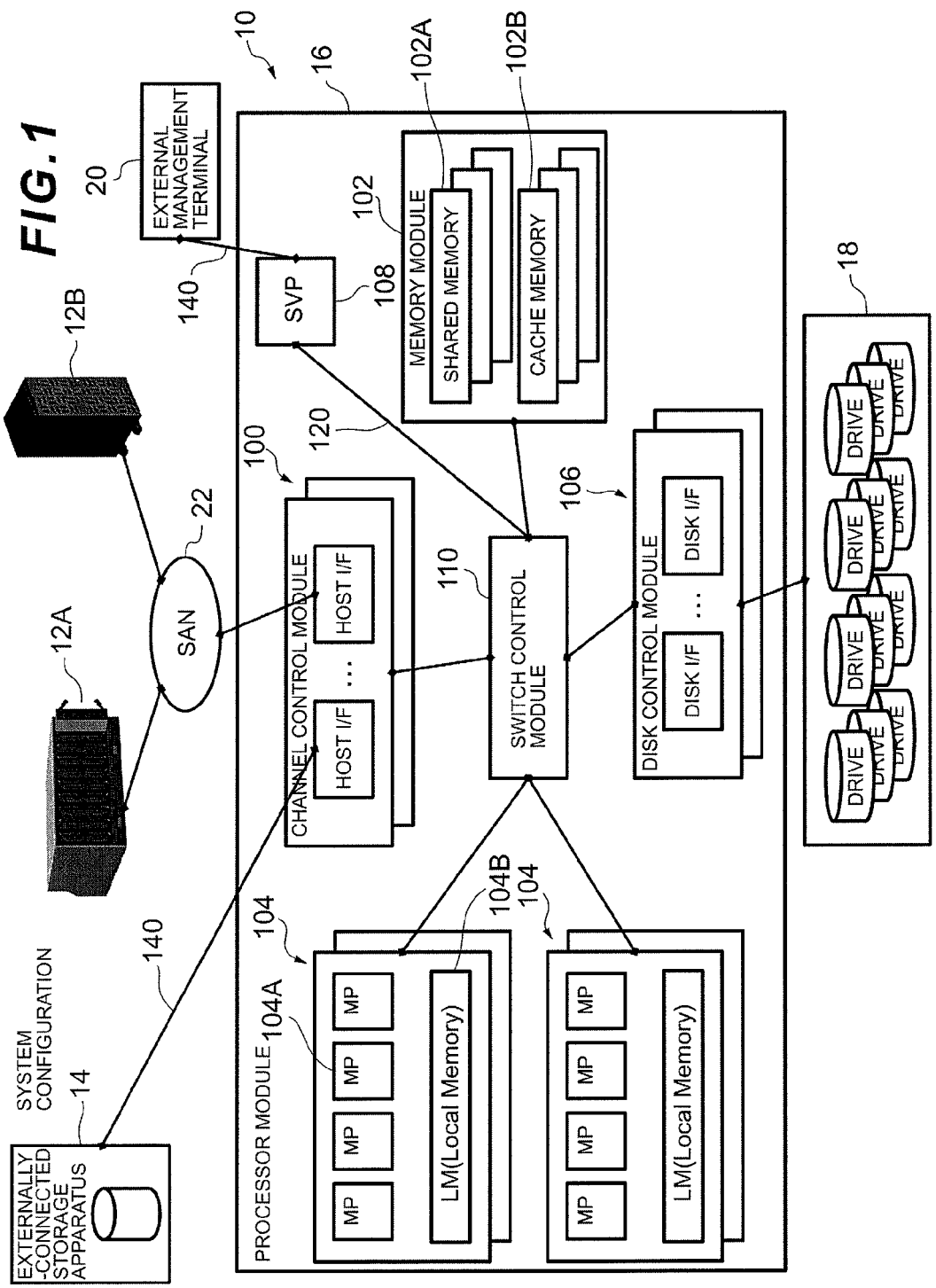
FIG. 1 is a hardware block diagram of a computer system according to an embodiment.

An embodiment of the present invention will be explained with reference to each of the attached drawings. FIG. 1 shows overall hardware of a computer system according to this embodiment. The computer system includes a storage system 10 and a plurality of host computers 12 (12A, 12B). The storage system 10 includes a storage controller 16 and a storage driving device 18. An external connection storage apparatus 14 may be connected to the storage system 10. The storage controller 16 and the storage driving device 18 may be contained in the same chassis or may be placed in separate chassis and connected via a network.

Examples of the storage driving device 18 include hard disk drives, solid state drives, and optical disk drives. The storage controller 16 executes data read/write processing on the storage driving device 18 in accordance with commands received from the host computer 12 and executes various processing for, for example, setting and changing configuration information of the storage system when receiving commands from the host computer 12.

The host computer 12 is a computer device equipped with, for example, a CPU and a memory. The host computer 12 is a host system such as a server, a workstation, or a mainframe computer and is used for a large-scale data management system such as an automated teller machine of banks or an airplane seat reservation system. Different users operate the storage system by using each host computer 12. The user means, for example, a company or each division of a company.

The host computer device 12 is connective via, for example a SAN 22, to the storage system 10. The SAN 22 is a network for sending data to, and receiving data from, the host computer 12 in blocks which are data management units for storage resources provided by the storage driving device 18. An example of a communication protocol between the host computers 12 and the storage system 10 via the SAN 22 is Fibre Channel protocol. The host computer 12 and the storage system 10 may be connected via, for example, a LAN or directly without the intermediary of any network. A LAN 140 is used as an intermediary to connect the external storage apparatus 14 and the storage system 10 and to connect the external management terminal 20 and the SVP 108, respectively.

A plurality of hard disk drives 18 as the storage driving device constitute a plurality of parity groups (also called RAID groups) and a logical storage area of each parity group is partitioned to constitute logical volumes (LDEVs).

The storage controller 16 includes a channel control module 100, a memory module 102, a processor module 104, and a disk control module 106 and is further connected to a management terminal called an SVP (Service Processor) 108. Furthermore, the storage controller 16 includes a switch control module 110 for mutually connecting devices such as the channel control module 100 via an internal LAN and receiving and delivering data and commands. The switch control module 110 is composed of, for example, a crossbar switch.

The channel control module 100 is connected via the SAN 22 to the host computer 12. Ports of the channel control module 100 for connecting to the SAN 22 are a target port whose attribute is to receive commands, and an external port or initiator port whose attribute is to issue commands. The channel control module 100 includes communication interfaces (host I/Fs) to communicate with the host computers 12 and has a function sending, for example, data and commands to, and receiving them from, the host computer 12.

The processor module 104 executes processing on host I/O such as reading data from, and writing data to, logical volumes. The processor module 104 includes a plurality of microprocessors (MPs) 104A and a local memory (LM) 104B for recording microprograms and control data for the MPs.

The disk control module 106 has communication interfaces (disk I/Fs) with a plurality of hard disk drives (HDD) 18 for storing data and executes input/output of commands and data to/from the HDDs 18. Incidentally, the channel control module 100, the processor module 104, and the disk control module 106 are formed into chips and a plurality of chips of each module are mounted in the storage controller 16 from the viewpoint of redundancy.

The memory module 102 includes a plurality of shared memory modules 102A and a plurality of cache memory modules 102B. Both the shared memory modules 102A and the cache memory modules 102B are shared by the channel control module 100, the processor module 104, and the disk control module 106. The shared memory modules 102A are used to store, for example, control information and commands and the cache memory modules 102B are used to temporarily store data.

The SVP 108 is a control means for maintaining and managing the storage system 10 and is connected to the external management terminal 20 via the LAN 140. An overall management user serving as a superior administrator manages the resources of the entire storage system 10 by accessing a storage management program for the SVP 108 via a GUI of the external management terminal 20. A partitioned management user, that is, a storage administrator who executes an assigned authority on the resources allocated to themselves, also accesses the resources, which are targets to be managed, by accessing the GUI of the external management terminal 20 via its own client computer. The user may manage the resources by an in-band method of accessing the storage system via a management server as a host computer instead of an out-of-band method via the SVP 108. Incidentally, the reference numeral 120 is an internal LAN for connecting the SVP 108 and the switch control module.

The resources include physical resources and logical resources. Furthermore, the resources include storage resources for data storage and resources for control. Examples of the resources are as follows. Examples of the physical resources include ports of the channel control module 100, parity groups (PG) constituted from a plurality of HDDs, the cache memories (CLPR), ownership of the microprocessors, and ports. Examples of the logical resources include attributes of the ports, host groups (HG) belonging to the ports, and logical volumes (LDEV). Management of the resources means to perform various operations on the resources such as to partition resources and set resource groups in accordance with the authority over the user resources, set or change the attributes of the resources, create a new resource, allocate the resource, and change the allocation of the resource.

The overall management user is granted the authority to manage the overall resources of the storage system and is also called a security administrator because the overall management user manages the security of the system. The overall management user can have an operation authority over RSGs. The partitioned management user is granted the authority to be capable of managing the resources within the range of a resource group(s) allocated to themselves. A plurality of user groups are set to the aforementioned storage system 10 so that a plurality of users can manage the resource groups. For example, a company has an overall management user group(s) and user groups for management of each division of the company. Not only a resource group is set to each user group, but also the authority over the resource group is granted to each user group. The content of operations that can be executed by the user group on the resource is decided according to characteristics of the relevant resource such as the content of the authority of the user group, and the type, range, capacity, and quantity of the allocated resource group(s). For example, physical resource groups and logical resource groups are allocated to a user group(s), while only logical resource groups are allocated to another user group. A user who is expected to be in charge of management for the system operation and maintenance is assigned the authority to enable extensive operations to carry out the system operation and maintenance, as well as resource groups including physical resource groups, logical resource groups, physical resources, and logical resources. On the other hand, a user who is expected to take charge of management to use the system is assigned the authority enough to implement the utilization of the system, as well as logical resource groups.

Figure 2:
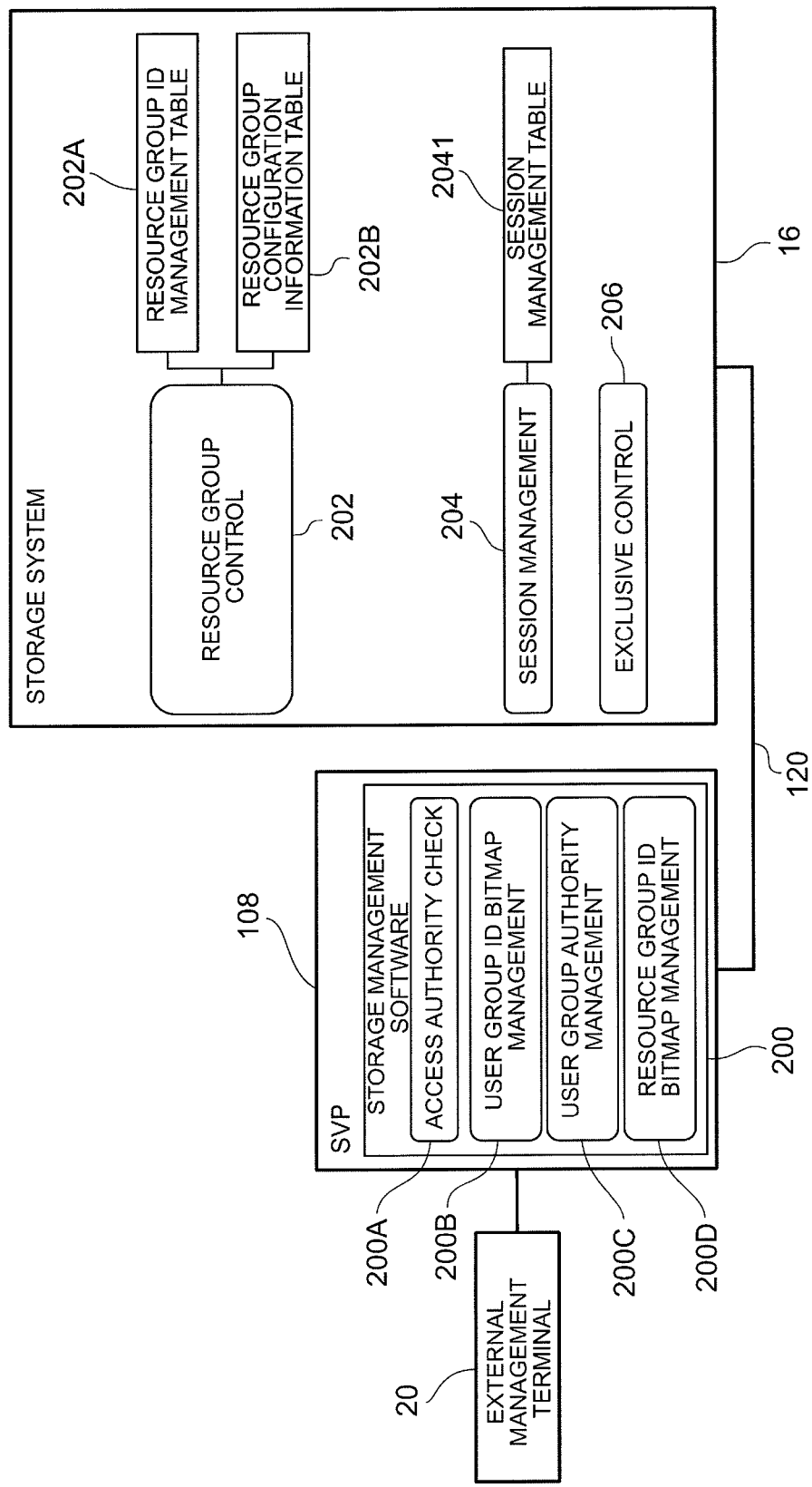
FIG. 2 is an example of a functional block diagram for implementing a user group and resource group management function of the computer system.

FIG. 2 is an example of a functional block diagram for implementing a user group and resource group management function of the computer system. The SVP 108 is equipped with storage management software 200 and a GUI for input to, and output from, the storage management software operates on the external management terminal 20. The storage management software 200 performs a user access authority check 200A, user group bitmap management 200B, user group authority management 200C, and resource group ID bitmap management 200D. Furthermore, the microprogram of the processor module for the storage system 10 realizes resource group control 202. A resource group ID management table 202A and a resource group configuration information table 202B are applied to the resource group control 202. Furthermore, the storage system 10 performs user login session management. A session management table 2041 is applied to the session management 204. Then, the storage system 10 performs exclusive control 206 of sessions.

The computer system is characterized in that it partitions the resources of the storage system 10 into a plurality of virtual systems and further allocates the resources of the virtual systems to a plurality of user groups, and delegates resource groups to the authority of the user groups. This sequence of steps will be explained with reference to the relevant drawings.

Figure 3:
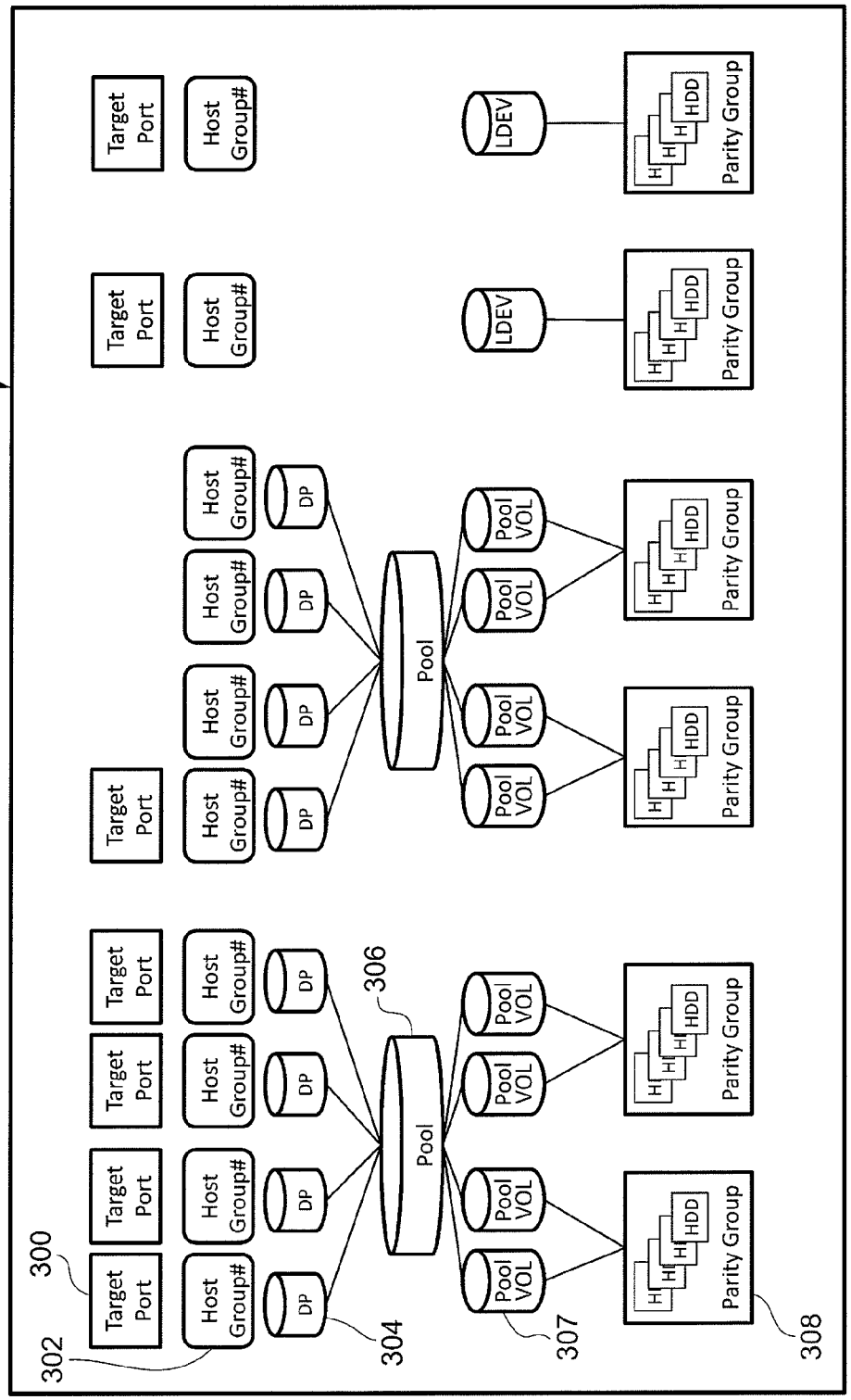
FIG. 3 is a block configuration diagram of a storage system before a resource group(s) is set.

FIG. 3 shows a block configuration of the storage system before a resource group (RSG) is set. Since all users can operate all RSGs in this state, it is impossible to ensure sufficient security and performance. The storage system is equipped with dynamic provisioning. Specifically speaking, logical volumes (LDEV: pool volumes) 307 are allocated from parity groups 308 to pools 306 and a storage area is allocated from the pools 306 to capacity-virtualized logical volumes (LDEV: DP volumes) 304 in accordance with write access from the host computer 12. The storage system 10 has physical ports 300, from which paths to the host computers 12 are formed, and the ports are associated with host groups 302. If a plurality of servers refer to one logical module, the plurality of servers are defined as a group, which is a host group. Examples of the physical resources include the ports 300 and the parity groups 308. On the other hand, examples of the logical resources include the pool volumes 307, the pools 306, the DP volumes 304, and the host groups 302.

If the overall management user validates RSG settings in the storage system by accessing the management terminal, all resources 400 are made to temporarily belong to a resource group (resource group name: RSG0) with a specific resource group ID (ID=0x0000) as shown in FIG. 4. The correspondence relationship between each resource and the resource group will be explained later with respect to a configuration information table. Referring to FIG. 4, UG0 represents a user group to which the overall management user belongs and UG0 is granted the overall management authority over the storage system.

In the state where all the resources of the storage system 10 belong to the same resource group (RSG0), a plurality of users can refer to all the resources and it is impossible to ensure security. So, from the viewpoint of ensuring security and implementing the operation of the storage system in an suitable manner, the computer system 10 is designed so that grouping of the resources of the storage system into a plurality of RSGs is performed by a user belonging to the overall management user group (UG0) having a specific authority (security system authority). Incidentally, the partitioned management user has a plurality of authorities, which will be explained later. The authorities are granted to not the user(s) themselves, but to the user group(s) (hereinafter sometimes abbreviated as UG(s)) as described above and the authorities of the user(s) are decided depending on which UG the relevant user belongs to.

Next, the configuration information table (FIG. 2: 202B) of each resource group (RSG) will be explained. In this explanation, changes in the table before and after setting an RSG to the storage system 10 will be explained. FIG. 5A shows the correspondence relationship between a logical volume (LDEV) ID and an assigned resource group ID and is a table before the resource group (RSG0) is set to the storage system. FIG. 5B is a table after the resource group (RSG0) is set to the storage system. A validity flag is used to manage the RSG setting status; and if an RSG is set, the validity flag changes from [0 (invalid)] to [1 (valid)]. Since all the resources are set to RSG0 as described above, all the validity flags are set to [1]. When the validity flags in the table are changed, all the resources (LDEV) are made to belong to RSG0 (ID=0x0000). This resource group configuration information table is stored in the shared memory 102A for the storage system 10. The LDEVs include pool volumes and virtual volumes as described earlier.

FIG. 6A and FIG. 6B are tables about parity groups, FIG. 7A and FIG. 7B are tables about host groups, and FIG. 8A and FIG. 8B are tables about port groups). The difference between [A] and [B] is the same as the difference between FIG. 5A and FIG. 5B. The correspondence relationship between the resource group ID and each resource, and the change of the validity flag are also the same as those in FIG. 5A and FIG. 5B.

Together with the above-mentioned resource group configuration information tables (FIGS. 5A and 5B), the resource group ID management table 202A in FIG. 9 is stored in the shared memory 102A for the storage system. The resource group ID management table 202A is used to associate a resource group ID with a resource group name. Furthermore, a [locked login session ID] in the resource group ID management table 202A is intended to prevent an RSG (resource group), which is being operated by a user, from being operated by another user. The [session ID] is assigned to login of a user and is set when locking it against login by another user. FIG. 9 shows that a user connects to RSG1 to RSG3, RSG11, and RSG12 with a [session ID=0101] and is operating these resource groups. The configuration of RSGs other than RSG0 will be described later.

Figure 10:
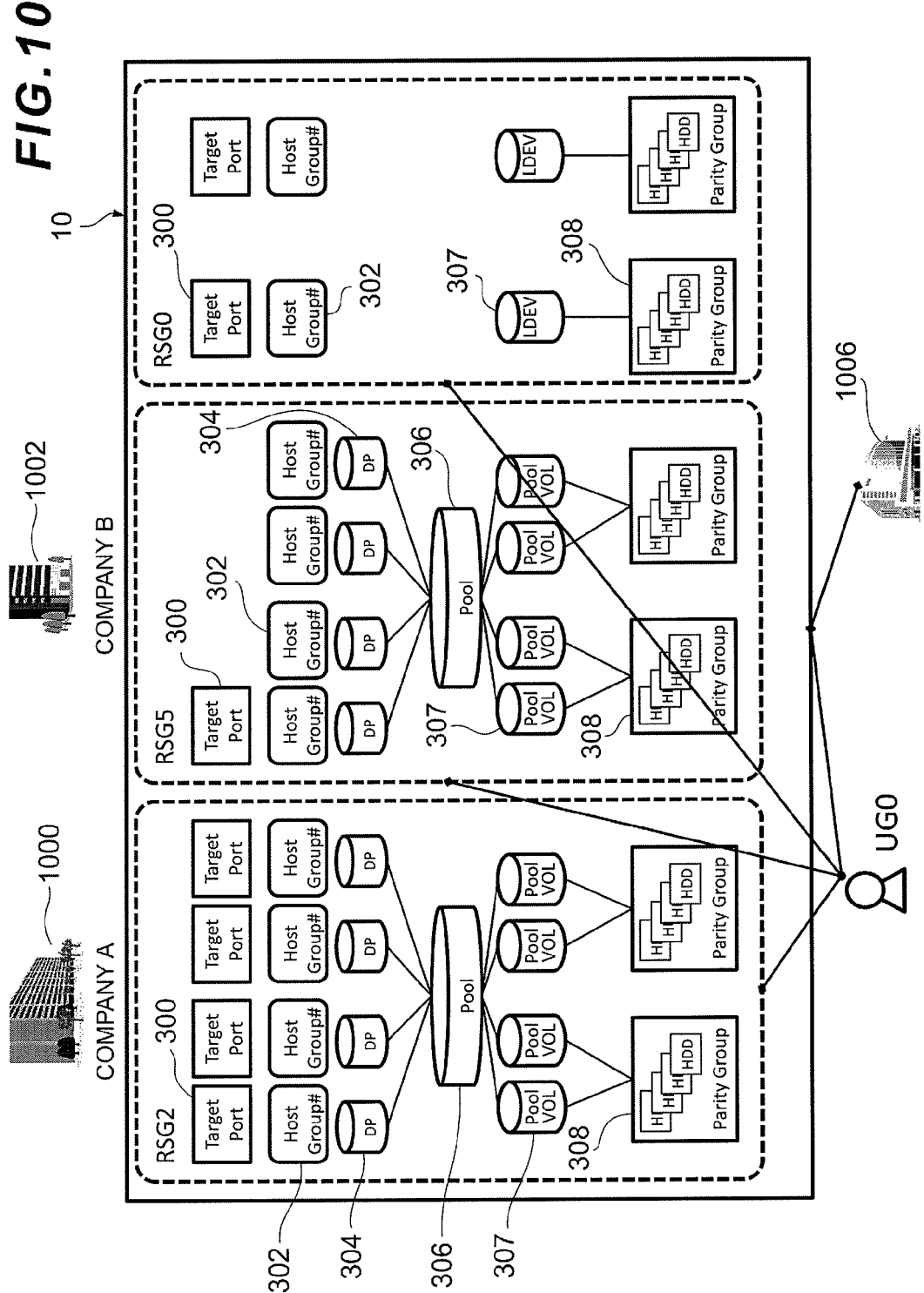
FIG. 10 is a block diagram of the storage system in a state where the resources for the storage system are partitioned and grouped into a plurality of virtual private storage systems.

After the resources of the storage system are set to RSG0, the overall management user partitions the storage system into a plurality of virtual storage systems as shown in FIG. 10. For example, a management user (who belongs to UG0) of a data center 1006 manages the storage system 10, partitions the storage system 10 into a plurality of virtual (private) storage systems, and allocates them to different companies. For example, RSG2 is allocated to company A (1000) and similarly RSG5 is allocated to company B (1002).

As UG0 is assigned the authority (security authority) to be capable of managing all the resources of the storage system 10, the management user belonging to UG0 can cut out RSG2 and RSG5 from RSG0 of the storage system and define a plurality of virtual (private) storage systems in the storage system 10 for each company as shown in FIG. 10. The virtual storage system composed of RSG2 is for company A and the virtual storage system composed of RSG5 is for company B. RSG2, RSG5, and RSG0 are allocated to UG0 in order to realize the management of RSG2 and others. Incidentally, the logical resources such as the host groups 302, the virtual volumes 304, and the pools 306 may be defined and set by users who use the virtual systems (a user of company A or a user of company B).

Under the above-described circumstance, the assigned resource group ID (ID of a resource group to which the relevant resource belongs) corresponding to the resource ID in the resource configuration information tables (FIGS. 5A, 5B to FIGS. 8A, 8B) is changed along with a change from the state in FIG. 4 to the state in FIG. 10. Specifically speaking, when the management user UG0 changes the resource group configuration information table 202B for the shared memory 102 via the external management terminal 20 and the SVP 108, the storage system 10 changes the configuration of the resource groups in accordance with the change of the tables. The resources remaining after cutting out RSG2 and RSG5 from RSG0 remain in RSG0. Incidentally, a state of RSG0 with no resource is permissible as one management state. A physical resource added to the storage system is made to temporarily belong to RSG0 and will then be moved or distributed from RSG0 to an RSG of each virtual storage system under the authority of UG0.

Figure 11:
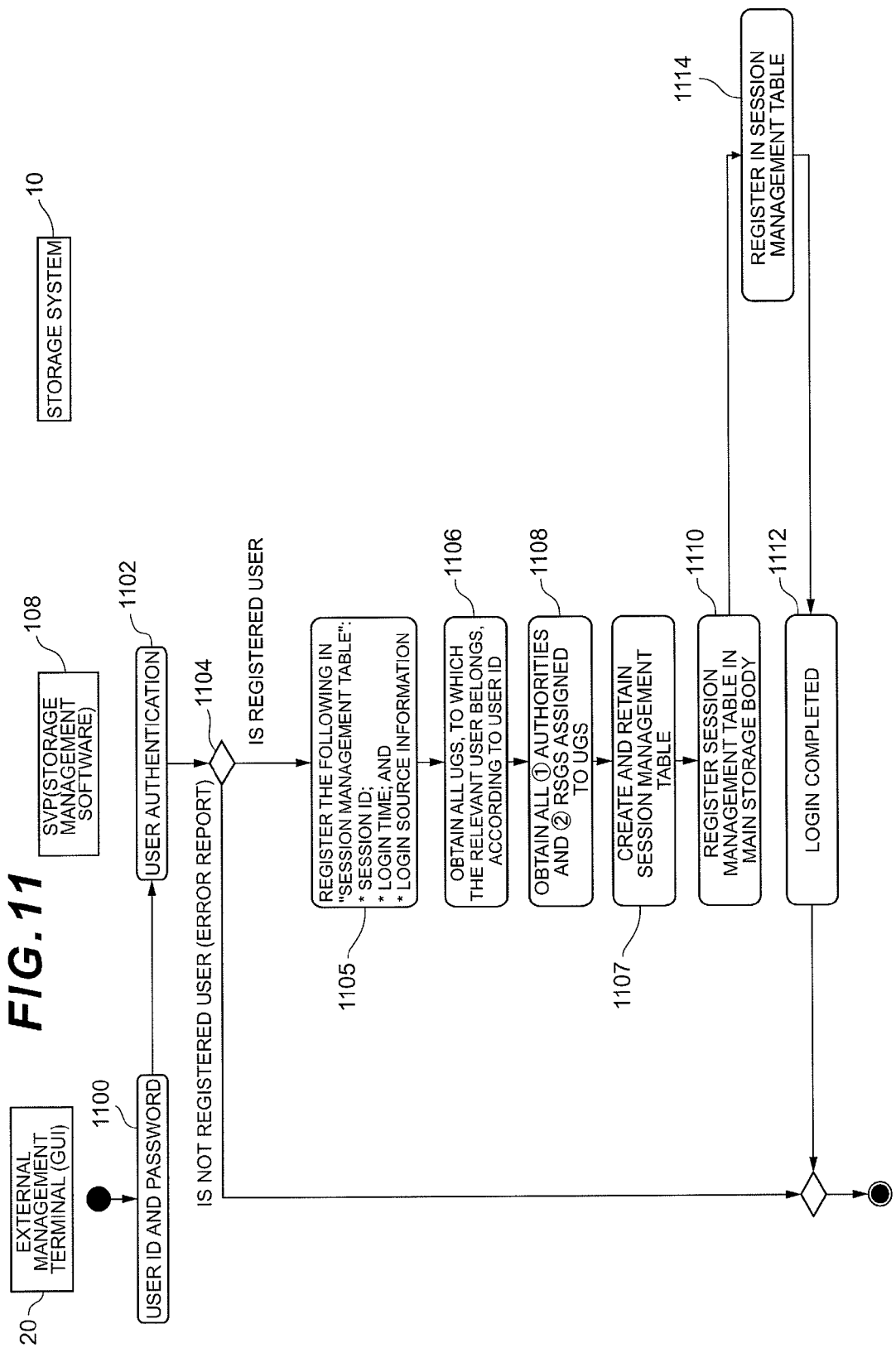
FIG. 11 is a flowchart of an example of processing for logging into an external management terminal of a user.

The above-described processing sequence for partitioning the storage system into the virtual storage systems is implemented by cooperation between the storage management software 200 for the SVP 108 and the microprogram for the storage system 10. FIG. 11 is a flowchart for processing user login.

After the overall management user inputs a user ID and a password to the GUI of the external management terminal 20 (1100), the input information is sent to the storage management software 200 for the SVP 108 and the SVP performs user authentication (1102). If it is determined as a result of the user authentication judgment (1104) that the login user is not a registered user, the SVP sends an error report to the GUI of the external management terminal. If it is determined as a result of this judgment that the login user is a registered user, the SVP sets a session ID to the login and registers login time and login source information in a session management table (1105). The session management table will be explained later. The login source information includes, for example, the user ID, password, and IP address.

Next, the SVP obtains necessary information to judge what type of authority on which RSG the login user has. The SVP firstly obtains, as necessary information, all UGs to which the relevant user belongs, based on the user ID of the login user by referring to a user group ID bitmap table 1200 in FIG. 12 (1106). The user group ID bitmap table 1200 is created by the overall management user for the purpose of the user group ID bitmap management 200B (FIG. 2) at the time of registration of each user and is registered in a memory area in the SVP 108. The user group ID bitmap table manages the user groups, to which the relevant user belongs, for each user by using bitmaps and each bit of the bitmaps corresponds to an individual user group. A user is specified by its user ID and user name.

For example, regarding a user whose user name is [User2], a bit at the third position in the user group ID bitmap is [1], which indicates that it belongs to UG2 (the user group ID=0x02). If one user belongs to a plurality of UGs, [1] is set to bits at a plurality of positions corresponding to a plurality of user group IDs. For example, according to the bit positions to which [1] is set, User20 belongs to three user groups (user group IDs=0x0a, 0x0b, 0x10).

Next, after deciding the user group(s) of the login user, the SVP obtains role information and resource group information allocated to that user group (1108). The SVP refers to an authority bitmap table 1300 in FIG. 13 in order to obtain the role information. A role is a collection of a plurality of authorities to deal with a use cases such as provisioning, local backup, or remote backup, and is a logical set of authorities. The authorities are the individual operation content to implement the relevant role. The authority bitmap table 1300 is used to execute the user group authority management 200C (FIG. 2) and a role is set to each user group and registered in a bitmap form. This bitmap is called a role ID bitmap. The authority bitmap table 1300 is recorded in the memory for the SVP 108.

When defining a user group (UG), the overall management user registers a role ID bitmap in the authority bitmap table 1300. A role corresponding to a bit, to which [1] is set, in the bitmap is set to a user group. If the user belongs to a plurality of user groups, the role obtained by OR operation of the role ID bits allocated to each user group are granted to the user.

Figure 14:
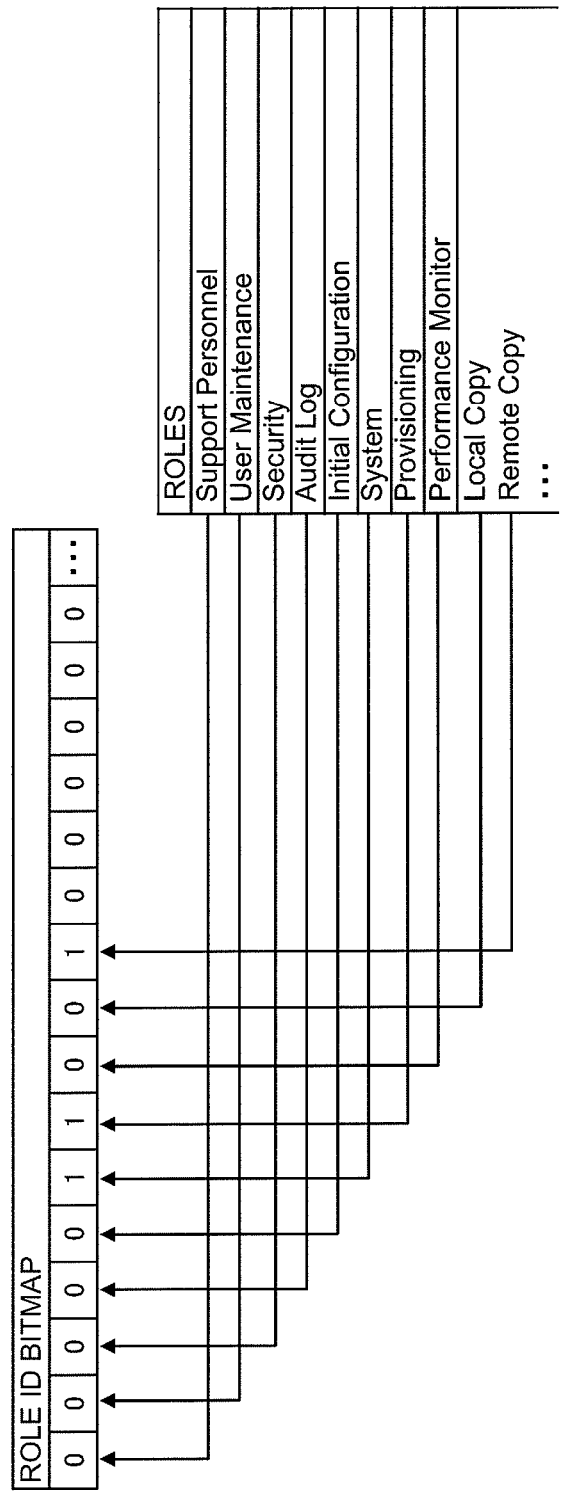
FIG. 14 is a table showing an example of the correspondence relationship between an authority bitmap and authorities.

Also, the correspondence relationship between miscellaneous roles relating to the storage system and corresponding to each bit in the role ID bitmap is as shown in FIG. 14. Furthermore, the content of operation authorities which can be executed by the overall or partial management user with respect to the storage system under each role is as shown in FIG. 15A. For example, a user whose user name is (User0) belongs to the user group (UG0) according to FIG. 12. Then, regarding the role corresponding to this user group, the third bit in its role ID bitmap is set on according to the authority bitmap table (FIG. 13), so the [security] role is granted to the user, whose user name is [User0], according to FIG. 14. The correspondence relationship in the authority bitmap between the bitmap and the role information, as well as control information relating to the correspondence relationship of the operation authorities permitted for the role information are set to the memory for the SVP 108 by the overall management user (UG0) in advance. In a case of in-band processing, the SVP is accessed from the server via the storage apparatus at the time of login from the in-band and resource group information and authority information relating to the login user are obtained and temporarily retained in the software operating on the server. Whether the configuration can be changed or not is judged based on such information.

The correspondence relationship between roles and operation authorities in FIG. 15A is summarized in a role information table (FIG. 15B). A role ID, a role name, and an authority bitmap correspond to each other in the role information table. Each bit of the authority bitmap corresponds to an operation authority as shown in FIG. 15C. For example, the first bit corresponds to LDEV creation and the second bit corresponds to LDEV deletion. A set of operation authorities for which a flag is set to the authority bitmap constitutes a role.

An RSG information table (FIG. 15D) summarizes each piece of information shown in FIGS. 5A, 5B to FIGS. 8A, 8B, using resource groups as a key. An RSG ID, an RSG name, and a resource ID bitmap correspond to each other in the RSG information table. Each bit in the resource ID bitmap also corresponds to each resource ID. Each table shown in FIG. 15B to FIG. 15E is also recorded in the shared memory 102A for the storage controller 16.

Reference is made to a resource group ID bitmap table 1600 in FIG. 16 in order to obtain information about RSGs allocated to the user groups (UG). This resource group ID bitmap table 1600 is used to manage allocation of the resource group(s) to each user group for the purpose of the resource group ID bitmap management 200D (FIG. 2). If a user belongs to a plurality of user groups, resource groups corresponding to a bit string obtained by OR operation of bits in the resource group ID bitmap allocated to each user group are resource groups regarding which access by the login user is permitted. For example, if the login user belongs to a plurality of user groups (UG11, UG12), resource groups (RSGs) allocated to each user group are specified by [0001 0000 0000 0000 0100 . . . ] and [0001 0000 0000 0000 0010 . . . ] as shown in FIG. 16, so that the login user can access RSGs corresponding to a bit string [0001 0000 0000 0000 0110 . . . ] obtained by OR operation of the above bitmaps, that is, three RSGs (RSG ID=0x03, 0x11, 0x12) and operate these RSGs. The resource group ID bitmap table 1600 is also set by the overall management user to the memory for the SVP 108 at the time of user registration.

After completing the acquisition of the authority information (authority bitmap) and the RSG information (resource group ID bitmap) allocated to the login user, the SVP 108 updates and registers such information, together with the session ID generated at the time of the user login, in a session management table 1700 (FIG. 17) for the purpose of the session management 204 (FIG. 11: 1107, 1110). For example, a session whose session ID is [0101] is based on login of User0. The resource group ID bitmap and the authority bitmap, which are allocated to the login user to whom the relevant session ID is set, are registered for each session ID in the session management table 1700. The SVP 108 sends the session management table 1700 to the storage system 10 and the storage system 10 updates and registers the session management table in the shared memory 102A. After receiving completion notice from the processor 104 for the storage system, the SVP 108 completes the login (1112). The SVP 108 registers the authority of the relevant user and the information about the RSG(s) which is a management target(s), together with the session ID generated at the time of the user login, in the session management table 1700 and notifies the storage system of such registration, thereby enabling the storage system to check various resources for the login user, whether it is possible to operate those resources, and the authority.

An integrated management user who manages all resources of the storage system even after the resources of the storage system are partitioned into a plurality of virtual storage systems is required. So, the SVP makes UG0, who has the security authority even after setting the plurality of virtual storage systems continue to have the access authority over all the resources. The SVP keeps the bits [1] for the existing resource groups; and even when a new resource group is set or added to the storage system, the SVP automatically sets [1] to the new resource group. As a result, the integrated management user does not have to add every new RSG to UG0 every time an RSG is created or set. The ability of UG0 to access all the resource groups can be explained by the fact that all bits in the resource group ID bitmap for UG0 are [1] in FIG. 16.

Next, after the resource groups are validated in the storage system 10, the overall management user logically partitions the storage system into a plurality of systems for different companies as shown in FIG. 10 described earlier. This processing will be explained with reference to a flowchart in FIG. 18. When User0 (UG0) succeeds in login to the storage management software, the session management table is registered in the SVP 108 (FIG. 17). In response to a request from the external management terminal 20, the SVP 108 obtains the authority bitmap and the resource group ID bitmap of the login user from the session management table and sends them to the external management terminal 20 (1806).

The external management terminal 20 judges whether or not the login user has the security authority which is the authority for overall management. Since the login user (User0) has the security authority and has the right to access all the resources of the storage system, the external management terminal 20 requests lists of user groups and storage groups existing in the storage system from the SVP 108 (1808). After receiving this request, the SVP refers to the user group ID bitmap table 1200 (FIG. 12) and the resource group ID bitmap table 1600 (FIG. 16) and sends a user group list, to which bits are set, and a resource group list, to which bits are set, to the external management terminal 20 (1810). The user group list includes information about the correspondence relationship the user ID, the user name, and the user group ID and is or corresponds to a user group ID bitmap. The resource group list includes information about the correspondence relationship each resource ID and the resource group ID of a resource group, to which the relevant resource belongs, and is or corresponds to a configuration information table showing the relationship between the aforementioned resource ID and the resource group ID. If the login user has the authority other than the security authority, processing in and after step 1808 will not be executed and the operation other than the security authority will be performed.

The GUI of the external management terminal displays the user group list information and the resource group list information. The login user inputs the setting of a new resource group(s) ID to the related resource ID with respect to the list information in order to realize the form of target virtual storage systems, that is, virtual storage systems for company A and company B respectively as shown in FIG. 10 (1812). After finishing inputting the data, the external management terminal 20 sends the input data to the SVP 108. The SVP which has received the input data judges whether the resource group(s), which have been set or updated in order to configure the virtual storage system, is appropriate or not. In other words, the SVP judges whether or not the minimum resources required to configure the virtual storage system exist with respect to these resource groups. The minimum resources are physical resources, for example, parity groups and target ports. If these resources do not exist in the resource group, a data storage system for the host computer cannot be realized.

The above-mentioned judgment includes, for example, judgment (1) and judgment (2) described below. If an affirmative judgment is returned for either judgment (1) or judgment (2) with respect to the resource group allocated to the virtual storage system, it is determined that the resource group is appropriate.

Judgment (1): the resource group should include at least one of each of resources which are target ports, host groups, LDEVs, and parity groups. This judgment (1) is the basis assuming a case where the virtual storage system is already operated.

Judgment (2): the resource group should include at least one of each of resources which are target ports and parity groups. This judgment (2) is the basis assuming a case before the operation of the virtual storage system. Incidentally, in the case shown in FIG. 10, both RSG2 and RSG5 have the physical resources, so it is determined that RSG(s) is appropriate.

If the SVP 108 determines that the RSG(s) is not appropriate, it sends an error message to the GUI of the external management terminal 20. The GUI provides an error display and prompts the login user to input data again. The error display includes, for example, displaying the type(s) of resources lacking in the resource group. The GUI may identify and display resources, which have not been set to the resource group, or resources which are recommended to be set to the resource group.

If an affirmative judgment is returned, the SVP sends the input information to the switch control module 110 for the storage system (1812). The processor module 104 updates and registers the resource group configuration information tables (FIGS. 5A, 5B to FIGS. 8A, 8B) and the resource group ID management table (FIG. 9) in the shared memory 102A based on the input information so that the content of these tables become the content of the RSG settings (1814); and the processor module 104 then sends the updated information to the SVP 108 via the switch control module 110 (1816). The SVP 108 configures the resource group ID bitmap (FIG. 16) based on the received information of the updated resource group configuration information tables (1816). The GUI of the external management terminal displays the relationship (the resource group ID bitmap table) between the resource group ID and its corresponding user group(s) based on the update information of the resource group ID bitmap (1820). If no user group is allocated to the resource group, the user group ID and the user group name are left blank. FIG. 45 shows a GUI screen displayed by the external management terminal in step 1820. If the management user selects a UG on the left side of the GUI screen, the right side of the screen will be switched to each relevant UG.

The configuration state of each resource after the execution of the above-described processing corresponds to the block diagram of FIG. 10 and each resource configuration information table becomes as shown in FIG. 19 to FIG. 22. Regarding these drawings, FIG. 19 is the configuration information table 1900 for LDEVs, FIG. 20 is the configuration information table 2000 for parity groups, FIG. 21 is the configuration information table 2100 for host groups, and FIG. 22 is the configuration information table 2200 for ports. Incidentally, if the storage system is exclusively owned by one company, the processing for partitioning the storage system to set a plurality of virtual systems is unnecessary.

Figure 23:
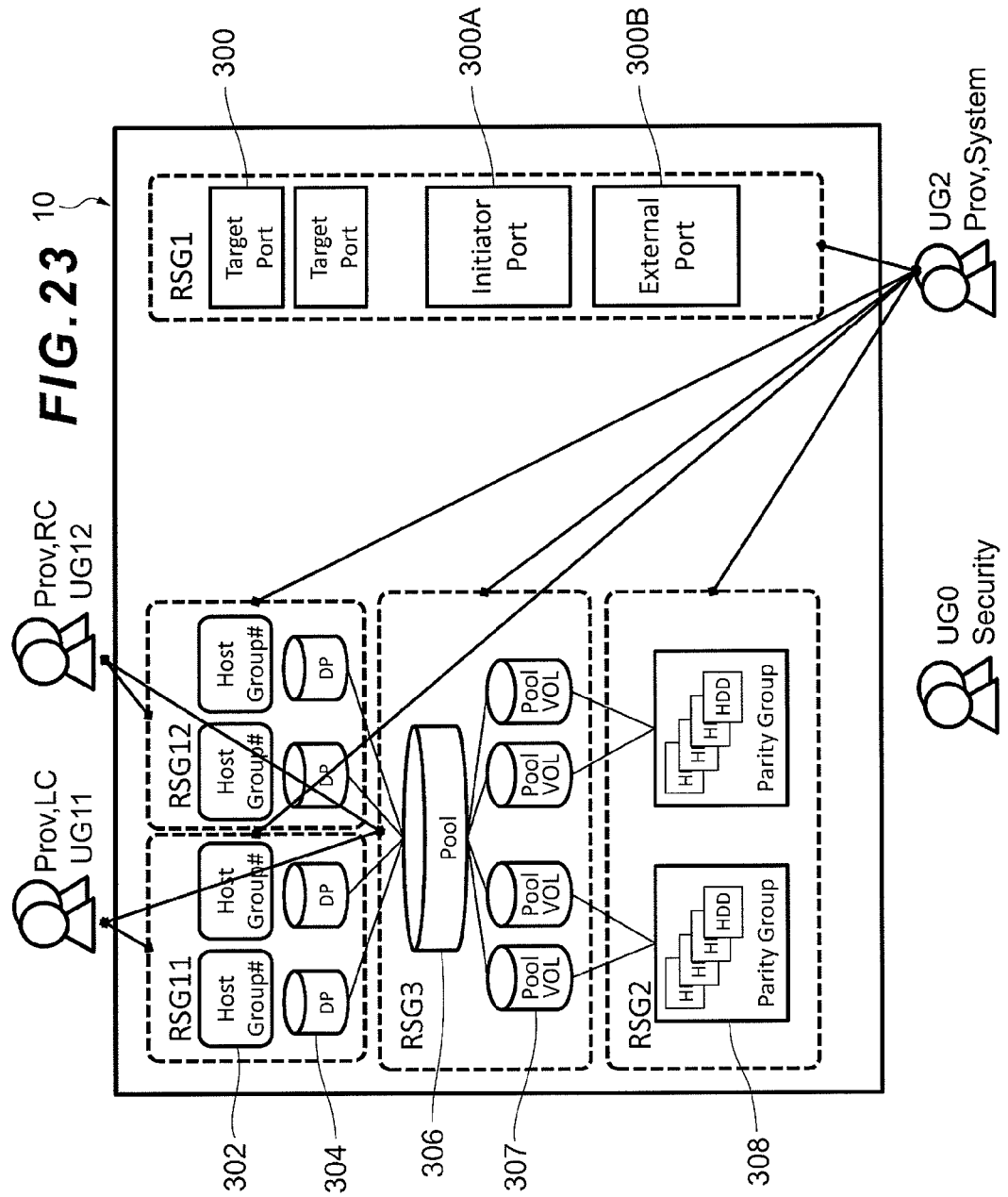
FIG. 23 is a block diagram of a virtual private storage system showing a state where a resource group allocated from the storage system to the virtual private storage system of a company is further partitioned and the partitioned resource groups are allocated to management user groups of the company.

If the storage system is partitioned into the virtual storage systems as described above, the resources of the virtual storage system are further partitioned for a plurality of management users in a company to which the virtual storage system is allocated, so that the partitioned resources are used for the operation in the company such as the operation of dynamic provisioning in the aforementioned example. FIG. 23 shows that a resource group (RSG2) allocated to company A is further partitioned and the partitioned resource groups are allocated to a plurality of management users for company A.

The overall management user group (UG0) partitions RSG2 and sets RSG1, RSG3, RSG11, and RSG12 to the virtual storage system for company A. UG0 fetches the physical resources (ports) from RSG2 and allocates them to RSG1. Furthermore, UG0 sets, as the logical resources, RSG3 which is constituted from the pool 306 composed of a logical storage area, and a plurality of pool volumes 307 allocated to the pool, and RSG11, RSG12, each of which is constituted from the host groups 302 and the virtual volumes 304.

Furthermore, UG0 sets a user group for the plurality of management users for company A. The user group UG2 has the access authority over all the resource groups for company A. This access authority includes Prov (provisioning authority) and System (system authority). The detailed content of this authority is shown in FIG. 15. The provisioning authority is a position capable of executing the operation necessary for dynamic provisioning and includes LDEV creation/deletion, creation/deletion of pool/pool volumes, DP-VOL (virtual volume) creation/deletion, creation/deletion of LU (logical module) accessed by the host computer, host group creation/deletion, and host addition/deletion.

The system authority is the authority capable of accessing the system configuration of the storage system and includes reference to system configuration information of the storage system, CLPR (partitioned memory areas for the cache memory) creation/deletion, setting of the microprocessor ownership, and changing the port attributes. The reference numeral 300 represents a target port, the reference numeral 300A represents an initiator port, and the reference numeral 300B represents an external port. Setting of the ownership to the microprocessor means to have a specific microprocessor exclusively own I/O processing on LDEVs from the host computer.

Each of UG11 and UG12 is allocated to RSGs (RSG11, RSG12, RSG3) constituted from the logical resources. UG11 and UG12 may be assumed to be user group(s) for administrators of business servers. RSG11 is exclusively allocated to UG11. RSG11 is a logical area for business server A. Similarly, RSG12 is exclusively allocated to UG12. RSG12 is a logical area for business server B.

Both UG11 and UG12 have provisioning authority, local copy (LC) authority, and remote copy (RC) authority. Regarding the details of each authority, see FIG. 15. It should be noted that a pair mentioned in FIG. 15 means a pair of a copy source volume and a copy destination volume and both volumes are set in the same storage system in a case of local copying. In a case of remote copying, the copy source volume is set in a primary storage system, while the copy destination volume is set in a secondary storage system located at a remote place away from the primary storage system.

The difference between the authority of UG2 and the authority of UG11 and UG12 is that the former has the system authority and the latter does not has the system authority. Even if the authority of a plurality of UGs is the same, the operation that can be executed by a UG may be different from that executable by other UGs depending on what kind of resources are allocated to the relevant UG. A user belonging to UG2 can cut out the pool volume 307 from the parity group 308 and allocate it to the pool. On the other hand, a user belonging to UG11 or UG12 has the provisioning authority, so that they are allowed to create an LDEV, but cannot access RSG2 and, therefore, they cannot actually cut out the pool volume from the parity group. This is to prevent the occurrence of competitions between UG11 and UG12 to secure the parity group resources. So, the storage system 10 does not allocate RSG2 to UG11 or UG12 as described above, but it allocates RSG2 to UG2. Even if each of UG2, UG11, and UG12 is a UG having the same provisioning authority, it is possible to avoid competitions of logical resources between UG11 and UG12 because RSG2 is allocated to only UG2. Furthermore, since a host group is an attribute assigned to a port, and RSG1 is not allocated to UG11 and UG12, and UG11 and UG12 do not have the system authority, a user belonging to UG11 or UG12 may become subject to restrictions when defining and setting a host group. For example, the restriction may be set so that the user belonging to UG11 or UG12 cannot define or set a host group. Alternatively, when a host group is created for a port or a host is registered, only UG2 is permitted to set the host group ID and the provisioning authority of UG11 and UG12 can only assign a host group name to this ID. In this way, the actual form of the operation which can be executed by a user group is decided depending on the type of a resource group allocated to each user group (whether it is either a physical resource group or a logical resource group, or both of them) and the authority type.

With the virtual storage system, the physical resources such as the ports (RSG1) and the parity groups (RSG2), and the logical real volumes (pool volumes (RSG3)) are shared by a plurality of user groups, thereby making it possible to minimize and efficiently utilize the surplus capacity of the ports and volumes and perform the operation at reduced costs. Furthermore, capacity virtualization and facilitation of capacity addition can be realized by using a pool function of dynamic provisioning.

Regarding RSG11 and RSG12 which are assumed, for example, to be allocated to each division in the company, UG11 and UG12 which manage them can secure and operate their dedicated resources which will not mutually interfere. Furthermore, as each of RSG11 and RSG12 is composed of only the logical resources, addition of the capacity to the pool and performance management of the parity groups are delegated to a specific user group (UG2); and, therefore, even users (UG11, UG12) who are unfamiliar with the system can perform management activities.

With the above-described embodiment where a plurality of virtual systems are partitioned in the storage system, a storage group having the physical resources is not shared by the entire storage system, but is limited to sharing by users in the virtual system (in one company). Accordingly, the difference between a conventional resource partitioning technique (SLPR) and the present invention is that the resources are shared between some users (between users in company A and between users in company B) according to this invention. Furthermore, the conventional SLPR can configure only a virtual storage system that traverses longitudinally from the frontend (ports) of the storage system to its backend (parity groups); however, with the system according to this embodiment, it is possible to freely group the resources in a cross-sectional manner to form, for example, a resource group of the host groups and the logical volumes, a resource group of the pool and the logical volumes, and a resource group of the parity groups, and achieve efficient utilization of the resources by suppressing surplus resources.

Figure 24:
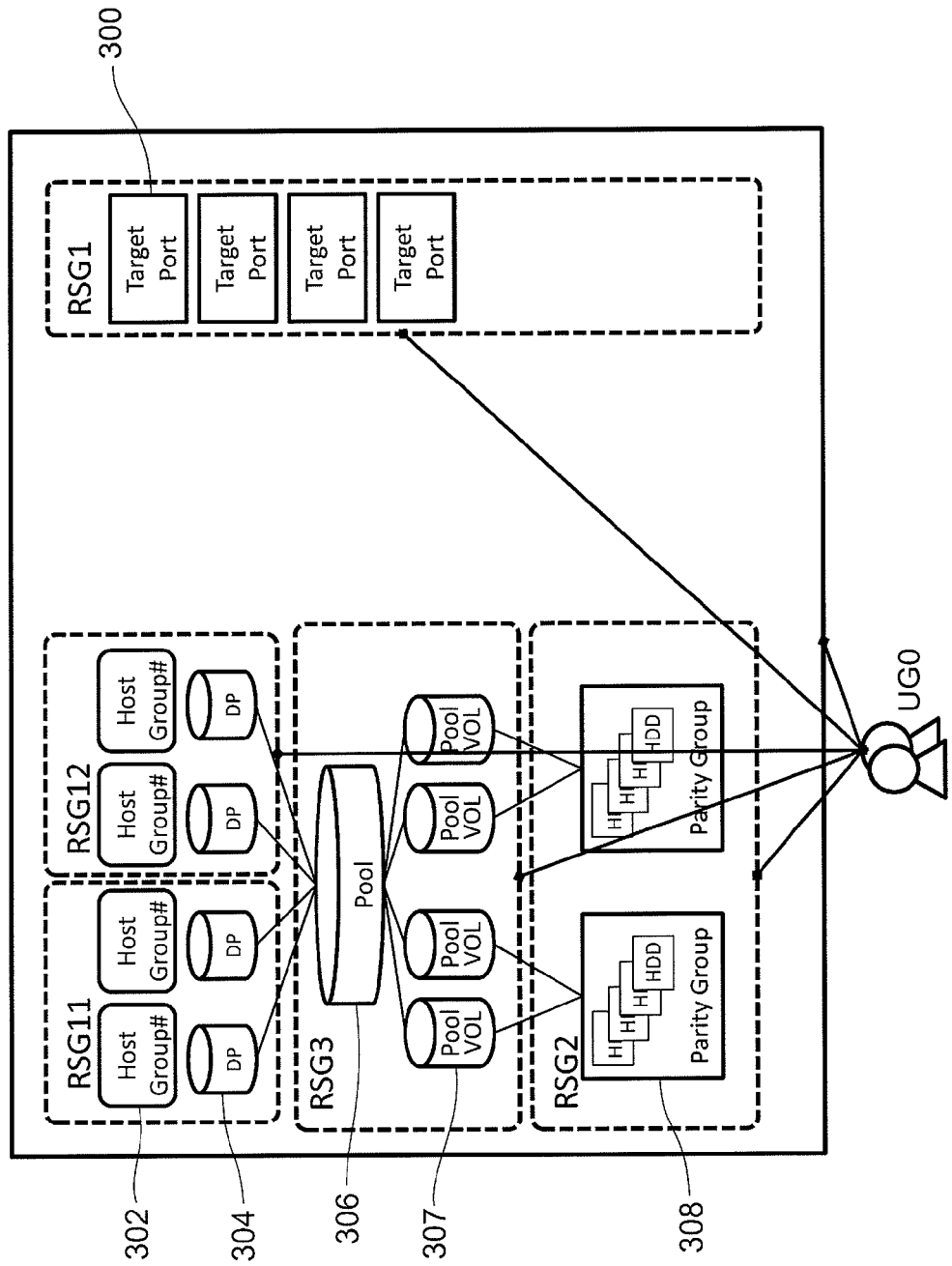
FIG. 24 is a block diagram of a virtual private storage system showing a state where a resource group allocated from the storage system to the virtual private storage system of a company is further partitioned and the partitioned resource groups are allocated to a user group for the overall management of the storage system.
Figure 25:
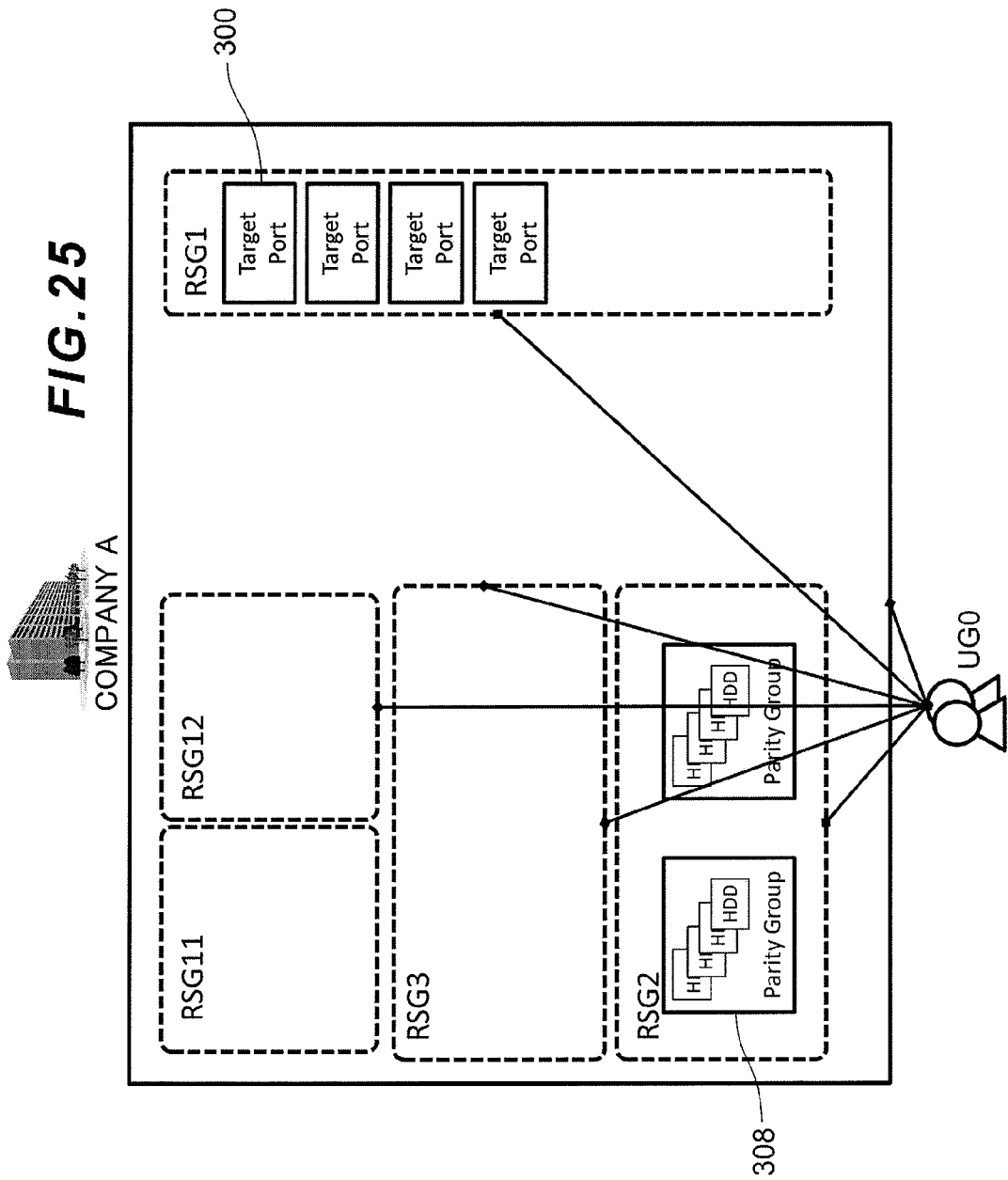
FIG. 25 is a block diagram of a virtual private storage system before operation before resource groups of logical resources are set to the virtual private storage system.

The overall management user group (UG0) of the storage system, who has the security authority, creates a resource group in the virtual storage system (see FIG. 24). It is also possible to grant the security authority to the user (UG2) of company A and have that user create RSGs for company A; however, if the security authority is granted to the user (UG2) of company A, the user (UG2) will be able to refer to not only the resources for company A, but also the resources for company B, which will bring about a security problem. So, even after partitioning the resources for each company, UG0 will perform RSG creation/deletion for the companies and addition/deletion of the physical resource to/from the RSGs. Therefore, with the system before starting the operation as shown in FIG. 25 where the physical resource groups (RSG1, RSG2) exist, but the logical resources have not been set to the resource groups (RSG3, RSG11, RSG12), the user UG0 can define and set the logical resources to the resource groups based on an operation plan of company A or operation suggested to company A, there by completing the aforementioned virtual storage system. Incidentally, the external management terminal 20 may limit access to the logical resource groups by the overall management user group (UG0) of the storage system. Incidentally, there may be a user group to which the security authority that is valid for only company A or B, that is, the security authority targeted at an arbitrary resource group is set.

Figure 18:
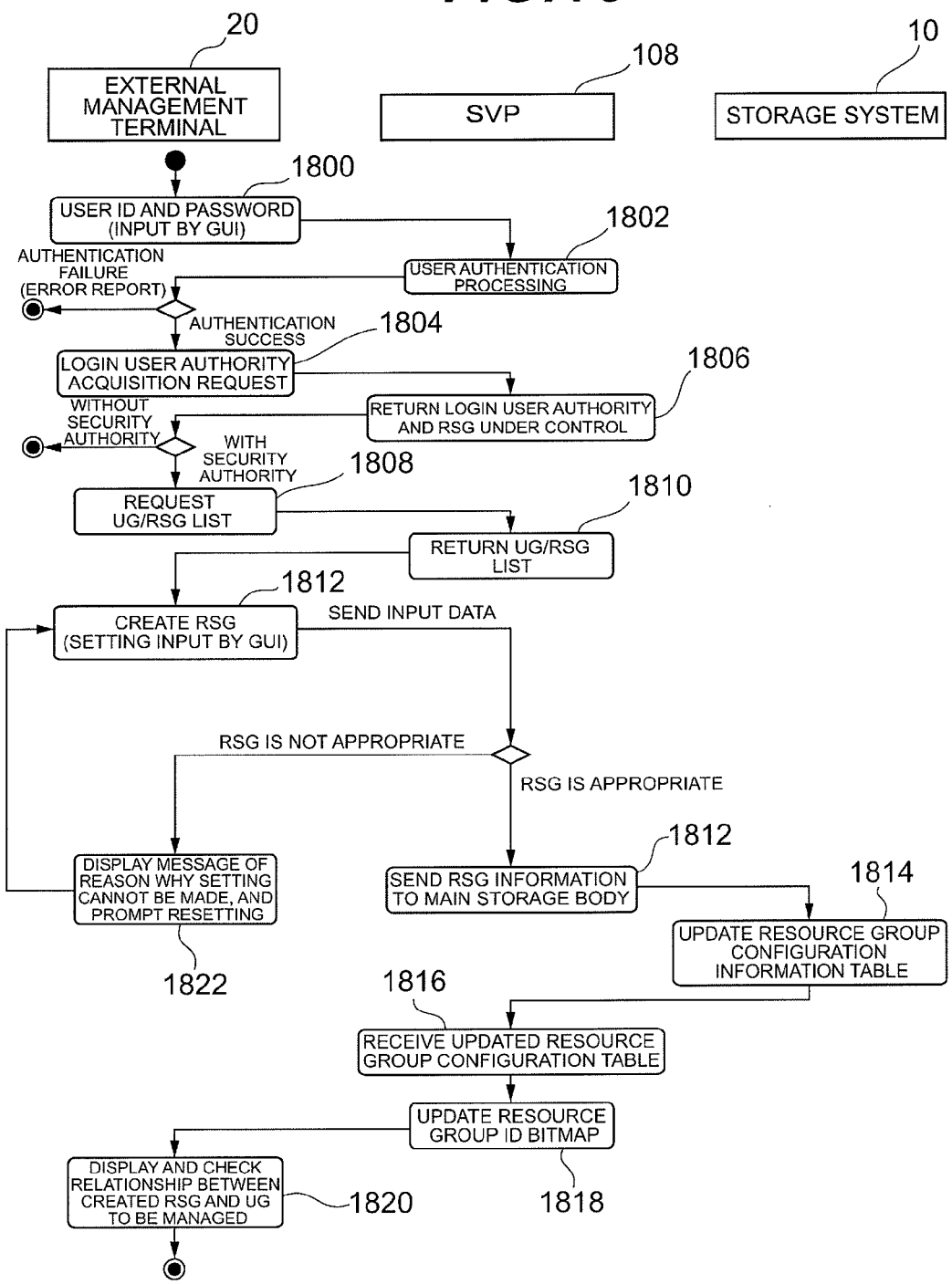
FIG. 18 is an example of a flowchart for logically partitioning the storage system into systems, each of which is provided for each of a plurality of companies.
Figure 26:
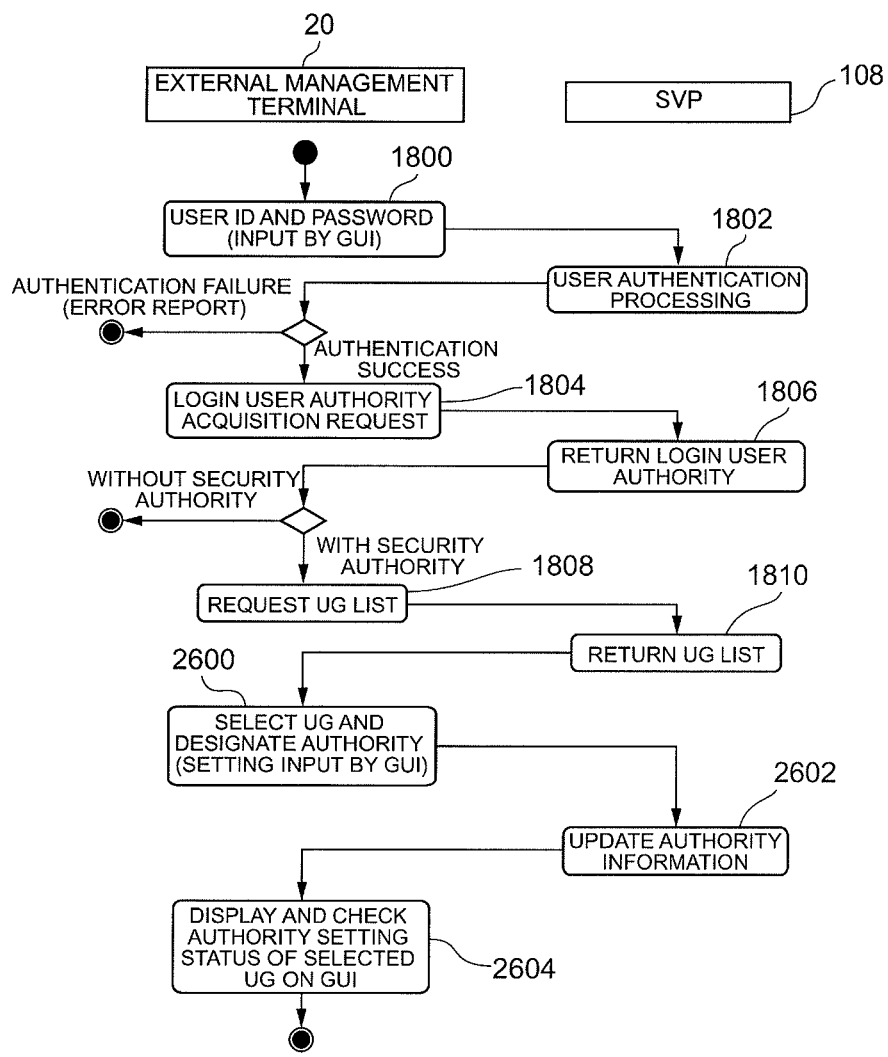
FIG. 26 is a flowchart illustrating an example of processing for allocating authorities to the user group(s).

Next, various processing relating to the setting of resource groups in the virtual storage system will be explained with reference to flowcharts. FIG. 26 is a flowchart for assigning the authority to a user group. This setting is permitted to the user UG0. Processing after the user login until the external management terminal 20 receives the user group list from the SVP (1800 to 1810) is the same as the processing in the aforementioned flowchart (FIG. 18). The login user sets or selects a new user group on the GUI of the storage management software, sets the authority to the relevant user group, and updates the authority of the existing user group or sets new authority to the existing user group, and send the input data to the SVP (2600). The SVP searches the authority bitmap table (FIG. 13) for the user group selected or set on the GUI and sets [1] to a bit(s) in which the authority is set or updated (2602). Incidentally, when a user group is newly set, each bit of the authority bitmap is [0].

If the authority which does not conform to the existing authority is set to a user group to which the authority has already been set, the SVP 108 sends a warning message to the management terminal. For example, that would be a case where the authority over the physical resources is set to a user group to which the authority over the logical resources has been set. Specifically speaking, that would be a case where an attempt is made to set the system authority to UG11 or UG12. The same can be said for a case where the authority to be set does not conform to the resources allocated to the user group. For example, that would be a case where no physical resource exists in the resource group, but an attempt is made to assign the authority relating to the system. The specific details will be further explained below. It is inappropriate for a UG having only the above-described LC authority to have the system authority for operating the physical resources. However, in a case where an attempt is made to set the ownership to primary and secondary LDEVs for remote copying, the system authority is required. In this case, referring to FIG. 23, user(s) of the primary and secondary LDEVs will have to request UG2 to set the ownership. However, since UG11 and UG12 do not have much storage knowledge and management knowledge to be capable of performing such operation, resource groups to be allocated to such user groups are limited. A warning message would state as follows: The relevant UG will become capable of **; however, is that authority truly necessary? The user who receives this message replies YES or NO to select whether they would like to proceed with the processing or not.

Figure 46:
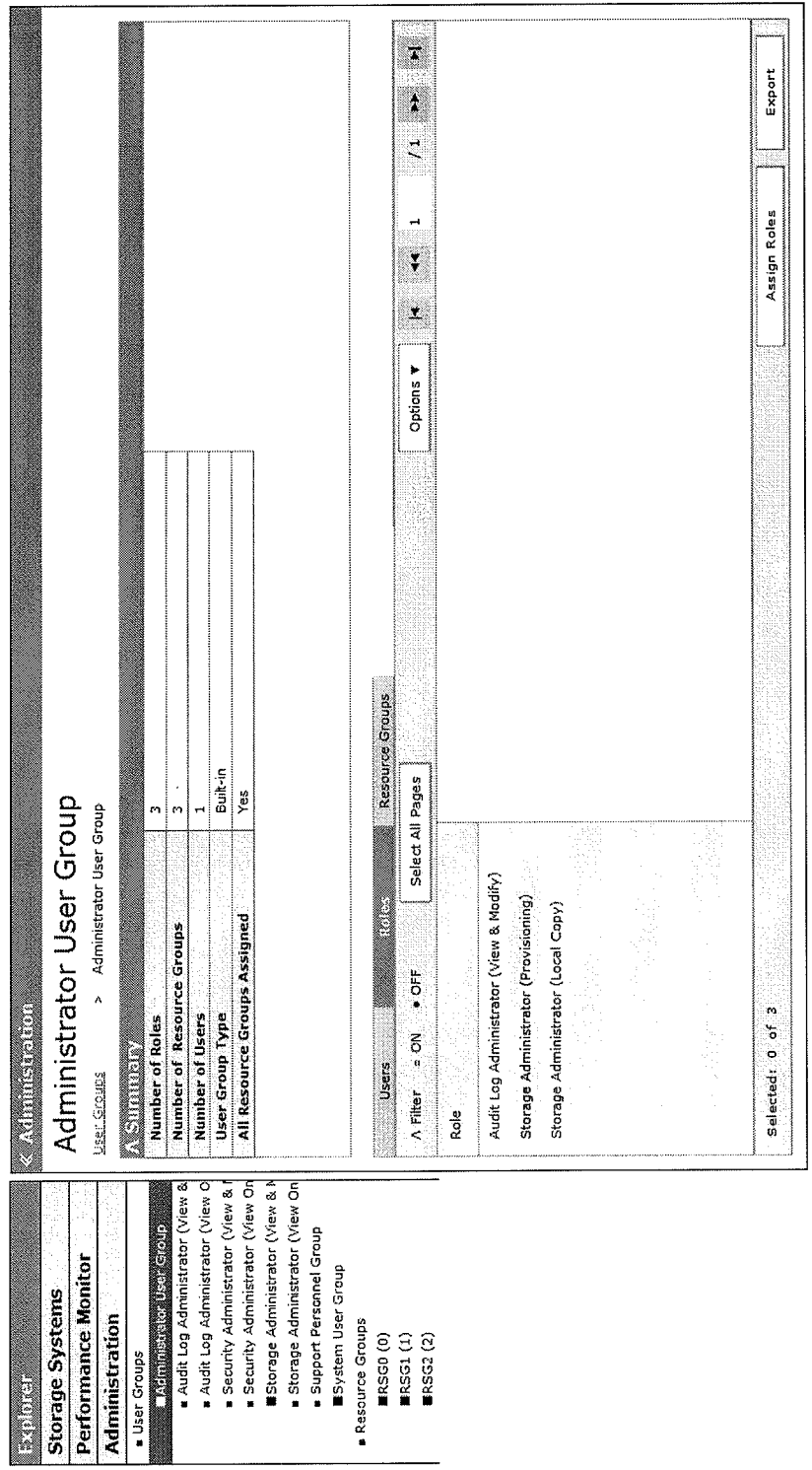
FIG. 46 is a GUI screen displayed by the external management terminal in step 2604 of FIG. 26.

If the authority information is finally updated on the SVP 108 side, that information is sent to the management terminal 20 and authority setting information is displayed on the GUI to ask for confirmation by the user; and if the user confirms it, the authority is finalized (2604). FIG. 46 shows a GUI screen displayed by the external management terminal in step 2604. If the management user selects a UG on the left side of the GUI screen, the right side of the screen will be switched to each relevant UG.

After the termination of the processing on the user login, processing for creating an RSG(s) in the virtual private storage system for the company and allocating it to the user group is then required. This processing is shown in a flowchart of FIG. 27. Since an RSG is to be created, the login user has to be a user belonging to the user group (UG0) with the security authority. Processing steps after the user logs into the external management terminal 20 until the storage management software receives the resource group list and the user group list from the SVP (1800 to 1810) are the same as those in FIG. 18 described earlier.

Next, the login user (UG0) sets new RSGs (RSG1, RSG3, RSG11, RSG12) on the GUI by allocating resources from the existing RSG2 to the new RSGs (RSG1, RSG3, RSG11, RSG12)2, and sends input information to the SVP 108 to request, for example, setting of RSGs (2700).

After receiving this request, the SVP 108 judges whether this request is appropriate or not. This judgment includes the following judgment A, judgment B, and judgment C. Judgment A is to judge whether the physical resources and the logical resources are independent of each other with respect to an RSG to be set. It is normally inappropriate to let both the physical resources and the logical resources coexist in the same RSG. If a plurality of user groups (UG11, UG12) for the logical resources are allowed to access the physical resources, competitions of the physical resources will arise between the users. However, for example, if sufficient ports are mounted on the storage system, it is possible to include the ports in RSG11 and RSG12 and design the configuration so that RSG11 and RSG12 will not be affected at all by I/O of other RSG/UG combinations.

After partitioning and creation of an RSG, it is necessary to change the setting of the physical resources, define the logical resources from the physical resources, and allocate them to the RSG which consists of logical resource(s); and, therefore, judgment B checks if all the RSGs (RSG1, RSG2, RSG3, RSG11, RSG12) are allocated to the user group (UG2) which has the overall management authority over the virtual storage system, that is, the authority over the physical resources (system authority) and the authority over the logical resources (provisioning authority). The authority may be distributed among a plurality of UGs having the same authority.

Figure 28:
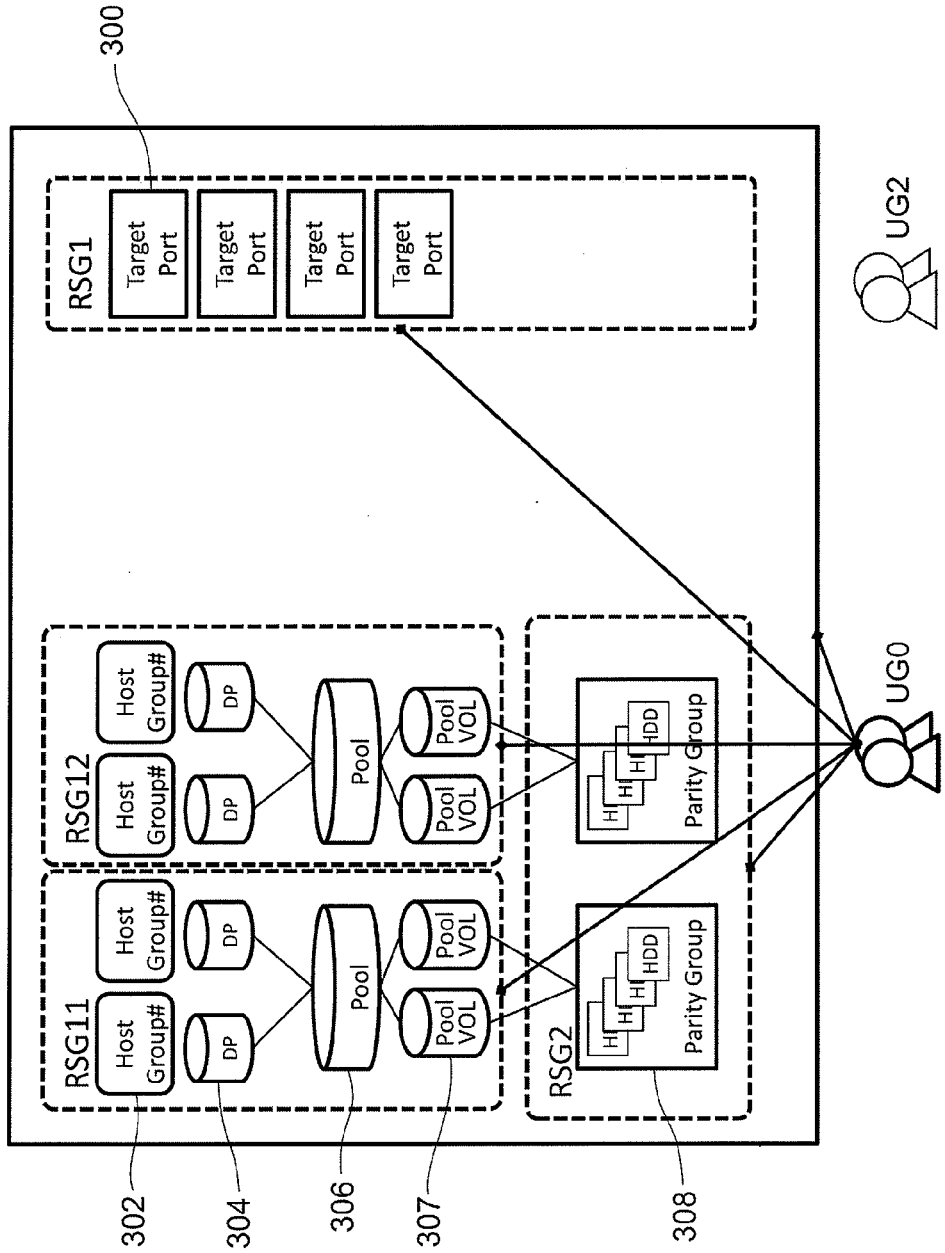
FIG. 28 is a block diagram showing a second example of a configuration form of a plurality of resource groups in an in-house virtual private storage system.

Judgment C judges suitability of the setting form of the resource group(s) constituted from the logical resources. It is a matter of course that the setting form shown in FIG. 24 described earlier is appropriate. Furthermore, the pool 306 and the pool volumes 307 may be exclusively owned by RSG11 and RSG12, respectively, as shown in FIG. 28.

Figure 29:
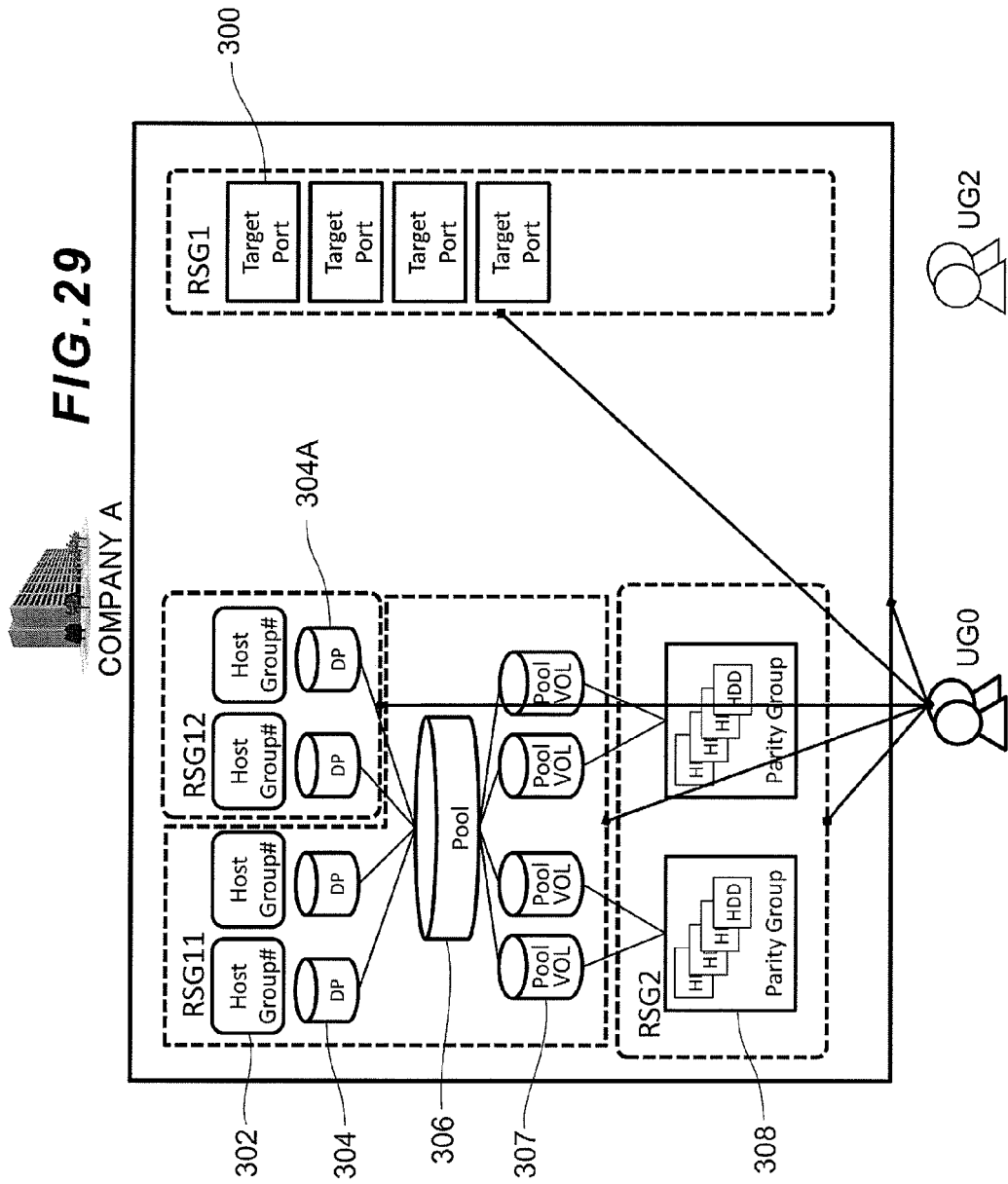
FIG. 29 is a block diagram showing an inappropriate example of a configuration form of a plurality of resource groups in the in-house virtual private storage system.

On the other hand, FIG. 29 shows an example where the resource groups are not set appropriately in the virtual private storage system. Specifically speaking, the logical resources constituted from the pool 306 and the pool volumes 307 belong to a logical resource group RSG11 exclusively owned by a specific user group (UG11) and virtual volumes 304A of RSG12 are allocated to the pool 306, so that it is necessary for UG12 (FIG. 23) to refer to the pool 306 and the pool volumes 307 of RSG11 in order for UG12 to operate the logical resources of RSG12; however, this results in the situation that UG12 can refer to the information of the logical resources such as the host groups 302 of RSG11, which will cause problems in terms of security.

Therefore, as a result of the judgment C (2706), an affirmative judgment is returned with respect to the form where the resource groups of the logical resources exclusively owned by UG11 and UG12 respectively are provided (FIG. 28), and the form where the resource groups of the logical resources exclusively owned by UG11 and UG12 respectively, and the resource groups of the logical resources shared by UG11 and UG12 are provided (FIG. 24). Incidentally, with respect to the form in FIG. 28, a plurality of RSGs (RSG11, RSG12), where the pool volumes 307 are created, exist for capacity shortage which is predicted to occur most frequently during the operation, so it is feared that the management performed by UG2 might become complicated.

The resource group configuration information table of each resource corresponding to the form in FIG. 23 is as shown in FIG. 30 to FIG. 33. Also, the resource group ID bitmap is as shown in FIG. 16 described earlier. On the other hand, the resource group configuration information table of each resource corresponding to the form in FIG. 28 is as shown in FIG. 34 to FIG. 37. Also, the resource group ID bitmap is as shown in FIG. 38.

The difference between the resource group the bitmap (FIG. 16) for the form in FIG. 23 and the resource group the bitmap (FIG. 38) for the form in FIG. 28 is whether or not UG11 and UG12 share the fourth bit in the resource group ID bitmap, that is, RSG3. Another difference between the form in FIG. 23 and the form in FIG. 28 is whether the LDEVs are shared or not. In the former case, the pool volumes are shared. In the former form, UG11 and UG12 share RSG3 according to FIG. 16 and RSG3 includes LDEV IDs (=0x000004 to 0x000007) according to FIG. 30. These LDEV IDs are pool volumes according to FIG. 39. As a result, it can be judged that UG11 and UG12 share the LDEV IDs (=0x000004 to 0x000007) which are the pool volumes, via RSG3.

In the form in FIG. 28, the virtual volumes and the pool volumes are exclusively owned by the user groups. According to FIG. 38, UG11 and UG12 exclusively own RSG11 and RSG12, respectively. As shown in FIG. 34, RSG11 includes LDEV IDs (=0x000000, 0x000001, 0x000004, 0x000005) and RSG12 includes LDEV IDs (=0x000002, 0x000003, 0x000006, 0x000007). According to FIG. 39, RSG11 and RSG12 include both the virtual volumes and the pool volumes. As a result, both UG11 and UG12 exclusively own the virtual volumes and the pool volumes. Incidentally, referring to FIG. 39, a DPVOL is a logical volume without real capacity; a basic VOL is a logical volume with real capacity; no attribute means that the relevant volume is a virtual volume; and if the attribute is a pool volume, it means the logical volume with real capacity is intended to add the capacity to the pool.

Figure 27:
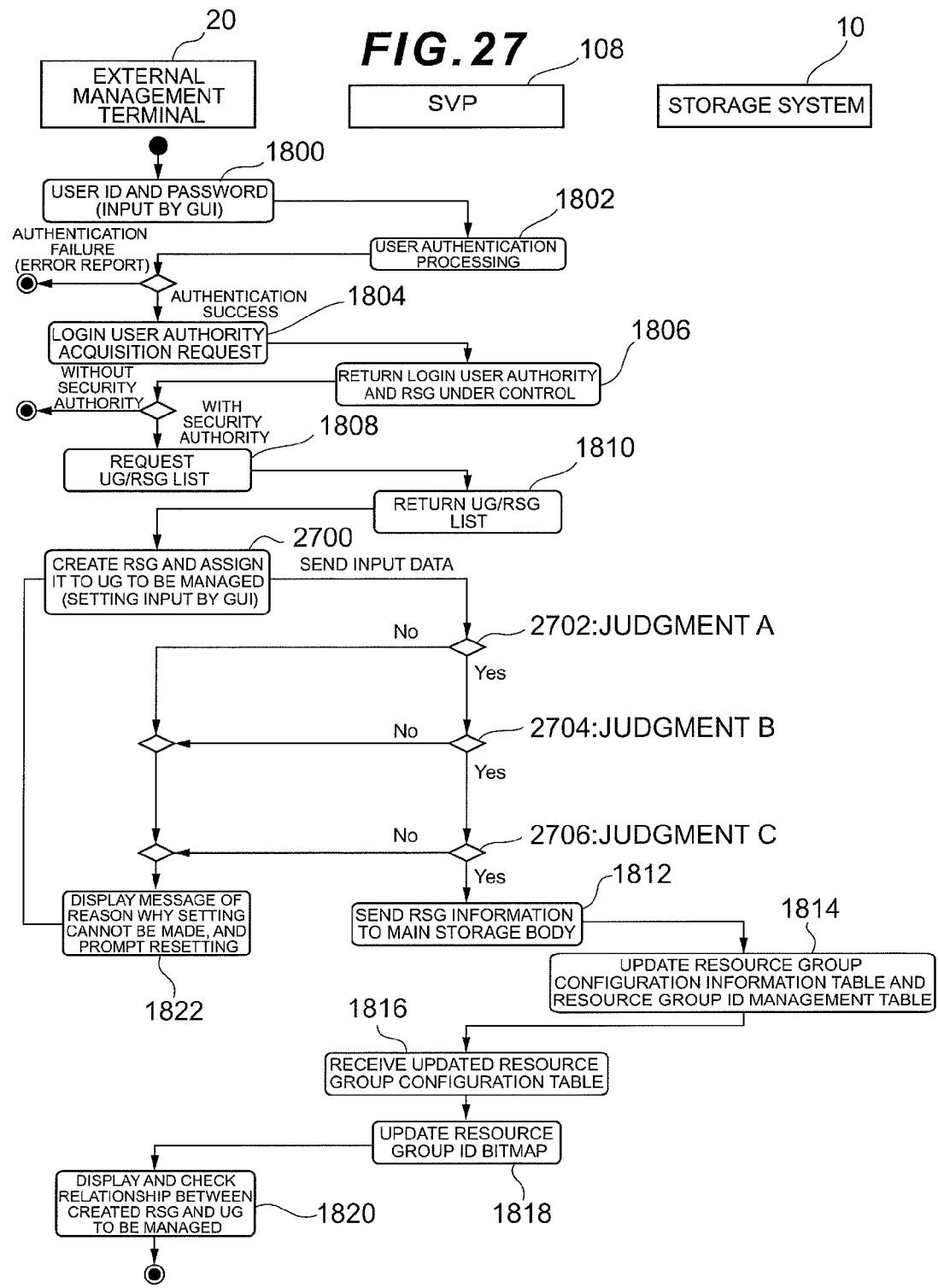
FIG. 27 is a flowchart corresponding to processing for creating a resource group in the virtual private storage system of a company and allocating it to a user group(s) in the company.

Referring to FIG. 27, the processing in and after step 2706 is the same as steps 1814 to 1822 in FIG. 18.

Figure 40:
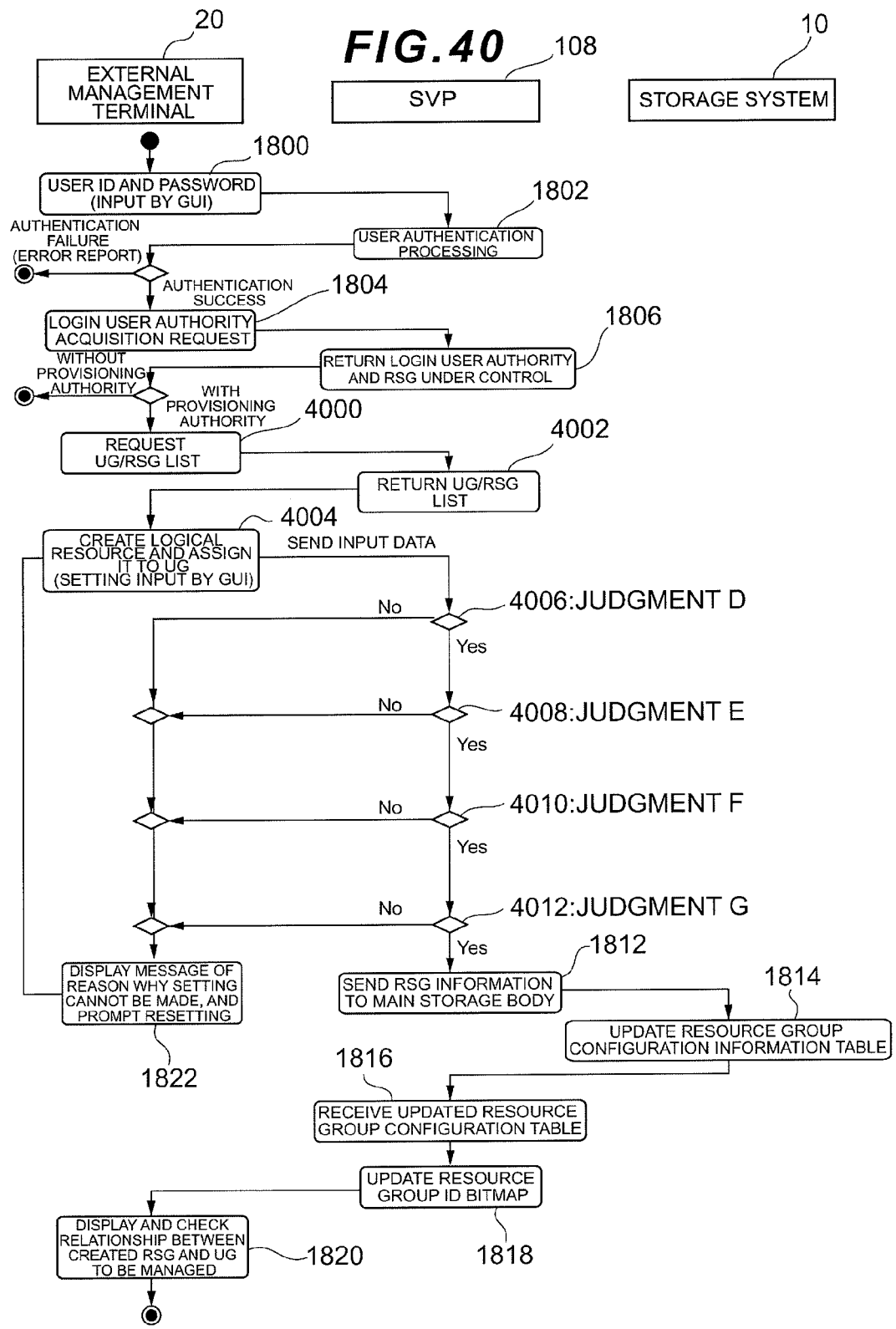
FIG. 40 is a flowchart illustrating an example of processing for cutting out a logical resource from a resource group of a physical resource and setting it to a resource group of a logical resource.
Figure 41:
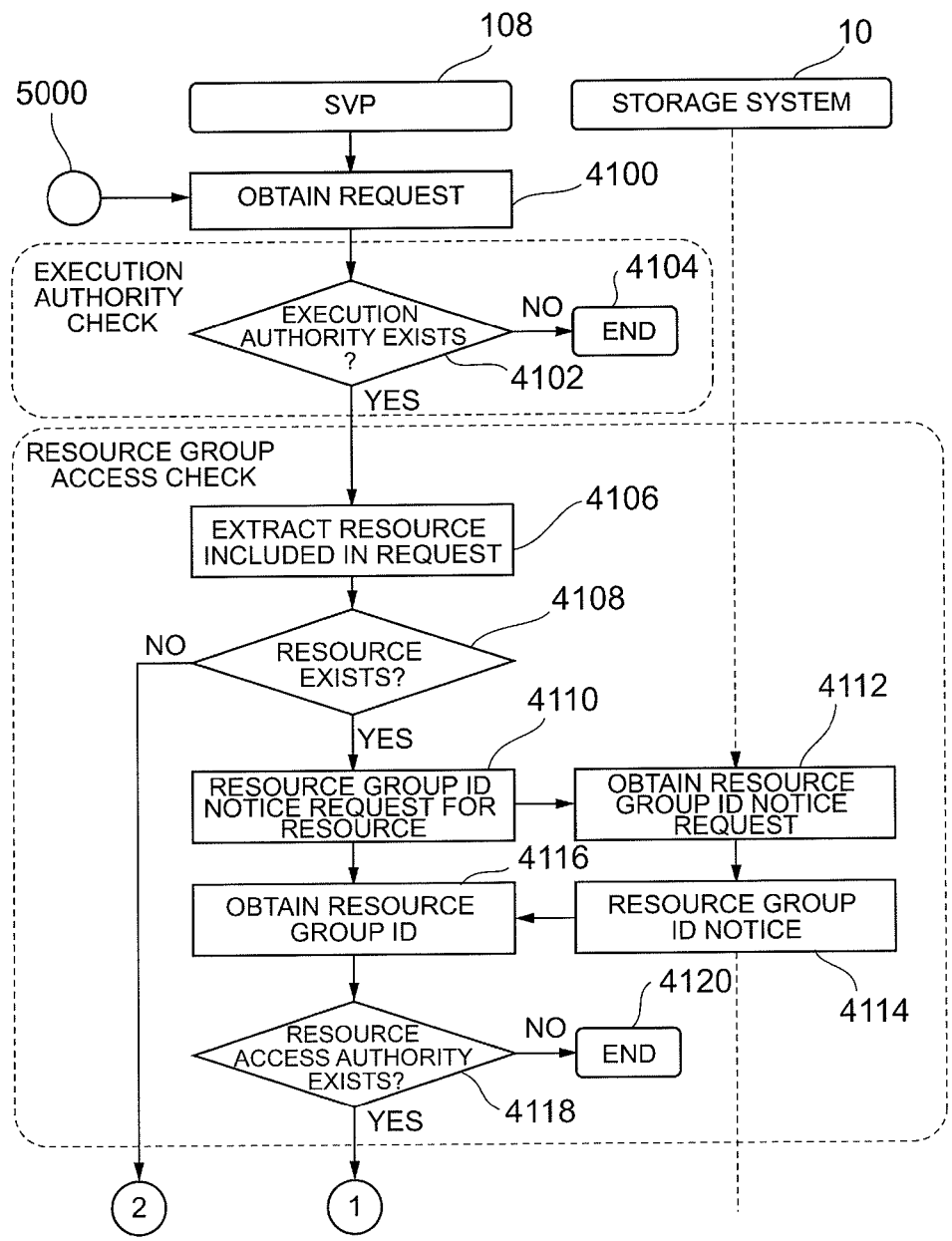
FIG. 41 is a flowchart illustrating first processing in the operation of the computer system.

As shown in FIG. 27, during, or after the completion of, the processing for partitioning RSG2 into a plurality of resource groups, it becomes necessary to create and allocate a logical resource and perform various settings. UG2 is granted the provisioning authority, the system authority, and the remote copy authority as mentioned earlier. Allocation of the authority and resource groups to UG2 is performed by UG0 having the security authority in accordance with FIG. 26 and FIG. 27. UG2 which is granted the authority and resource groups by UG0 defines logical resources, which are the host groups 302, under the control of the target ports 300 and allocate them to RSG11 and RSG12. In addition, UG2 allocates the virtual volumes 304 to RSG11 and RSG12. Then, UG2 cuts out the real logical volumes (pool volumes) from RSG2, where the physical resources exist, and allocates them to RSG3. A flowchart relating to this processing sequence is shown in FIG. 40. Incidentally, it is necessary to change the attribute of the ports in order to connect to the external storage apparatus or perform remote copying, which will be also executed by UG2 having the system authority.

Regarding the flowchart in FIG. 40, the processing after the user login until the external management terminal receives information about the authority of the login user and the resource groups under the control of the login user (step 1800 to step 1806) is the same as that in FIG. 18. After the storage management software for the external management terminal 20 confirms the provisioning authority to enable creation of a logical resource, the external management terminal 20 requests the user group list and the resource group list from the storage management software for the SVP 108 (4000) and receives them returned from the SVP. The details of this processing are the same as those in step 1808 to step 1810 in FIG. 18. Subsequently, the login user inputs data to the GUI to define a logical resource from the physical resource and allocate the defined logical resource to the logical resource group (4004). The external management terminal 20 sends the input information to the SVP 108.

The SVP which has received the transmitted input data judges whether the input data is appropriate or not, by performing judgment D to judgment G. Judgment D (4006) judges whether or not a logical resource can be created with the authority of the user group, to which the login user belongs, and the allocated resource group; judgment E (4008) judges whether the use of the physical resources is imbalanced or not when cutting out the logical resource from the physical resource; and judgment F (4010) judges whether the logical resource is not allocated to the resource group of the physical resource; and judgment G (4012) judges whether the form of the virtual storage system is not inappropriate (as in, for example, the form in FIG. 29). Processing after the judgments is the same as that in the flowcharts in FIG. 18 and FIG. 27. The details of each judgment will be explained below.

Judgment D

UG2 has the operation right on RSG1, RSG2, RSG3, RSG11, and RSG12 as shown in the resource group ID bitmap in FIG. 16. Since RSG2 (which owns the parity groups), which is the physical resource, is allocated to UG2, it is possible to create a logical volume (LDEV) which is a logical resource. Furthermore, since RSG1 (which owns the target ports) is allocated to UG2, the host group which is similarly a logical resource can create a host group. If the login user belongs to UG2, an affirmative judgment is returned for judgment D.

Since both UG11 and UG12 have the provisioning authority, they are permitted, in terms of the authority, to create logical resources such as LDEVs and host groups. However, according to the resource group ID bitmap in FIG. 16, RSG1 and RSG2 which are the physical resource are not allocated to UG11 and UG12. So, in fact, UG11 and UG12 cannot create logical resources. Therefore, if the login user belongs to UG11 or UG12, a negative judgment is returned for judgment D.

Regarding the operation of UG11 and UG12, the GUI operation to create an LDEV or a host group may be inhibited from the beginning by not displaying the physical resources of RSG1 and RSG2 when the GUI obtains the UG/RSG. However, if it is possible to create various types of resources by means of not only the GUI, but also by use of a CLI (command line interface) by the login user, it is necessary to check whether such creation of the resources is possible or not, by using the external management terminal or the storage system. In this case, the judgment D step by the SVP will be omitted.

Judgment E

For example, if a plurality of target ports exist, but the host groups are set to only a certain port, load will be concentrated on that port and load distribution to other ports will not be achieved. Also, the same applies to a case where a plurality of parity groups exist, but LDEVs are created only in a certain parity group. Judgment E is performed to make sure that there is no such imbalanced use. This judgment makes use of reference by the SVP 108 to performance information such as availability of the targets ports and the parity groups in the shared memory 102. Furthermore, since such performance information can be checked also on the GUI of the storage management software, an appropriate resource may be selected on the GUI. The judgment in this case will be performed by the user belonging to UG2 who is the login user.

Judgment F

The login user can define a logical volume from RSG2 (which owns the parity groups), which is the physical resource group, and make it belong similarly to RSG2. However, since UG11 and UG12 which handles only the logical resources cannot allocate RSG2, the logical volume can no longer be used. Therefore, a request for such logical resource setting is impossible.

Judgment G

Judgment G judges whether either the following condition (1) or (2) is satisfied or not: (1) if UG11 and UG12 have only RSGs of their exclusively owned logical resources, the host groups, the virtual volumes, and the pool volumes are allocated to their own RSGs; and (2) if UG11 and UG12 have RSGs of their exclusively owned logical resources and mutually shared RSGs of logical resources, the host groups and the virtual volumes are allocated to the former RSGs and the pool volumes are allocated to the latter RSGs. According to the conditions (1) and (2), dynamic provisioning can be performed on UG11 and UG12 and security can be ensured.

After the completion of RSG partitioning and resource allocation, the login user (UG2) performs, via the SVP 108, registration of the host computer and a path definition between the LU (logical unit(s)) and the host computer and then has the virtual storage system for company A make the transition to the operating state. Since both UG11 and UG12 have the provisioning authority, it is possible to register the host computer and define a path to the LU (logical unit) within the range of the authority. When doing so, the login user selects the pool to be used by the virtual volumes from RSG3 (FIG. 24). As a result, RSG11 and RSG12 can access read and write I/O from the host computer.

UG11 and UG12 can perform local copying within their own RSGs by exercising the local copy authority. Regarding remote copying, various settings across different storage systems such as creation of a remote copy pair are performed by the user group (UG0) for the overall management. Only instructions to start or terminate the copying processing are permitted to UG11 and UG12 with the remote copy authority.

When creating a resource group according to the above-described embodiment, the management user sequentially input a plurality of pieces of setting information via the GUI of the external management terminal 20; however, the SVP 108 may register a file, in which policies about the configuration of resource groups are described, in advance and judge whether input by the user is appropriate or not, based on the policy file.

An example of the policy file is as follows:

(A) Policies for realizing the resource groups in FIG. 24

(1) Physical resources (parity groups) should be shared by a plurality of users (user groups).

(2) Physical resources (ports) should be shared by a plurality of users.

(3) Logical resources (host groups) should be exclusively owned by the relevant user(s).

(4) Logical resources (LDEVs)

Virtual volumes should be used and exclusively owned by the relevant user.

Pool volumes (pools) should be shared by a plurality of users.

(B) Policies for implementing the resource groups in FIG. 28

(1) Physical resources (parity groups) should be shared by a plurality of users (user groups).

(2) Physical resources (ports) should be shared by a plurality of users.

(3) Logical resources (host groups) should be exclusively owned by the relevant user.

(4) Logical resources (LDEVs)

Virtual volumes should be used and exclusively owned by the relevant user.

Pool volumes (pools) should be exclusively owned by the relevant user.

Next, the operation of the computer system shown in FIG. 1 will be explained with reference to flowcharts in FIG. 41 to FIG. 44. While the aforementioned flowcharts correspond to the form in FIG. 23, FIG. 41 to FIG. 44 show general purpose flowcharts that can be applied to forms other than that in FIG. 23. These flowcharts show continuous processing. The SVP 108 obtains a request from a login session based on a login session 5000 of the user (4100). The request herein means operation permitted for each authority. The management software which has received this request checks the execution authority of the login user (4102); and if this check is negated, the processing of the flowchart terminates (4004); and if this check is permitted, the processing proceeds to the next step. This check is performed in the following manner. The SVP refers to the authority table in FIG. 15 and extracts the corresponding authority from the operation content of the request (4106). The SVP 108 refers to the authority bitmap (FIG. 13) allocated to the login user and checks if the corresponding authority is included in the request (4102). If the corresponding authority is included in the request, the SVP determines that the execution authority exists, and then proceeds to a resource group access check. If the corresponding authority is not included in the request, the SVP jumps to the flowchart in FIG. 43 (4300).

During the resource group access check processing (4108), the SVP firstly extracts a resource included in the request (4106). After the resource is extracted, the SVP identifies the resource group ID of a resource group to which the relevant resource belongs, according to information cached in the SVP. If the SVP has not cached this information, it requests that the storage system should report the resource group ID (4110). After obtaining this request (4112), the storage system refers to the configuration information table 202B for the shared memory 102A, obtains the resource group ID, and notifies the SVP of the resource group ID (4114). The SVP obtains the resource group ID (4116) and judges whether the authority over this resource group exists or not (4118). If an affirmative judgment is returned, the processing proceeds to the exclusive control processing in FIG. 42. If a negative judgment is returned, this processing terminates (4120)

Figure 42:
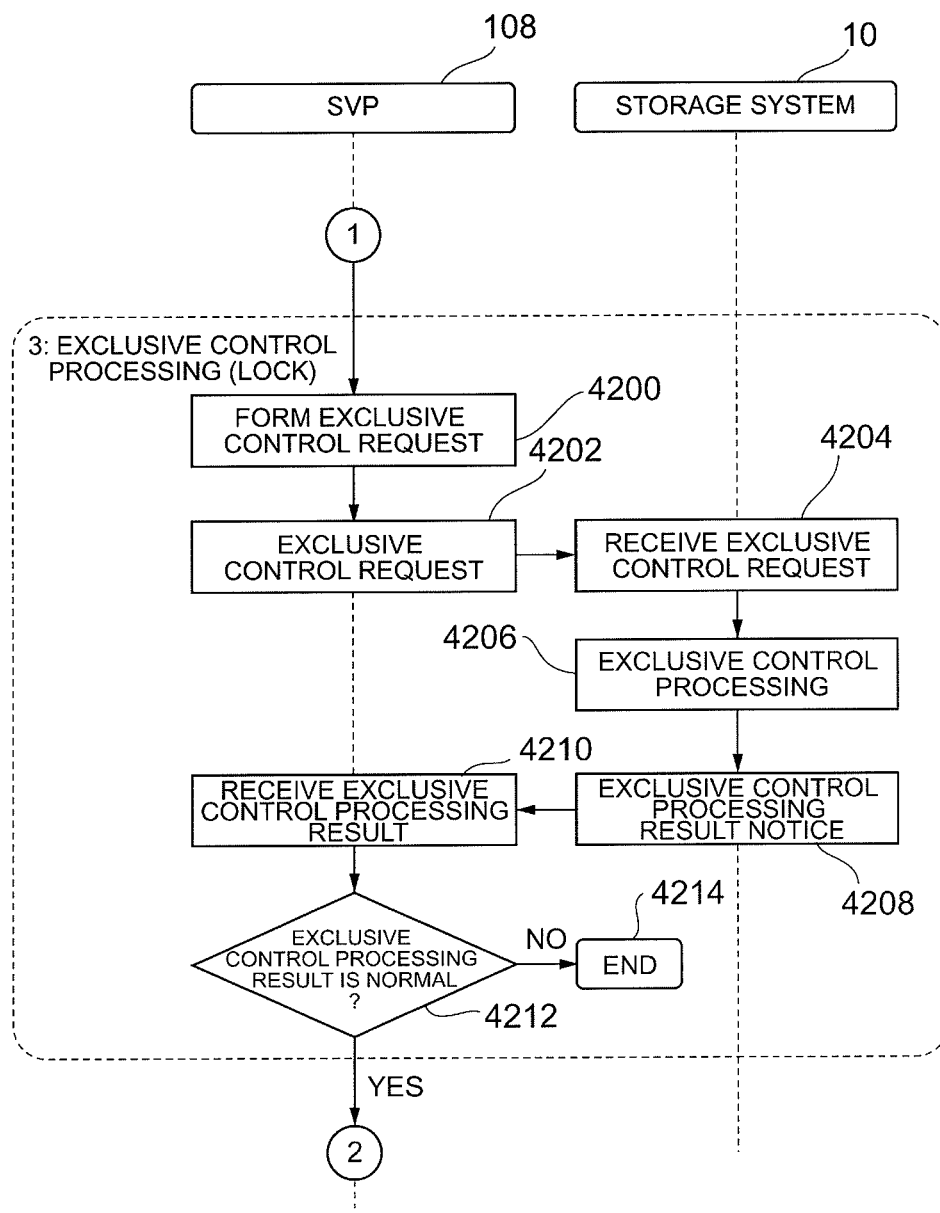
FIG. 42 is a flowchart of second processing following the first processing.

FIG. 42 is a flowchart explaining exclusive control processing. This exclusive control processing makes all resource groups, to which the resource included in the relevant request and extracted upon the resource group access check belongs, enter a locked state by recognizing the login session ID of a request sender as that of an owner (see FIG. 9). Then, the SVP forms an exclusive control request (4200) and sends this request to the storage system 10 (4202). After receiving this request (4204), the storage system tries executing the exclusive control processing on the resource group, which is a target of the exclusive control request (4206), and notifies the SVP of the result (4208). After receiving the result of the exclusive control processing (4210), the SVP judges whether the result of the exclusive control processing is normal or not (4212). If all the resource groups on which the exclusive control processing should be executed cannot be locked, the SVP determines the result to be an error. If the error judgment is returned, the SVP terminates the flowchart.

Figure 43:
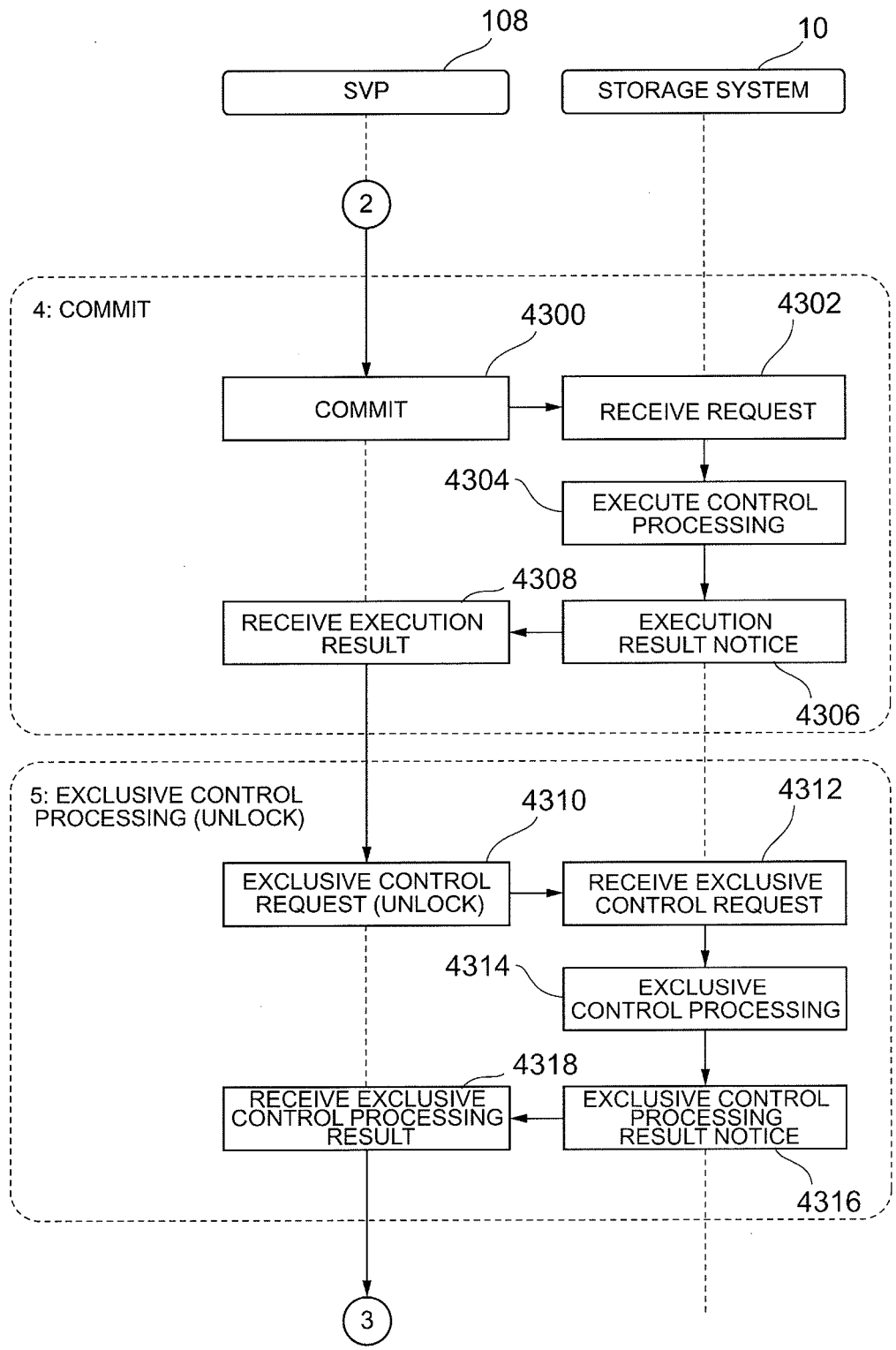
FIG. 43 is a flowchart of third processing following the second processing.
Figure 44:
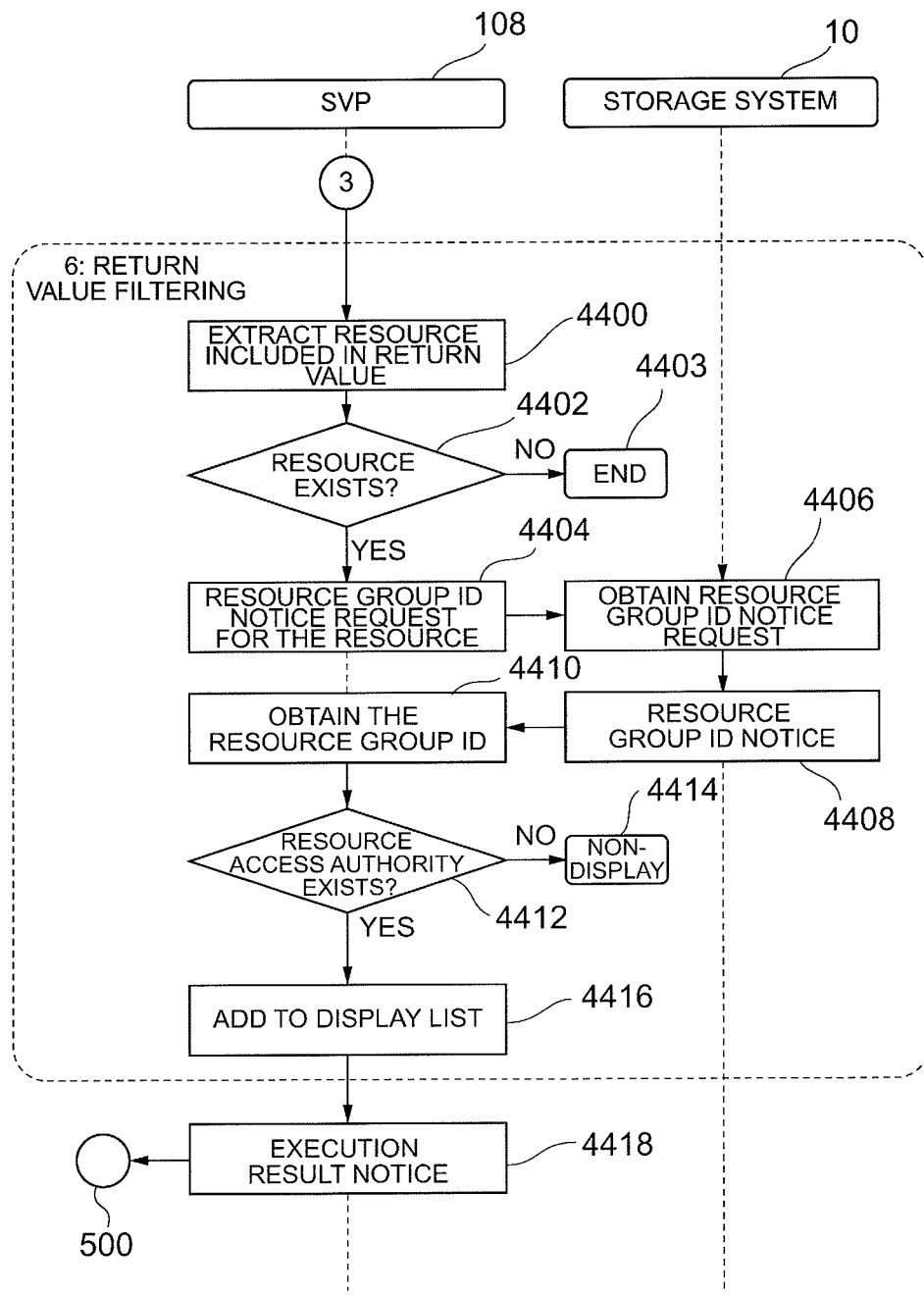
FIG. 44 is a flowchart of fourth processing following the third processing.

FIG. 43 is a flowchart of commitment processing and exclusive control unlocking processing. After the locking processing is completed, the SVP applies the judgment logic to the request in accordance with the aforementioned policy settings. If an affirmative judgment is returned for this judgment, the SVP commits a request (4300) and sends the request to the storage system. Subsequently, the storage system receives the request (4302), executes control processing based on the request (4304), and notifies the SVP of the execution result (4306). After receiving this notice (4308), the SVP requests that the storage system should unlock the resource group(s) in the locked state (4310). After receiving this request (4312), the storage system executes unlocking processing (4314) and notifies the SVP of the result (4316). The SVP receives the result of the unlocking processing (4318).

Next, the SVP executes filtering processing on a return value included in the execution result from the storage system. Specifically speaking, the SVP extracts a resource included in the return value (4400); and if it is determined that the resource exists (4402), the SVP sends a request for the resource group ID of a resource group, to which the relevant resource belongs, to the storage system (4404). If it is determined that the resource does not exist, the SVP terminates the processing of the flowchart (4403). After receiving this request (4406), the storage system refers to the resource configuration information table 202B and notifies the SVP of the resource group ID (4408). After receiving the resource group ID (4410), the SVP judges whether an access authority over this resource exists or not (4412), and checks if the resource group ID is included in the resource group ID bitmap (FIG. 16). If the resource group ID is included in the resource group ID bitmap, the SVP adds the resource group ID to a display list (4416) and notifies the GUI for the external management terminal of the execution result; and if the resource group ID is not included in the resource group ID bitmap, the resource(s) is not displayed (4414).

In the above explanation, dynamic provisioning (such as creation of LDEVs), local copying, and remote copying have been explained as the operations which can be executed by the user on the storage system by using its authorities and its allocated resource groups; however, the types of such operations are not limited to these examples. For example, such operations include optimal data location. Specifically speaking, for example, the virtual private storage system has to be equipped with online volume resource groups, archive volume resource groups, high-quality hard disk drive (FC drive) resource groups for the online volumes, and archive hard disk drive (such as ATA drive or SATA drive) resource groups and a user group having the optimal location authority has to be equipped with archive resource groups. Even if this authority exists, archive data cannot be migrated from the online volumes to the archive volumes unless the related resource groups are provided.

Next, optimization processing according to this invention will be explained. After setting allocation of authorities (roles) and allocation of resource groups to a user group, the storage system optimizes such allocations as described above at specified timing, for example, when changing the allocations. When a superior management user allocates a certain authority to a certain subordinate management user and intends to also allocate a resource group, which is necessary to enable this authority, to the subordinate user, the optimization means to, for example, change or update at least either one of the authority or the resource group allocated to the subordinate user in order to eliminate allocation of a resource(s), which is not intended by the superior user, to that user; and particularly, the optimization is processing for eliminating allocation of a resource, which should be shared by a plurality of subordinate users, to a specific subordinate user and exclusive possession of the shared resource by that storage administrator.

Figure 47:
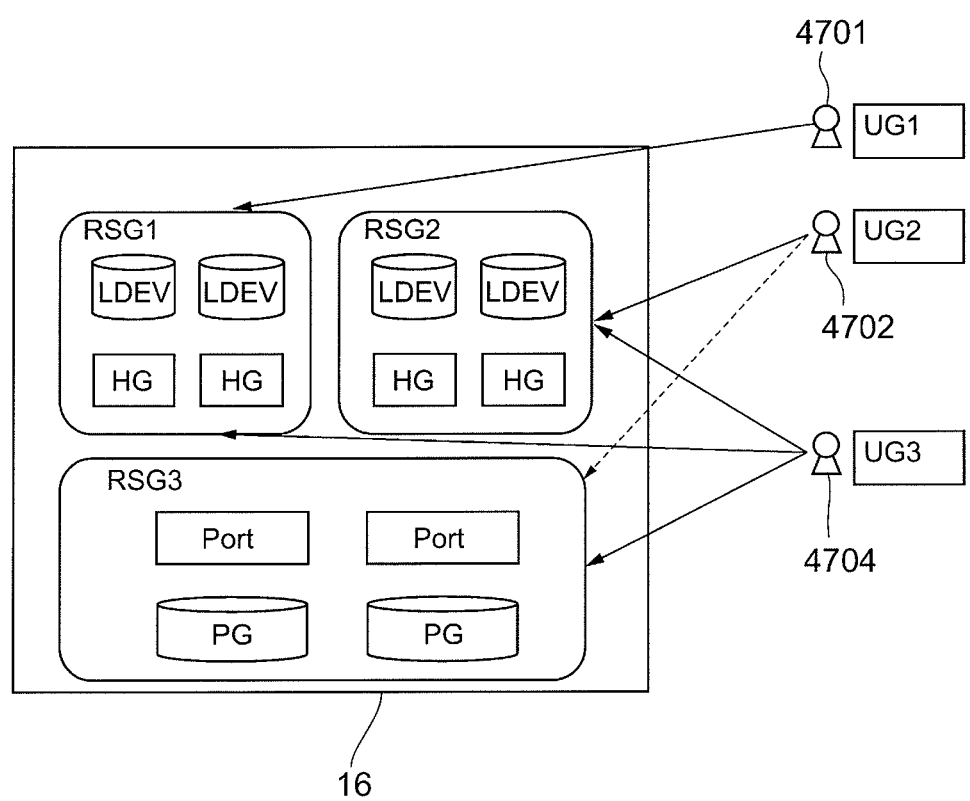
FIG. 47 is a block configuration diagram showing a state before optimization of allocation of resource groups and authorities to a management user.

A configuration requiring this optimization will be explained with reference to the relevant drawings. FIG. 47 is a block diagram showing a configuration before optimization; and 4701 represents a storage administrator (subordinate administrator) belonging to UG1, 4702 represents a storage administrator belonging to UG2, and 4704 represents a security administrator (overall administrator) belonging to G3 and serving as the superior administrator. RSG1 is allocated to UG1 and RSG2 is allocated to UG2. RSG1, RSG2, and RSG3 are allocated to UG3. RSG3 is a resource group having shared resources for the plurality of user groups. LDEVs and host groups (HG) as logical resources exist in RSG1 and RSG2 and ports (Port) and parity groups (PG) as physical resources exist in RSG3. Since the shared resources should be used commonly by a plurality of storage management user groups, the storage administrators are not allowed to handle the shared resources and the operation authorities over the resource groups of the shared resources are granted to the security administrator 4704.

Referring to FIG. 47, for example, a role for storage management (provisioning) and a role for storage management (local backup) which are required for the storage operation are set to UG1 and UG2, respectively. Each role for security management, storage management (resource management), storage management (provisioning), and storage management (initialization) is set to UG3 so that a function managing a plurality of user groups can be fulfilled. Incidentally, setting authorities to the user groups can be facilitated by configuring roles in advance by gathering a plurality of operation authorities to match user cases (such as provisioning and local backups) and setting them as a default to a shared memory.

Setting a remote backup role, which is chassis-to-chassis copying to/from an external storage system, to UG2 is assumed on the premise of the system configuration shown in FIG. 47. In this case, a user belonging to UG2 needs to access ports to set a path at least between the chassis in order to enable this role. So, it is necessary to set a storage management (remote backup (remote copying)) role to UG2 and further allocate UG2 to RSG3 having ports (a dotted line part in FIG. 47). On the other hand, if the allocations to RSG3 are left as they are, the user belonging to UG2 can also access parity groups (PG) in RSG3 and the parity groups as the shared resources will be freely possessed exclusively by the specific user, which is not desirable. Therefore, the aforementioned optimization is required. Incidentally, regarding the detailed operation authorities belonging to each role, please see FIG. 15A.

Next, the detailed content of the optimization will be explained. This optimization is executed by an optimization (program) module of the storage management software of the SVP 108. A flowchart of the optimization module will be explained with reference to a specific example based on FIG. 48. This specific example is assumed to be a configuration in the process of setting a remote backup role to UG2 (FIG. 47).

Firstly, a form of a table before setting the remote backup role to UG2 will be explained. FIG. 49 is a user status table. A UG ID bitmap in this table indicates that user1 (4701) belongs to UG1, user2 (4702) belongs to UG2, and user3 belongs to UG3. FIG. 50 is a UG information table and records, in a bitmap format, what kind of role is allocated and which RSG is allocated to each user group. Incidentally, the UG information table corresponds to a combination of the authority bitmap (FIG. 13) and the resource group ID bitmap table (FIG. 16) mentioned earlier. The UG information table may be divided into these two tables.

FIG. 51 is a role information table and FIG. 52 is an authority-resource association table showing necessary resources for each authority. Regarding the latter table, a necessary resource type and a target resource ID bitmap of the relevant operation authority are registered with respect to the operation authority of each bit in the authority bit. Specifically speaking, regarding part of FIG. 52, the $1^{st}$ bit of the authority bit corresponds to [LDEV creation] and the resource types required for the LDEV creation are LDEV and PG (parity groups) as indicated on the first row in the table. The resource types are identified according to 4-bit information; the $1^{st}$ bit from the left corresponds to ports, the $2^{nd}$ bit corresponds to LDEV, the $3^{rd}$ bit corresponds to HG (host groups), and the $4^{th}$ bit corresponds to PG. Regarding the resource ID bitmap, each bit from the Pt bit to the $4^{th}$ bit corresponds to a port, the $5^{th}$ bit to the $8^{th}$ bit correspond to LDEVs, the $9^{th}$ bit to the $12^{th}$ bit correspond to HG, and the $13^{th}$ bit to the $16^{th}$ bit correspond to PG.

FIG. 53 is a resource group information table. Bitmaps of resource IDs included in each RSG of RSG1, RSG2, and RSG3 are registered in this table. FIG. 54 is a resource information table and each bit in a resource ID bitmap corresponds to information bits of the resource ID and the resource type.

Figures 55, 56:
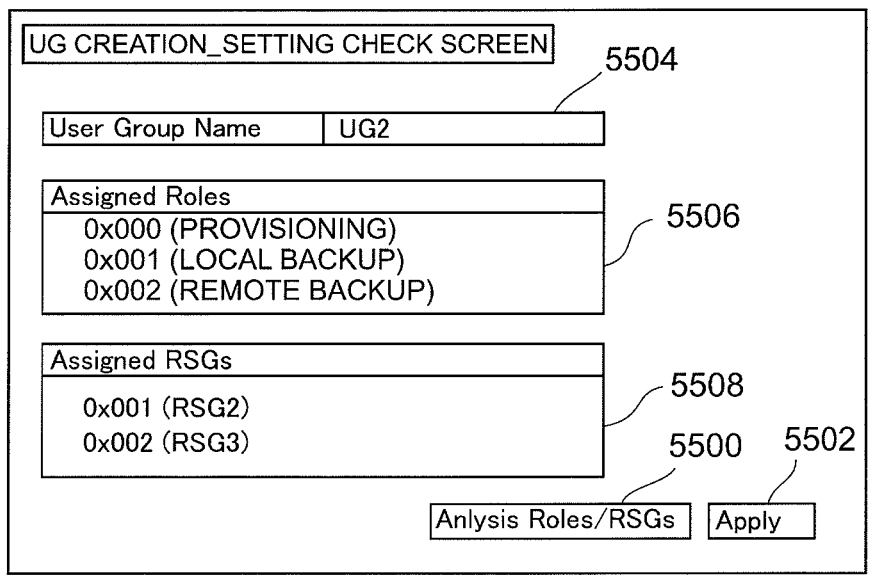
FIG. 55 is a display example of a GUI related to UG creation and setting processing.
FIG. 56 is the user group information table after execution of allocation of a new authority and resource group to a user group.

Next, a flow or optimization will be explained by referring back to FIG. 48. The storage management software 200 starts UG creation and setting processing in response to a request from the security administrator (UG3 user). The optimization is started as triggered by the setting processing such as UG creation or update; however, the trigger of the optimization is not limited to this example. Setting the above-mentioned dotted-line part in FIG. 47 is executed by the storage management software 200 by means of the UG creation and setting processing. The UG creation and setting processing is executed by displaying a GUI shown in FIG. 55 on a computer terminal of the security administrator via the external management terminal 20. The security administrator selects roles and resource groups to be allocated to a user group for storage management, using the GUI (4800 in FIG. 48). 5504 in the GUI is an input area for a user group name. 5506 is an input area for role IDs assigned to the user group. 5508 is an input area for RSG IDs assigned to the user group. 5500 is an area for activating processing for analyzing the roles and resource groups for the optimization and 5502 is an area for applying information about the roles and the resource groups to the user group. If the remote backup role is set to UG2 as shown in FIG. 47, the remote backup identified with 0x002 and RSG3 identified with 0x002 are input, as those which should be newly assigned to UG2, to the respective relevant areas by the security administrator. In response to this input, the UG creating and setting processing changes the UG information table as shown in FIG. 56. The table in FIG. 56 shows a state where the remote backup authority is allocated to UG2 and RSG3 is allocated to UG2 as explained with reference to FIG. 47. Specifically speaking, bit 1 corresponding to the remote backup is set to the $3^{rd}$ bit of the role ID bitmap corresponding to UG2; and similarly, bit 1 corresponding to RSG3 is set to the $3^{rd}$ bit of the RSG ID bitmap.

Figure 57:
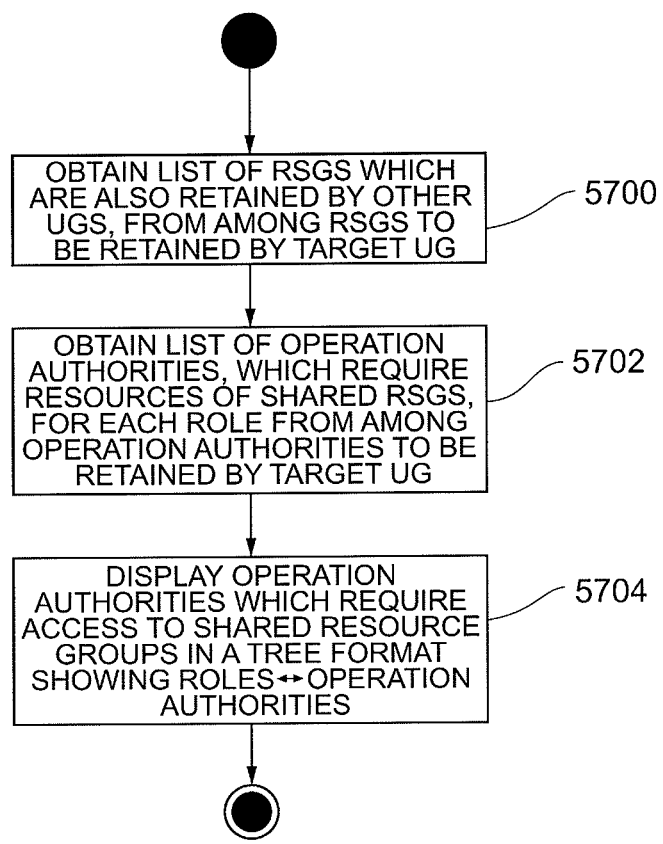
FIG. 57 is a flowchart illustrating detailed processing of step 4804 in FIG. 48.

Next, when the security administrator activates the role/storage group analysis area (5500) on the setting and check screen of the GUI (4802), the optimization module is activated and firstly extracts roles and operation authorities, for which a shared resource group (to which other user groups also belong) may possibly accessed, from among the resource groups belonging to the optimization target user group (4804). The details of this processing are shown in FIG. 57. In step 5700, the optimization module obtains a list of RSGs, which also belong to other UGs, from among RSGs belonging to the target UG. The optimization module refers to the UG information table (FIG. 56), compares the RSG ID bitmap of UG2 with bitmaps of other UGs, and thereby extracts RSG2 and RSG3 as shared RSGs.

Subsequently, the optimization module obtains, for each role, a list of operation authorities requiring the resources of the shared RSGs from among the operation authorities to be retained by the target UG (5702). In the case of FIG. 47, the optimization module calculates the operation authorities to access RSG2 (LDEV, HG) and RSG3 (ports, PG) which are the shared resource groups, from among all the roles (provisioning, local backup, and remote backup) which are set to UG2, by referring to the tables in FIG. 51 to FIG. 54. As a result, all the four types of resources exist, so that all the operation authorities which the aforementioned three roles have respectively are obtained.

Figure 58:
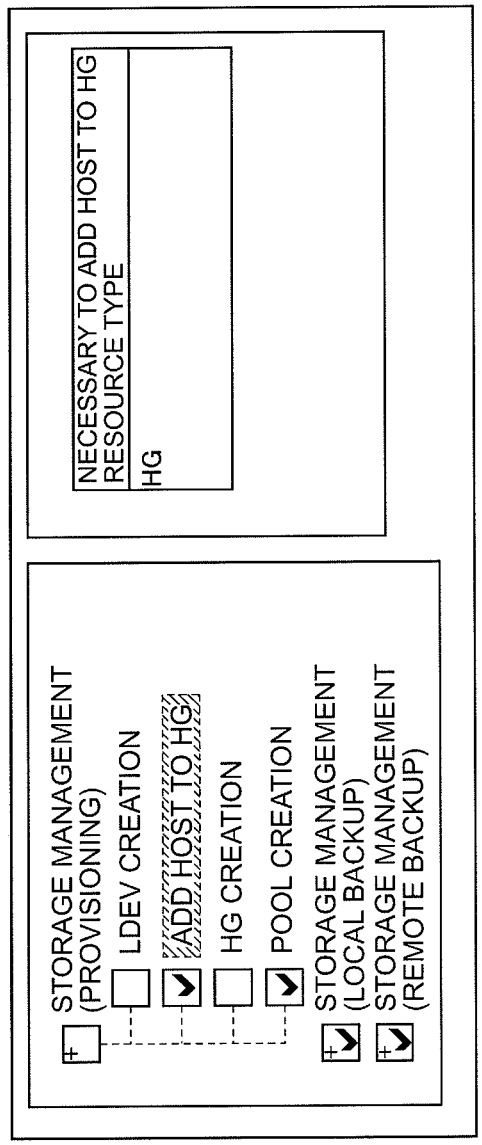
FIG. 58 is an example of an operation screen obtained by step 5704 in the flowchart of FIG. 57.

Then, the optimization module displays the roles and the operation authorities in a tree format as the operation authorities requiring access to the shared resource groups (5704). FIG. 58 is a screen showing a display example corresponding to FIG. 47 and a state without any check mark is an initial screen.

Next, the security administrator selects necessary operation authorities for the storage administrator from among the roles and operation authorities listed in FIG. 58 (4806). The security administrator selects the operation authority RSG for host addition to HG and pool creation from among all operation authorities for local backups, all operation authorities for remote backups, and provisioning. The LDEV creation in the provisioning is not selected in order to prevent exclusive possession of the storage area by UG2 by making UG2 unable to access the parity groups of RSG3. Incidentally, allocation of the ports of RSG3 to UG2 is minimum required in order to for UG2 to achieve the remote backup authority.

Subsequently, the optimization module executes processing for removing an unnecessary resource type, which will not be used by the target UG, based on the operation authorities selected by the security administrator. An example of the unnecessary resource type is PG of RSG3 which will not be used by UG2 according to the example shown in FIG. 58. The optimization module judges in step 4808 whether there is any operation authority not selected in step 4806. If an affirmative judgment is returned in this step, the optimization module creates temporary data of a new role by removing the operation authority not selected from the target role. Temporary data will not be created for a role regarding which all the authorities are checked. Referring to FIG. 58, the new-role temporary data will be created for the provisioning role. The optimization module registers the new-role temporary data (provisioning temporary data) in the role information table (FIG. 59). As it is apparent from comparison between the role information table (FIG. 51) before the remote backup is set to UG2 and the table in FIG. 59, the $1^{st}$ bit and the $3^{rd}$ bit corresponding to the operation authorities, which are not checked in FIG. 58, among bits for the provisioning operation authorities are reset in the latter table. A new role (provisioning temporary data) is created and the operation authorities of the original role (provisioning) are not changed here in order to avoid a problem caused by a user unconsciously changing the operation authorities of a user group to which the original role is allocated.

Figure 60:
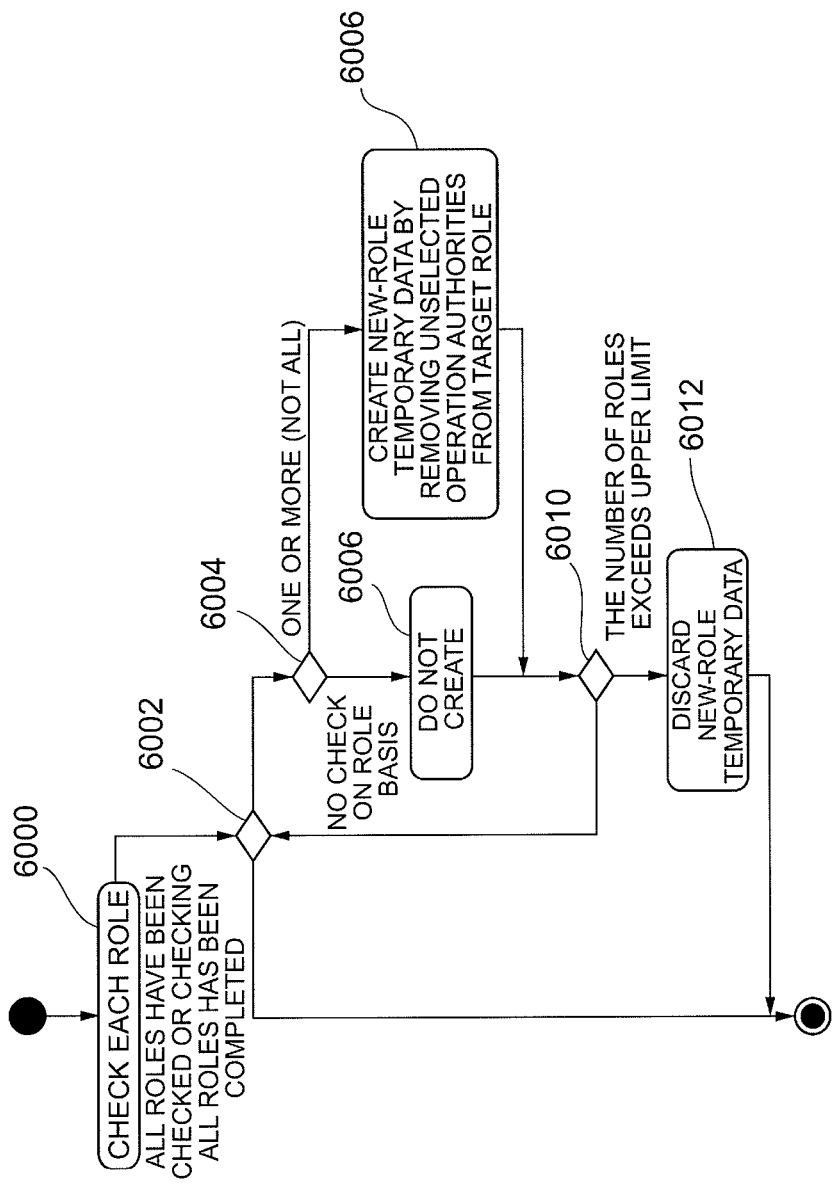
FIG. 60 is a detailed flowchart of step 4810 of FIG. 48.

FIG. 60 is a detailed flowchart of step 4810. The optimization module checks the target user group with respect to each role (6000). The optimization module judges whether all the roles have been checked (which is the same as the case where all the operation authorities of the role are selected) or checking of all the roles has been completed. If that applies to the later case, the processing exits step 4810 In the former case, it is necessary for the UG to access all the shared resources, so that there is no need to change the roles allocated to UG.

If the optimization module returns a negative judgment in step 6002, it verifies checks on a role basis in step 6004. If one or more authorities which are not checked exist with respect to the check target role, the optimization module creates temporary data of a new role from which the operation authority/authorities not selected in the check target role in step 6006 is/are removed (see FIG. 59). If the optimization module determines that there is no check on a role basis (which is the same as the case where all the operation authorities are not checked in step 6004), it does not create the temporary data (6008) and proceeds to step 6010. If the number of roles, including the new role, exceeds an upper limit and such roles are set to the target UG in step 6010, the optimization module deletes the new-role temporary data from the table from the viewpoint of safe operation of the storage system (6012). If the number of roles does not exceed the upper limit, the optimization module returns to step 6002. With the selection form of FIG. 58, the temporary data is created in step 6006 as shown in FIG. 59.

Figure 66:
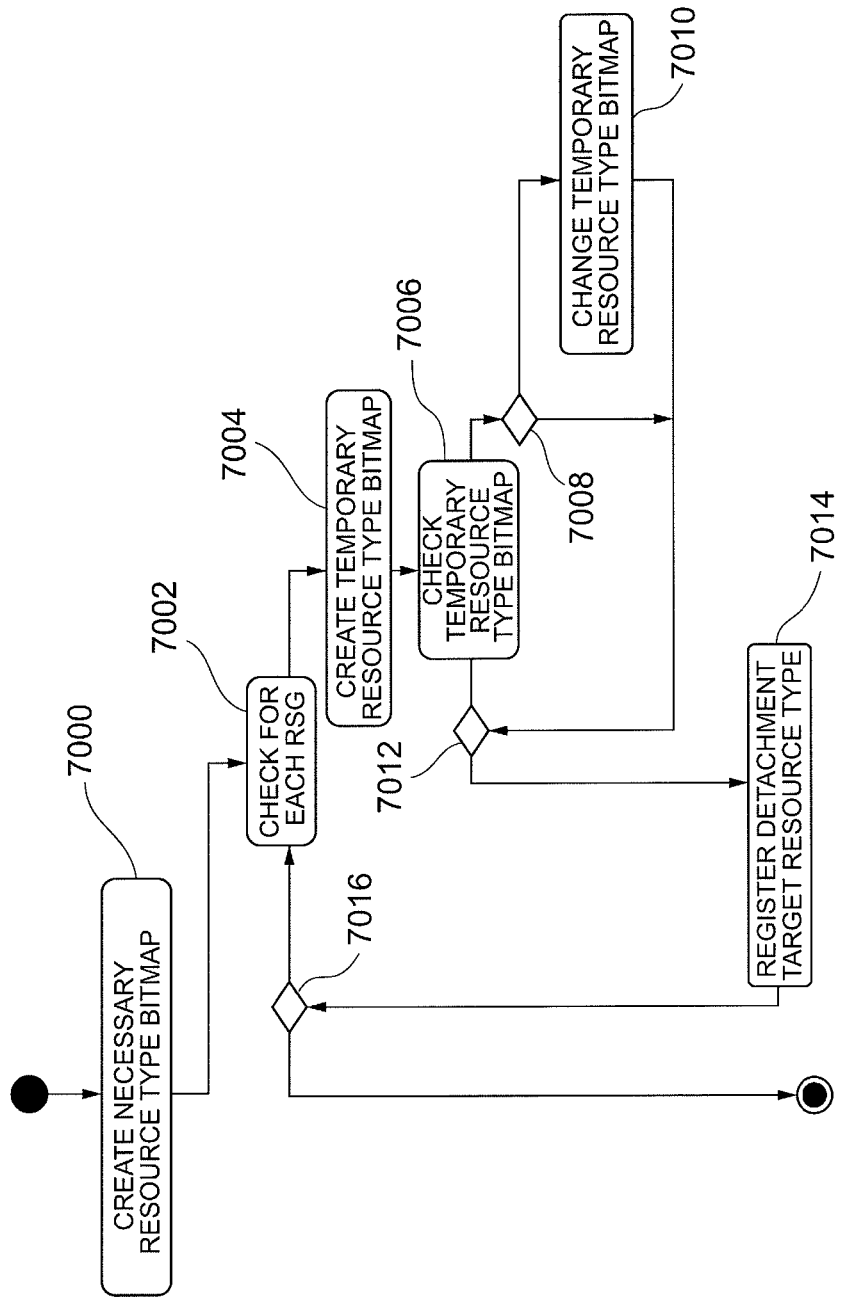
FIG. 66 is a detailed flowchart of step 4812 in FIG. 48.

After the optimization module exits from the new-role temporary data creation processing (4810), it proceeds to unnecessary resource type selection processing (4812). A detailed flowchart of this processing is shown in FIG. 66. The optimization module creates a necessary resource type bitmap by calculating operation OR of bitmaps of the resource types required to execute the operation authorities retained by all the roles including the temporary data (7000). When creating this necessary resource type bitmap, the optimization module refers to the role information table (FIG. 59) relating to the role authority information and the resource table (FIG. 52) relating to the resource information required to execute the authorities and obtains bit information of the resource type(s) which is necessary for each role as shown in FIG. 61. Furthermore, the necessary resource type bitmap (1110) shown in FIG. 62 is obtained by calculating operation OR of these pieces of bit information. This bitmap represents the resource type(s) necessary for the storage system to execute all the roles of UG2. Referring to FIG. 62, the necessary resource types are ports, LDEV, and HG.

Next, the optimization module executes processing for finding temporary resource types, which are the resource types already allocated to the target UG, in order to compare the resource types already allocated to the target UG with the necessary resource type(s). Then, the optimization module checks for each RSG allocated to the UG (7002) and creates a temporary resource type bitmap (7004). With the temporary resource type bitmap, a bit corresponding to the resource type included in the check target RSG is turned on.

The optimization module checks for each resource type bit of the temporary resource type bitmap of the check target RSG (7006). This check is performed for the purpose of selecting the resource type(s), which is included in the temporary resource type bitmap and is not included in the necessary resource bitmap, to be an unnecessary resource type(s). If the check target resource type bit of the temporary resource type bitmap is off in step 7008, the optimization module jumps to step 7012 without performing step 7010. If the check target resource type bit is ON, the optimization module executes an NAND operation between that bit and the resource type bit corresponding to the necessary resource type bitmap in step 7010. As a result, a bit(s) in the temporary resource type bitmap, which represents the temporary resource type(s) and is not included in the necessary resource type bitmap, is maintained to be ON; and a bit(s) in the temporary resource type bitmap, which represents the temporary resource type(s) and is included in the necessary resource type bitmap, is changed to OFF.

Next, the optimization module proceeds to step 7012 and repeats steps 7006 to 7010 until it finishes checking all the resource type bits in the temporary resource type bitmap After finishing checking all the resource type bits, the optimization module proceeds to step 7014. In step 7014, the optimization module decides the resource type(s) [detachment target resource type(s)] corresponding to the resource type bit(s), which was changed by step 7010 and is set ON based on the temporary resource type bitmap of each RSG. In step 7016, the optimization module judges whether checking of all the RSGs belonging to the target user group has finished or not; and if an affirmative judgment is returned, the optimization module terminates the processing in this flowchart; and if a negative judgment is returned, the optimization module returns to step 7002.

Application of the above-described flowchart to the configuration in FIG. 47 will be specifically explained. FIG. 63 is a table of an initial form of the temporary resource type bitmap of RSG2 and RSG3 allocated to UG2 according to the configuration before optimization as shown in FIG. 47. In this example, an initial value [0] is set to each of a plurality of bits corresponding to the respective resource types. In the example shown in FIG. 47, RSG2 and RSG3 are check targets. The optimization module starts checking from RSG2. Since RSG2 retains LDEV and HG, bits corresponding to LDEV and HG in the temporary resource type bits are set (FIG. 64).

In the example shown in FIG. 47, the optimization module compares the necessary resource type bitmap in FIG. 62 with the temporary resource type bitmap in FIG. 65 with respect to RSG2 and checks if any resource which is not included in the necessary resource type(s) exists as the temporary resource type. In this case, since all the temporary resource types are included in the necessary resource types, RSG2 does not contain any resource type to be detached from RSG2 as an unnecessary resource. Therefore, all the four bits of the temporary resource bitmap are turned off in 7010 and registered in a detachment target resource type bitmap (FIG. 67).

After step 7014 and then 7016, the optimization module returns to step 7002 to start checking RSG3 after checking RSG2. Since RSG3 retains ports and PG, bits corresponding to the ports and PG are set in the temporary resource type (FIG. 65). Next, in the same manner as in the case of RSG2, the optimization module compares the necessary resource type bitmap in FIG. 62 with the temporary resource type bitmap in FIG. 65 with respect to RSG3 and thereby checks whether any resource type which is not included in the necessary resource type(s) exists as the temporary resource type. In this case, since PG is not included in the necessary resources from among the resource types listed as the temporary resource types, the top bit corresponding to the ports in the temporary resource type bitmap of RSG3 is changed from ON to OFF and the last bit corresponding to PG is maintained to be ON, which is then registered in the detachment target resource type bitmap (FIG. 67).

Figure 68:
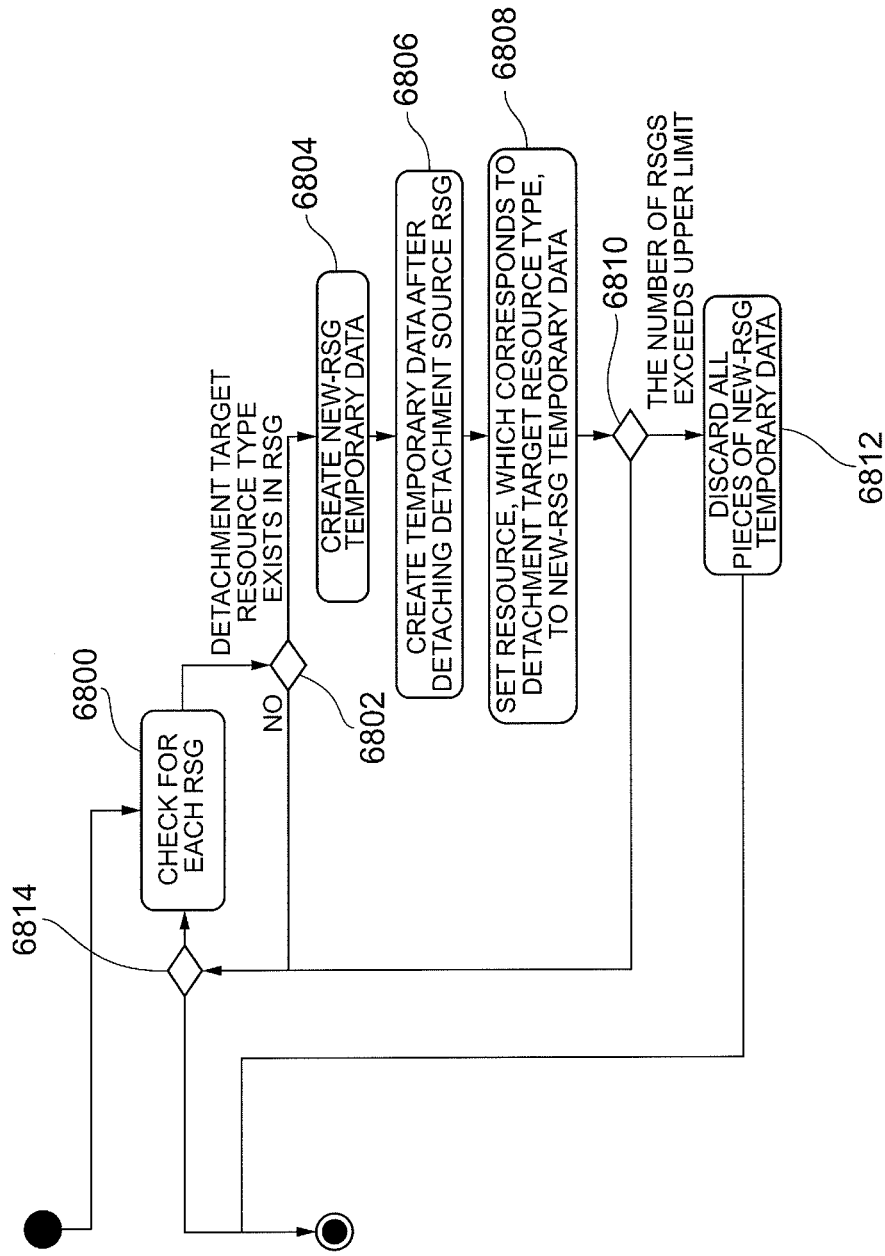
FIG. 68 is a detailed flowchart of step 4814 in FIG. 48.

If the detachment target resource type exists as a result of the processing in FIG. 66, the optimization module proceeds to step 4814 and creates updated original-RSG temporary data, which is created by detaching the resource(s) relating to the detachment target resource type from the shared RSGs, and new-RSG temporary data relating to the detached resource type. The details of this processing are shown in FIG. 68. The optimization module checks for each RSG allocated to the check target user group (6800). The optimization module refers to the detachment target resource type bitmap (FIG. 67) and judges whether any detachment target resource type exists in the check target RSG. If an affirmative judgment is returned, the optimization module proceeds to step 6804; and if a negative judgment is returned, the optimization module proceeds to step 6814. In step 6814, the optimization module judges whether all the RSGs have been checked or not; and if there is any RSG which has not been checked, the optimization module returns to step 6800; and if there is no RSG which has not been checked, the optimization module terminates the new-RSG temporary data creation processing in FIG. 68.

In step 6804, temporary data for defining a new RSG is created. In step 6806, temporary data from which the resource (s) relating to the detachment target resource type(s) has been detached from the original RSG is created. Next, the optimization program module sets the resource(s) corresponding to the detachment target resource type(s), as the new-RSG temporary data in step 6808. In step 6810, the optimization module judges whether or not the total number of RSGs, including the new RSG, in the storage system exceeds an upper limit; and if the total number of RSGs exceeds the upper limit, the optimization module discards all pieces of the temporary data relating to the new RSG and returns to step 6814.

Figure 70:
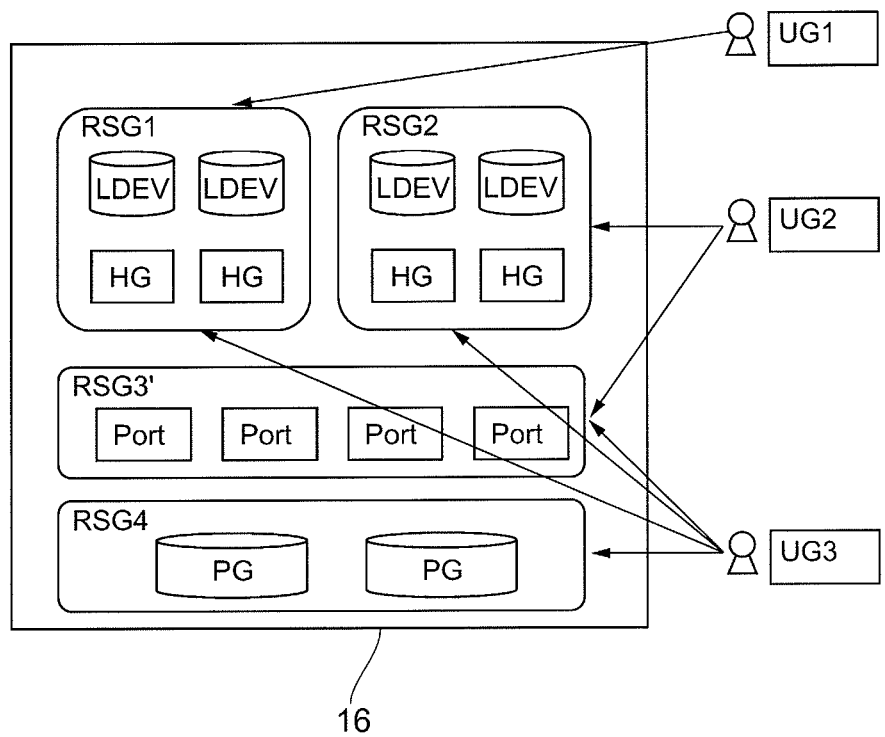
FIG. 70 is a block diagram of configuration information of resource groups in FIG. 69.

FIG. 69 is an RSG information table which is set by the processing in FIG. 68 with respect to the configuration in FIG. 47 and has the original-RSG temporary data (RSG3' temporary data) and the new-RSG temporary data (RSG4 temporary data). The former temporary data is data which is obtained by resetting the bit(s) of the resource(s) relating to the detachment target resource type (PG) in the resource ID bitmap of RSG3 and is then registered as a bitmap. The latter temporary data is data which is obtained by resetting the bit(s) of the resource(s) (PG) corresponding to the resource type (PG) detached from RSG3 and is then registered as a bitmap in the table. Specifically speaking, RSG3 in FIG. 47 is changed to RSG3' (after the change) and RSG4 (new) and no link is set from UG2 to RSG4, but the link from UG2 to RSG3' is maintained as shown in FIG. 70 showing the RSG configuration of FIG. 69 as a block diagram. The link from UG2 to RSG4 (PG) is not set based on the fact that the operation authority relating to the LDEV creation was not selected from provisioning as explained with reference to FIG. 58. Since the link from UG2 to RSG3' (ports) is maintained, the storage administrator belonging to UG2 can set a path for remote backups between a pluralities of chassis.

Figures 71, 72:
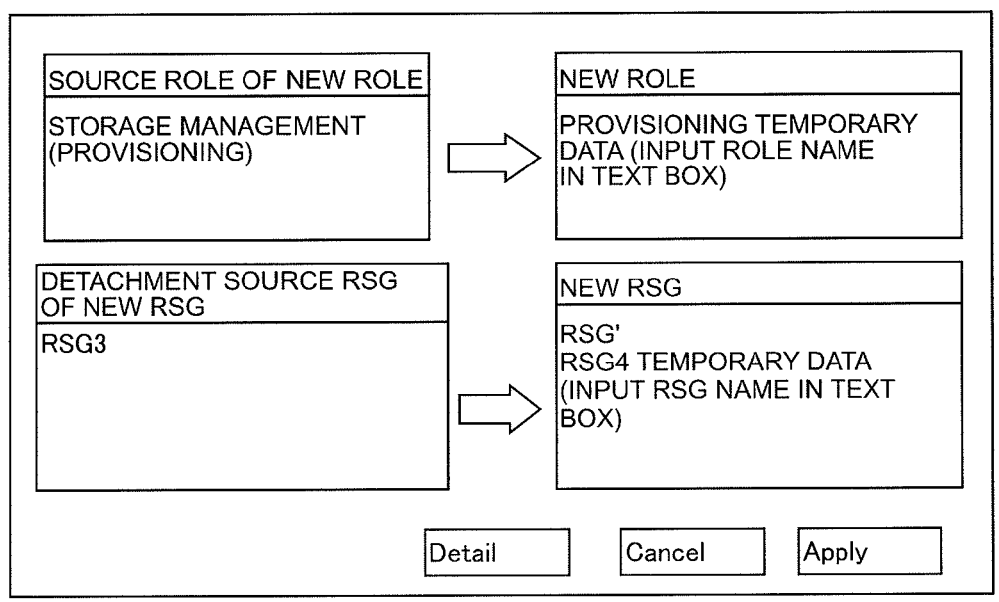
FIG. 71 is a display example of an operation screen indicating the system configuration corresponding to FIG. 69 and FIG. 70.
FIG. 72 is the UG information table after optimization.

The optimization module displays the new-role temporary data relating to step 4810 and the original/new-RSG temporary data relating to step 4814 as a post-optimization system configuration plan on a client computer of the security administrator via a management terminal of the SVP. FIG. 71 is a display example of an operation screen showing the system configuration corresponding to FIG. 69 and FIG. 70. The new role corresponds to the operation authorities relating to host addition to HG and pool creation from among the operation authorities corresponding to the provisioning which is the original role The security administrator inputs a new role name in a text box. Furthermore, the security administrator can input, in a text box, a name of the temporary data for RSG3' and RSG4 which are classified as the new RSGs. [Detail] is an operation area for displaying the details of the operation authorities belonging to the new role and resource information such as the resource type(s) belonging to the new RSGs and the resource ID. [Cancel] is an operation area for cancelling the change for optimization. [Apply] is an operation area for applying the change for optimization to the system.

The security administrator selects whether or not to reflect the new-role temporary data and the original/new-RSG temporary data in the system, on the screen displayed on the computer terminal in step 4816 (4818). If reflecting these pieces of data in the system is selected, the optimization module reflects these temporary data in the storage system (4820). FIG. 72 shows the UG information table in this state, FIG. 73 is the role information table, FIG. 74 shows the RSG information table. Referring to FIG. 72, the bit corresponding to the remote backup is turned on in the role bitmap for UG2. Furthermore, the bit corresponding to RSG3' is turned on in the RSG ID bitmap for UG2. Also, the bit corresponding to RSG4 is turned on in the RSG ID bitmap for UG3. Referring to FIG. 73, the bits corresponding to the operation authorities checked in FIG. 58 are turned on in the authority bitmap corresponding to the new role (provisioning self-created role). Furthermore, referring to FIG. 74, a plurality of bits corresponding to PG, which is the detached resource type, in the resource ID bitmap corresponding to RSG3' changed from RSG3 are turned off and a plurality of bits corresponding to PG in the bitmap corresponding to the new RSG4 are turned on.

Figure 48:
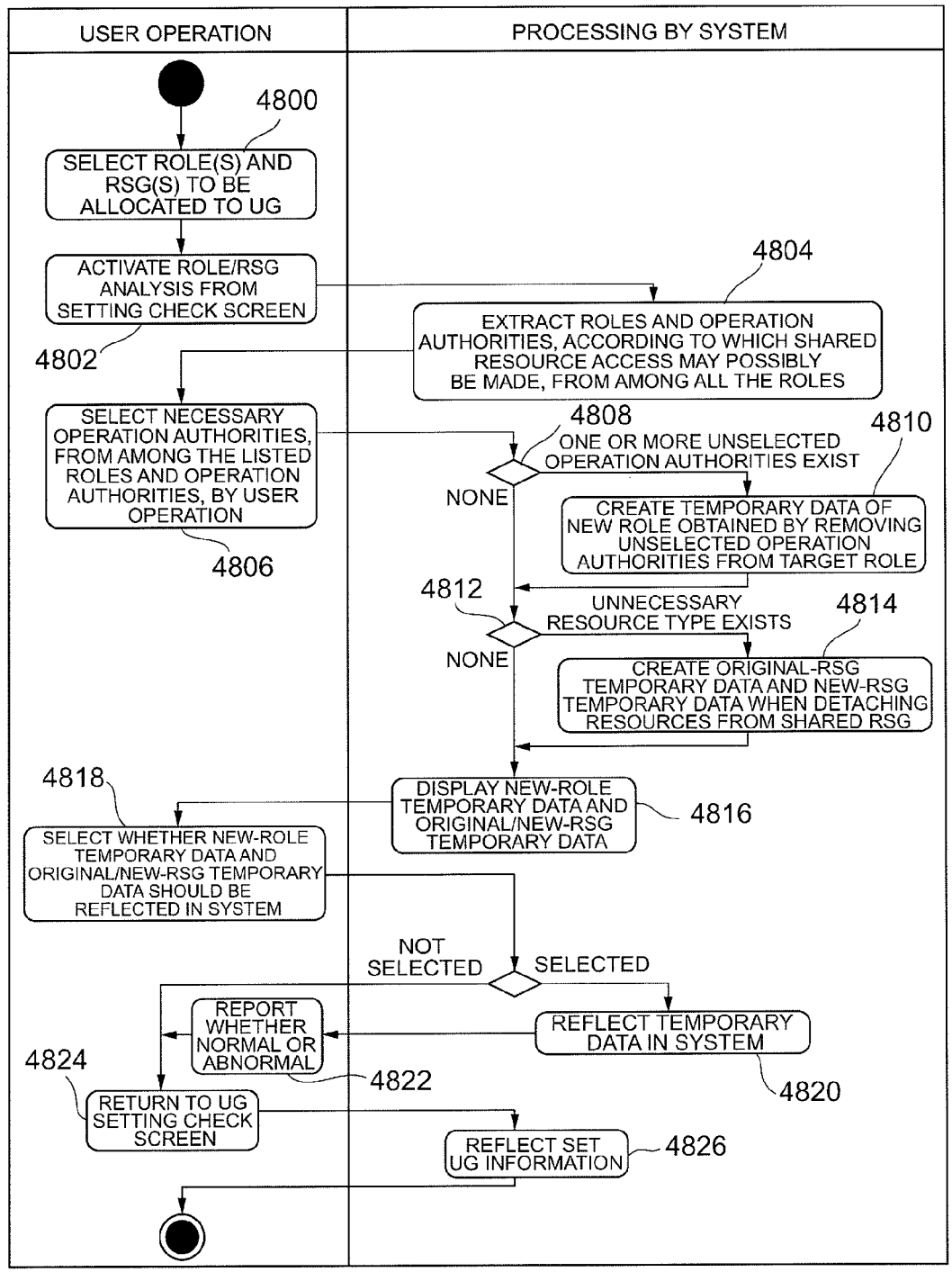
FIG. 48 is a flowchart of optimization processing.

In step 4822 of FIG. 48, whether the reflecting processing has been executed normally or abnormally is reported to the security administrator. In step 4824, the UG setting check screen (FIG. 55) is displayed for the security administrator. In step 4826, information which is set on the UG setting check screen is reflected in the system. As a result, the optimization module terminates the series of processing for the optimization processing.

Figure 75:
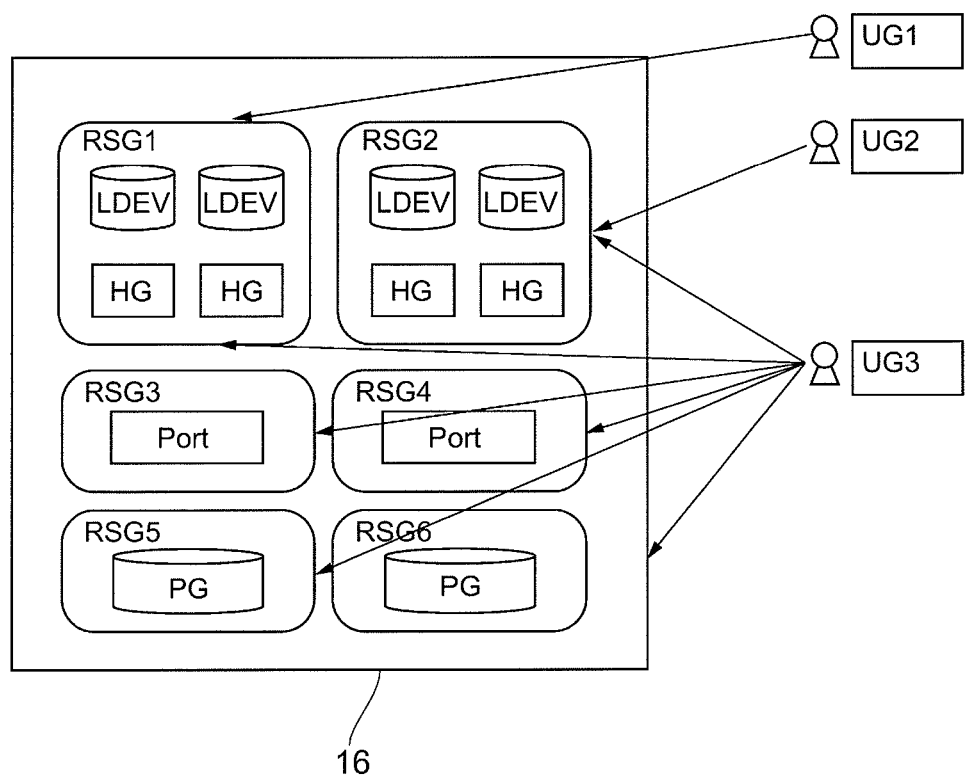
FIG. 75 is a block diagram of a second optimization example.

The above-described optimization processing relates to the processing for dividing a resource group (dividing RSG3 into RSG3' and RSG4); however, there is a use case in which resource groups need to be aggregated, but not divided. Gathering many divided resource groups will lead to facilitation of the storage management operation. This configuration is shown in FIG. 75. The security administrator belonging to UG3 sets a new RSG by gathering and integrating RSG3 to RSG6. Incidentally, if there is a user group which is linked to only part of RSGs and the link is maintained for the integrated RSG, the resources accessed by the user group will be expanded. So, the optimization module may inform the security administrator that the integration of RSGs should be cancelled.

Incidentally, the aforementioned optimization changes the operation authorities of the role allocated to a specific user group so that the specific user group will not be able to access the shared resource; and also removes the shared resources, which thereby become no longer necessary in order to achieve the role of the specific user group, from the shared resource group. However, only either one of the above may be implemented. In other words, if the storage administrator cannot access the shared resource, they will not be able to execute the operation authority; and on the other hand, if the storage administrator does not have the operation authority, they cannot operate the shared resources.

Reference Signs List
- 10 Storage system
- 12A, 12B Host computers
- 16 Storage controller
- 18 Storage drive
- 20 External management terminal
- 108 SVP
- 302 Host group
- 304 Virtual volume
- 306 Pool
- 307 Pool volume
- 308 Parity group

The invention claimed is:

1. A computer system comprising:
a storage system for controlling read access or write access from a host computer to a storage device, wherein the storage system includes:
   a plurality of resource groups respectively defined by grouping of a plurality of resources;
   a storage area for storing management information of the plurality of resource groups and association information between the plurality of resources and the plurality of resource groups; and
   a plurality of user groups, each user group having allocated to it a resource group and an authority which permits a user belonging to the user group to execute an operation on the resource group when the user is logged into the storage system; and
a management device for managing the plurality of resources for the storage system and a plurality of users sharing the storage system;
wherein, in response to receiving a request for allocating a first resource group to a user group, the management device is configured to:
   use first information to determine whether the first resource group includes both a first resource which is necessary to execution of the authority allocated to the user group and a second resource which is not necessary to execution of the authority allocated to the user group, wherein the first information relates to a necessary resource type for execution of the authority allocated to the user group;
   create, if it is determined that the first resource group includes both a first resource which is necessary to execution of the authority allocated to the user group and a second resource which is not necessary to execution of the authority allocated to the user group, a second resource group including the first resource without the second resource, and
   represent the second resource group with the first resource group on a display of the management device.

2. The computer system according to claim 1, wherein the storage system is partitioned into a plurality of virtual storage systems, wherein the plurality of user groups are assigned to at least one of the plurality of virtual storage systems, and wherein a plurality of resources allocated from the storage system to each virtual storage system is partitioned into a plurality of resource groups.

3. The computer system according to claim 1, wherein the management device starts an optimization as triggered by a change of the authority which is allocated to at least one of the plurality of user groups.

4. The computer system according to claim 1, wherein the management device executes, as an optimization, a change in a resource belonging to a resource group together with a change of the authority allocated to at least one of the plurality of user groups.

5. The computer system according to claim 1, wherein the management device finds a shared resource group to be shared with another user group from among a plurality of resource groups allocated to a target user group; and executes an operation on the shared resource group.

6. The computer system according to claim 1, wherein the management device finds a shared resource group to be shared with another user group from among a plurality of resource groups allocated to a target user group; extracts an authority that requires access to the shared resource group, from among authorities allocated to the target user group; and executes an operation on the shared resource group based on an authority selected from the extracted authority.

7. A control method for a computer system, the computer system including a storage system for controlling read access or write access from a host computer to a storage device and a management device for managing a plurality of resources for the storage system and a plurality of users sharing the storage system, the computer system control method comprising the following steps executed by the management device of:
grouping the plurality of resources respectively to set a plurality of resource groups;
registering management information of the plurality of resource groups and association information between the plurality of resources and the plurality of resource groups, in the storage system;
defining a user group for the users and setting an authority to that user group which permits a user belonging to the user group to execute an operation on a resource group allocated to the user group when the user is logged into the storage system;
in response to receiving a request for allocating a first resource group of the plurality of resource groups to the first user group, using first information to determine whether the first resource group includes both a first resource which is necessary to execution of the authority allocated to the user group and a second resource which is not necessary to execution of the authority allocated to the user group, wherein the first information relates to a necessary resource type for execution of the authority allocated to the user group;

creating, if it is determined that the first resource group includes both a first resource which is necessary to execution of the authority allocated to the user group and a second resource which is not necessary to execution of the authority allocated to the user group, a second resource group including the first resource without the second resource, and representing the second resource group with the first resource group on a display of the management device.

* * * * *